(12) United States Patent
He et al.

(10) Patent No.: US 12,089,247 B2
(45) Date of Patent: Sep. 10, 2024

(54) METHOD AND APPARATUS FOR NR V2X RESOURCE SELECTION

(71) Applicant: Samsung Electronics Co., Ltd., Suwon-si (KR)

(72) Inventors: Chao He, Allen, TX (US); Aris Papasakellariou, Houston, TX (US); Li Guo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 17/304,008

(22) Filed: Jun. 11, 2021

(65) Prior Publication Data

US 2021/0307023 A1    Sep. 30, 2021

Related U.S. Application Data

(63) Continuation of application No. 16/514,880, filed on Jul. 17, 2019, now abandoned.
(Continued)

(51) Int. Cl.
*H04W 72/40* (2023.01)
*H04B 7/26* (2006.01)
(Continued)

(52) U.S. Cl.
CPC .......... *H04W 72/56* (2023.01); *H04B 7/2615* (2013.01); *H04W 4/40* (2018.02);
(Continued)

(58) Field of Classification Search
CPC .............................. H04W 72/25; H04W 72/40
See application file for complete search history.

(56) References Cited

U.S. PATENT DOCUMENTS

2019/0104525 A1\*  4/2019  Santhanam ........... H04L 1/1825
2019/0182840 A1   6/2019  Feng et al.
(Continued)

FOREIGN PATENT DOCUMENTS

WO    2018/031086 A1    2/2018
WO    2018027528 A1     2/2018
(Continued)

OTHER PUBLICATIONS

3GPP, "TS 36.321 V15.2.0", Jul. 2018, pp. 1-126 (Year: 2018).\*
(Continued)

*Primary Examiner* — Salvador E Rivas

(57) ABSTRACT

A method of a first user equipment (UE) in a wireless communication system is provided. The method comprises: receiving, from a second UE via a sidelink, signals including information to select resources for at least one of aperiodic traffic or periodic traffic; decoding sidelink control information (SCI) from the information included in the signals; performing, over a sensing window, a signal measurement of the received signals; identifying a resource selection window based on a latency requirement; reserving the resources for the at least one of aperiodic traffic or periodic traffic in a frequency domain and a time domain based on the decoded SCI and a result of the signal measurement, the resources being identified within a resource selection window; and transmitting, to the second UE via the sidelink, the at least one of aperiodic traffic or periodic traffic using the reserved resources.

12 Claims, 36 Drawing Sheets

Related U.S. Application Data

(60) Provisional application No. 62/835,631, filed on Apr. 18, 2019, provisional application No. 62/827,925, filed on Apr. 2, 2019, provisional application No. 62/824,461, filed on Mar. 27, 2019, provisional application No. 62/817,841, filed on Mar. 13, 2019, provisional application No. 62/789,727, filed on Jan. 8, 2019, provisional application No. 62/750,587, filed on Oct. 25, 2018, provisional application No. 62/737,566, filed on Sep. 27, 2018, provisional application No. 62/735,437, filed on Sep. 24, 2018, provisional application No. 62/727,791, filed on Sep. 6, 2018, provisional application No. 62/700,428, filed on Jul. 19, 2018.

(51) Int. Cl.
*H04W 4/40* (2018.01)
*H04W 72/044* (2023.01)
*H04W 72/25* (2023.01)
*H04W 72/56* (2023.01)
*H04N 21/426* (2011.01)

(52) U.S. Cl.
CPC ......... *H04W 72/044* (2013.01); *H04W 72/25* (2023.01); *H04W 72/40* (2023.01); *H04N 21/42676* (2013.01)

(56) References Cited

U.S. PATENT DOCUMENTS

| | | |
|---|---|---|
| 2019/0208441 A1 | 7/2019 | Wang et al. |
| 2019/0246249 A1 | 8/2019 | Lee et al. |
| 2020/0187162 A1* | 6/2020 | Luo .................... H04W 72/542 |
| 2020/0275458 A1* | 8/2020 | Khoryaev ............. H04W 72/12 |
| 2020/0288433 A1* | 9/2020 | Yu ..................... H04W 72/0446 |
| 2020/0305152 A1 | 9/2020 | Yasukawa et al. |
| 2021/0160817 A1 | 5/2021 | Khoryaev et al. |

FOREIGN PATENT DOCUMENTS

| | | |
|---|---|---|
| WO | 2018/081979 A1 | 5/2018 |
| WO | 2018084614 A1 | 5/2018 |

OTHER PUBLICATIONS

3GPP, "TS 36.331 V14.7.0", Jun. 2018, pp. 1-772 (Year: 2018).*
Supplementary European Search Report dated Aug. 23, 2021 in connection with European Patent Application No. 19 83 8858, 9 pages.
"3rd Generation Partnership Project; Technical Specification Group Services and System Aspects; Study on enhancement of 3GPP Support for 5G V2X Services (Release 15)", 3GPP TR 22.886 V15.1.0, Mar. 2017, 58 pages.
"3rd Generation Partnership Project; Technical Specification Group Radio Access Network; NR; NR and NG-RAN Overall Description; Stage 2 (Release 15)", 3GPP TS 38.300 V15.4.0, Dec. 2018, 97 pages.
"3rd Generation Partnership Project; Technical Specification Group Radio Access Network; Study on Scenarios and Requirements for Next Generation Access Technologies; (Release 14)", 3GPP TR 38.913 V14.3.0, Jun. 2017, 39 pages.
"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 285 pages.
"5 GHz RLAN; Harmonised Standard covering the essential requirements of article 3.2 of the R&TTE Directive 2014/53/EU", ETSI EN 301 8933 v2.1.1, Harmonised European standard, May 2017, 135 pages.
ISA/KR, International Search Report and Written Opinion of the International Searching Authority, International Application No. PCT/KR2019/008998, Oct. 24, 2019, 8 pages.
Lenovo, et al., "Discussion on Latency Reduction for V2X Phase 2," R1-1804206, 3GPP TSG RAN WG1 Meeting #92bis, Sanya, China, Apr. 16-20, 2018, 3 pages.
Oppo, "Latency reduction for eV2X," R1-1807407, Revision of R1-1806863, 3GPP TSG RAN WG1 Meeting #93, 8 Busan, Korea, May 21-25, 2018, 3 pages.

* cited by examiner

METHOD AND APPARATUS FOR NR V2X RESOURCE SELECTION

CROSS-REFERENCE TO RELATED APPLICATIONS AND CLAIM OF PRIORITY

This application is a continuation of U.S. patent application Ser. No. 16/514,880, filed on Jul. 17, 2019, which claims priority to: U.S. Provisional Patent Application No. 62/700,428, filed on Jul. 19, 2018; U.S. Provisional Patent Application No. 62/727,791, filed on Sep. 6, 2018; U.S. Provisional Patent Application No. 62/735,437, filed on Sep. 24, 2018; U.S. Provisional Patent Application No. 62/737,566, filed on Sep. 27, 2018; U.S. Provisional Patent Application No. 62/750,587, filed on Oct. 25, 2018; U.S. Provisional Patent Application No. 62/789,727, filed on Jan. 8, 2019; U.S. Provisional Patent Application No. 62/817,841, filed on Mar. 13, 2019; U.S. Provisional Patent Application No. 62/824,461, filed on Mar. 27, 2019; U.S. Provisional Patent Application No. 62/827,925, filed on Apr. 2, 2019; and U.S. Provisional Patent Application No. 62/835,631, filed on Apr. 18, 2019. The content of the above-identified patent document is incorporated herein by reference.

TECHNICAL FIELD

The present application relates generally to wireless communication systems, more specifically, the present disclosure relates to NR V2X resource selection.

BACKGROUND

The present disclosure relates to a pre-$5^{th}$-generation (5G) or 5G communication system to be provided for supporting higher data rates beyond $4^{th}$-generation (4G) communication system such as long term evolution (LTE). A communication system includes a downlink (DL) that conveys signals from transmission points such as base stations (BSs) or NodeBs to user equipments (UEs) and an uplink (UL) that conveys signals from UEs to reception points such as NodeBs. Additionally a sidelink (SL) may convey signals from UEs to other UEs or other non-infrastructure based nodes. A UE, also commonly referred to as a terminal or a mobile station, may be fixed or mobile and may be a cellular phone, a personal computer device, etc. A NodeB, which is generally a fixed station, may also be referred to as an access point or other equivalent terminology such as eNodeB. The access network including the NodeB as related to 3GPP LTE is called as E-UTRAN (Evolved Universal Terrestrial Access Network).

SUMMARY

The present disclosure relates to a pre-5th-Generation or 5G communication system to be provided for supporting vehicle to vehicle communication. Embodiments of the present disclosure provide transmission structures and format in advanced communication systems.

In one embodiment, a first user equipment (UE) in a wireless communication system is provided. The first UE comprises a transceiver configured to receive, from a second UE via a sidelink, signals including information to select resources for at least one of aperiodic traffic or periodic traffic. The first UE further comprises a processor operably connected to the transceiver, the processor configured to: decode sidelink control information (SCI) from the information included in the signals; perform, over a sensing window, a signal measurement of the received signals; identify a resource selection window based on a latency requirement; and reserve the resources for the at least one of aperiodic traffic or periodic traffic in a frequency domain and a time domain based on the decoded SCI and a result of the signal measurement, the resources being identified within a resource selection window. The UE further comprises the transceiver configured to transmit, to the second UE via the sidelink, the at least one of aperiodic traffic or periodic traffic using the reserved resources.

In another embodiment, a second user equipment (UE) in a wireless communication system is provided. The second UE comprises a transceiver configured to: transmit, to a first UE via a sidelink, signals including information to select resources for at least one of aperiodic traffic or periodic traffic, receive, from the first UE, the at least one of aperiodic traffic or periodic traffic using resources, wherein: sidelink control information (SCI) from the information included in the signals is decoded, a signal measurement of the transmitted signals, over a sensing window, is performed, a resource selection window is identified based on a latency requirement, and the resources are reserved for the at least one of aperiodic traffic or periodic traffic in a frequency domain and a time domain based on the decoded SCI and a result of the signal measurement, the resources being identified within a resource selection window.

In yet another embodiment, a method of a first user equipment (UE) in a wireless communication system is provided. The method comprises: receiving, from a second UE via a sidelink, signals including information to select resources for at least one of aperiodic traffic or periodic traffic; decoding sidelink control information (SCI) from the information included in the signals, performing, over a sensing window, a signal measurement of the received signals; identifying a resource selection window based on a latency requirement; reserving the resources in for the at least one of aperiodic traffic or periodic traffic in a frequency domain and a time domain based on the decoded SCI and a result of the signal measurement, the resources being identified within a resource selection window; and transmitting, to the second UE via the sidelink, the at least one of aperiodic traffic or periodic traffic using the reserved resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 39, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.913 v14.3.0, "Study on Scenarios and Requirements for Next Generation Access Technologies;" 3GPP TR 22.886 v15.1.0, "Study on enhancement of 3GPP Support for 5G V2X Services;" ETSI EN 301 893, Harmonized European Standard, "Broadband Radio Access Networks (BRAN); 5 GHz high performance RLAN;" 3GPP TR 36.889 v13.0.0, "Study on Licensed-Assisted Access to Unlicensed Spectrum;" and 3GPP TS 38.300 v15.4.0, "NR and NG-RAN Overall Description."

Figure 1:
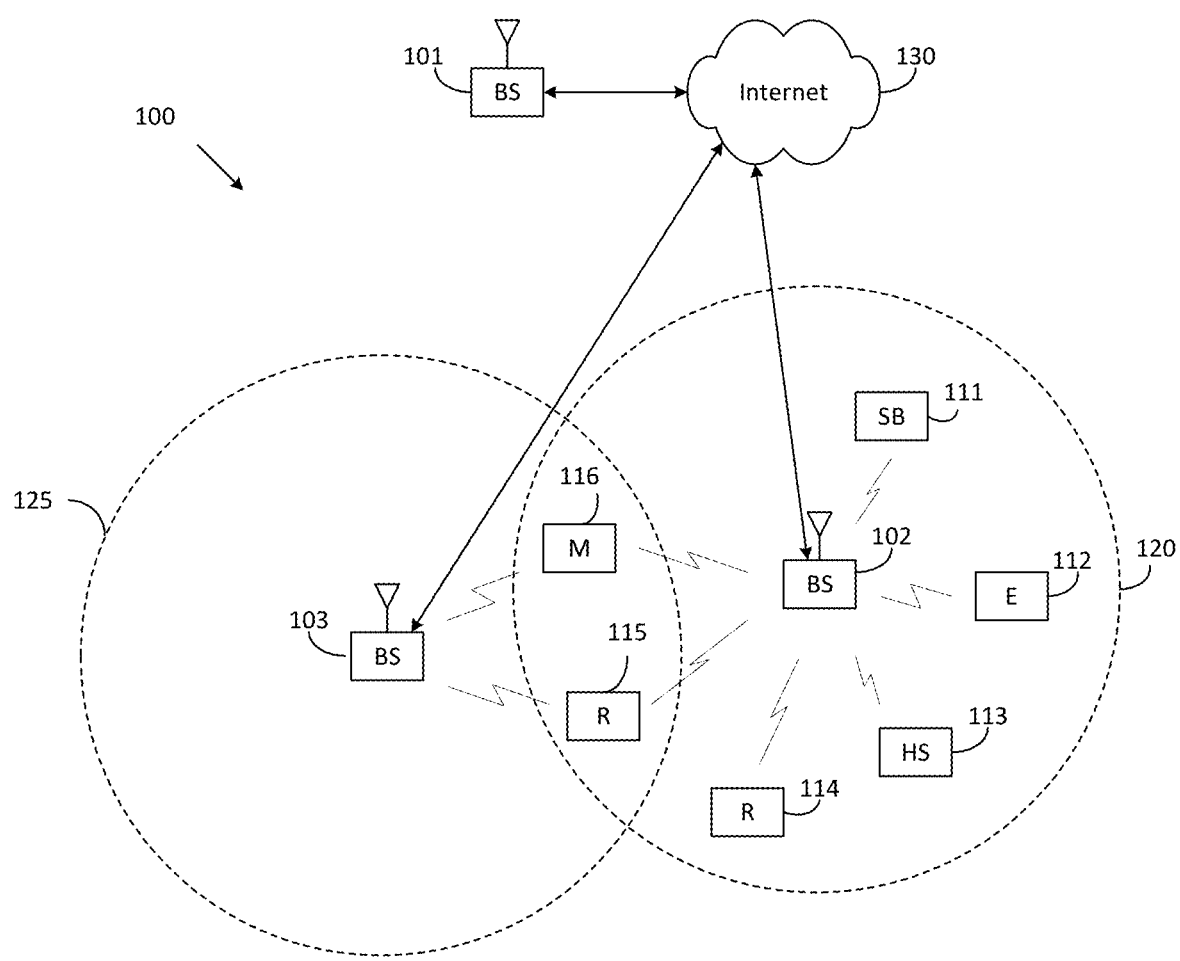
FIG. 1 illustrates an example wireless network according to embodiments of the present disclosure.
Figure 2:
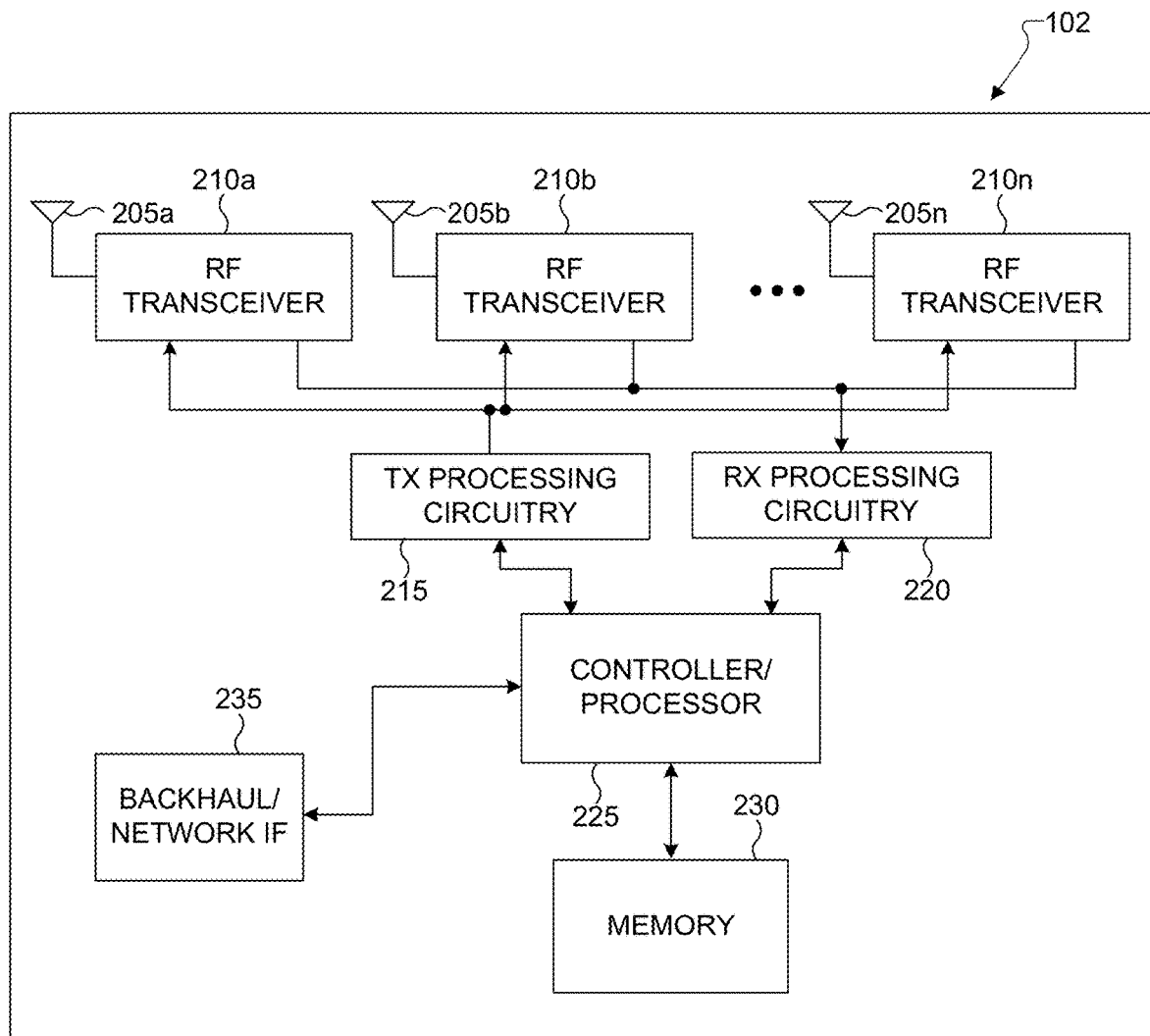
FIG. 2 illustrates an example gNB according to embodiments of the present disclosure.
Figure 3:
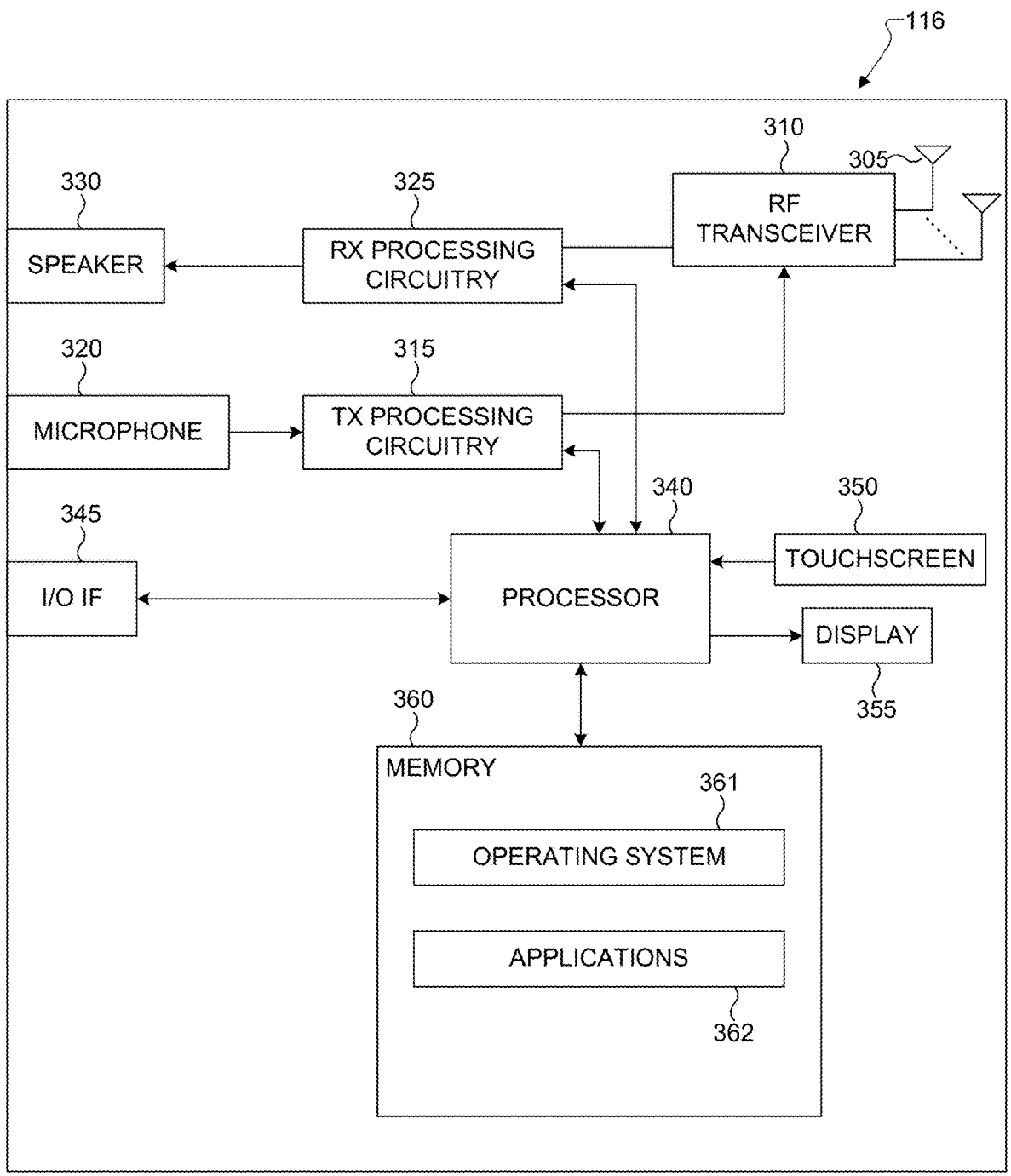
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient resource selection in vehicle to vehicle communication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to vehicular communication network protocols, including vehicle-to-device, vehicle-to-vehicle, and vehicle-to-network communication resource allocation and synchronization schemes. A communication system includes a downlink (DL) that conveys signals from transmission points such as base stations (BSs) or NodeBs to user equipments (UEs) and an uplink (UL) that conveys signals from UEs to reception points such as NodeBs.

Additionally a sidelink (SL) may convey signals from UEs to other UEs or other non-infrastructure based nodes. A UE, also commonly referred to as a terminal or a mobile station, may be fixed or mobile and may be a cellular phone, a personal computer device, etc. A NodeB, which is generally a fixed station, may also be referred to as an access point or other equivalent terminology such as eNodeB. The access network including the NodeB as related to 3GPP LTE is called as an evolved universal terrestrial access network (E-UTRAN).

In a communication system, DL signals can include data signals conveying information content, control signals conveying DL control information (DCI), and reference signals (RS) that are also known as pilot signals. A NodeB transmits data information through a physical DL shared channel (PDSCH). A NodeB transmits DCI through a physical DL control channel (PDCCH) or an enhanced PDCCH (EPDCCH). Messages are transmitted on the PDCCH using a cell radio network temporary identifier (C-RNTI) to identify the intended UE. The C-RNTI is the RNTI to be used by a given UE while the UE is in a particular cell after the UE and a NodeB establish an RRC connection.

A NodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, a NodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a sub-frame (SF) and can have, for example, duration of 1 millisecond. A number of ten SFs is referred to as a frame and is identified by a system frame number (SFN).

Traditionally, cellular communication networks have been designed to establish wireless communication links between mobile devices (UEs) and fixed communication infrastructure components (such as base stations or access points) that serve UEs in a wide or local geographic range. However, a wireless network can also be implemented by utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices.

Figure 4:
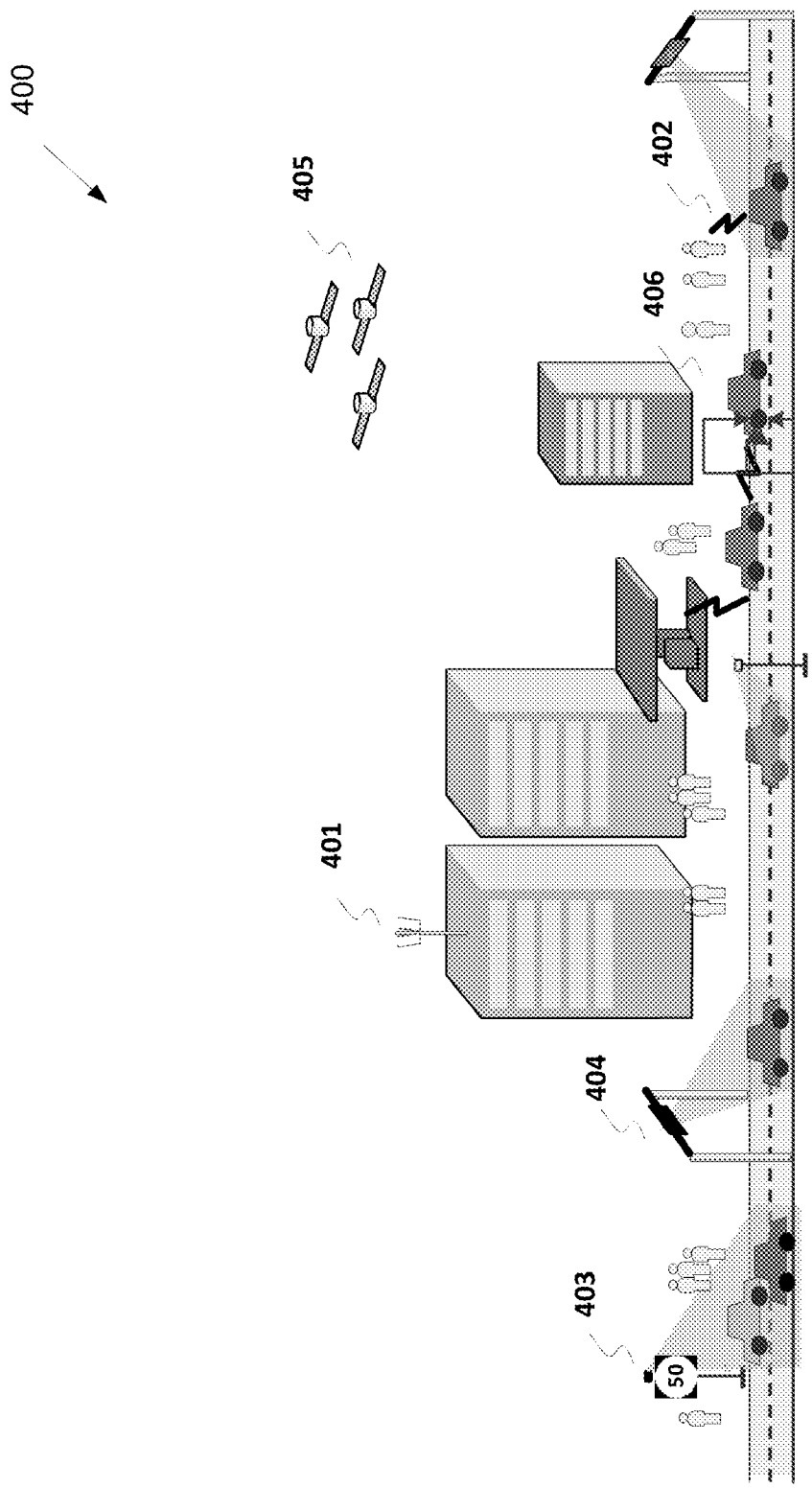
FIG. 4 illustrates an example use case of a vehicle-centric communication network according to embodiments of the present disclosure.

While UEs such as smartphones can be envisioned for D2D networks, vehicular communication can also be supported by a communication protocol where vehicles exchange control or data information with other vehicles or other infrastructure or UEs. Such a network is referred to as a V2X network. Multiple types of communication links can be supported by nodes supporting V2X in the network and can utilize same or different protocols and systems. FIG. 4 illustrates an example use case of a vehicle-centric communication network according to illustrative embodiments of the present disclosure.

FIG. 4 illustrates an example use case of a vehicle-centric communication network 400 according to embodiments of the present disclosure. The embodiment of the use case of a vehicle-centric communication network 400 illustrated in FIG. 4 is for illustration only. FIG. 4 does not limit the scope of the present disclosure to any particular implementation.

The vehicular communication, referred to as Vehicle-to-Everything (V2X), contains the following three different types: vehicle-to-vehicle (V2V) communications; vehicle-to-infrastructure (V2I) communications; and vehicle-to-pedestrian (V2P) communications.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

V2X communication can be used to implement several types of services that are complementary to a primary communication network or to provide new services based on a flexibility of a network topology. V2X can support unicasting, broadcasting, or group/multicasting as potential means for V2V communication where vehicles are able to transmit messages to all in-range V2V-enabled devices or to a subset of devices that are members of particular group. The protocol can be based on LTE-D2D or on a specialized LTE-V2V protocol.

As illustrated in FIG. 4, V2X can support V2I communication 401 between one or more vehicles and an infrastructure node to provide cellular connectivity as well as specialized services related to control and safety of vehicular traffic. V2P communication 402 can also be supported, for example to provide safety services for pedestrians or traffic management services. V2X multicast communication 403 can be used to provide safety and control messages to large numbers of vehicles in a spectrally efficient manner.

The two primary standardized messages for V2V/V2I communication are the periodic beacons called cooperative awareness messages (CAM) and the event-triggered warning messages, called decentralized environment notification messages (DENM). The CAMs are periodically broadcasted beacons used to maintain awareness of the surrounding vehicles. These messages are sent with an adaptive frequency of 1-10 Hz. The CAMs include information such as position, type and direction. The DENMs are event-triggered warning messages which are generated to alert neighboring vehicles about potential hazards.

While vehicle devices can be able to support many different communication protocols and include support of mandatory or optional features, since the traffic types, QoS requirements, and deployment topologies are distinct from other types of communications, the hardware/software on a vehicle for supporting V2X can have a reduced or specialized functionality compared to other devices. For example, protocols related to low-complexity, low-data rate, and/or low-latency for machine-type communications 404 can be supported such as, for example, traffic tracking beacons. Satellite-based communication 405 can also be supported for V2X networks for communication or positioning services.

Direct communication between vehicles in V2V is based on a sidelink (SL) interface. Sidelink is the UE to UE interface for SL communication and SL discovery. The SL corresponds to the PC5 interface. SL communication is defined as a functionality enabling proximity services (ProSe) direct communication between two or more nearby UEs using E-UTRA technology but not traversing any network node.

E-UTRAN allows such UEs that are in proximity of each other to exchange V2V-related information using E-UTRA (N) when permission, authorization and proximity criteria are fulfilled. The proximity criteria can be configured by the MNO. However, UEs supporting V2V Service can exchange such information when served by or not served by E-UTRAN which supports V2X Service. The UE supporting V2V applications transmits application layer information (e.g., about the UE's location, dynamics, and attributes as part of the V2V Service).

The V2V payload may be flexible in order to accommodate different information contents, and the information can be transmitted periodically according to a configuration provided by the MNO. V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

Figure 5:
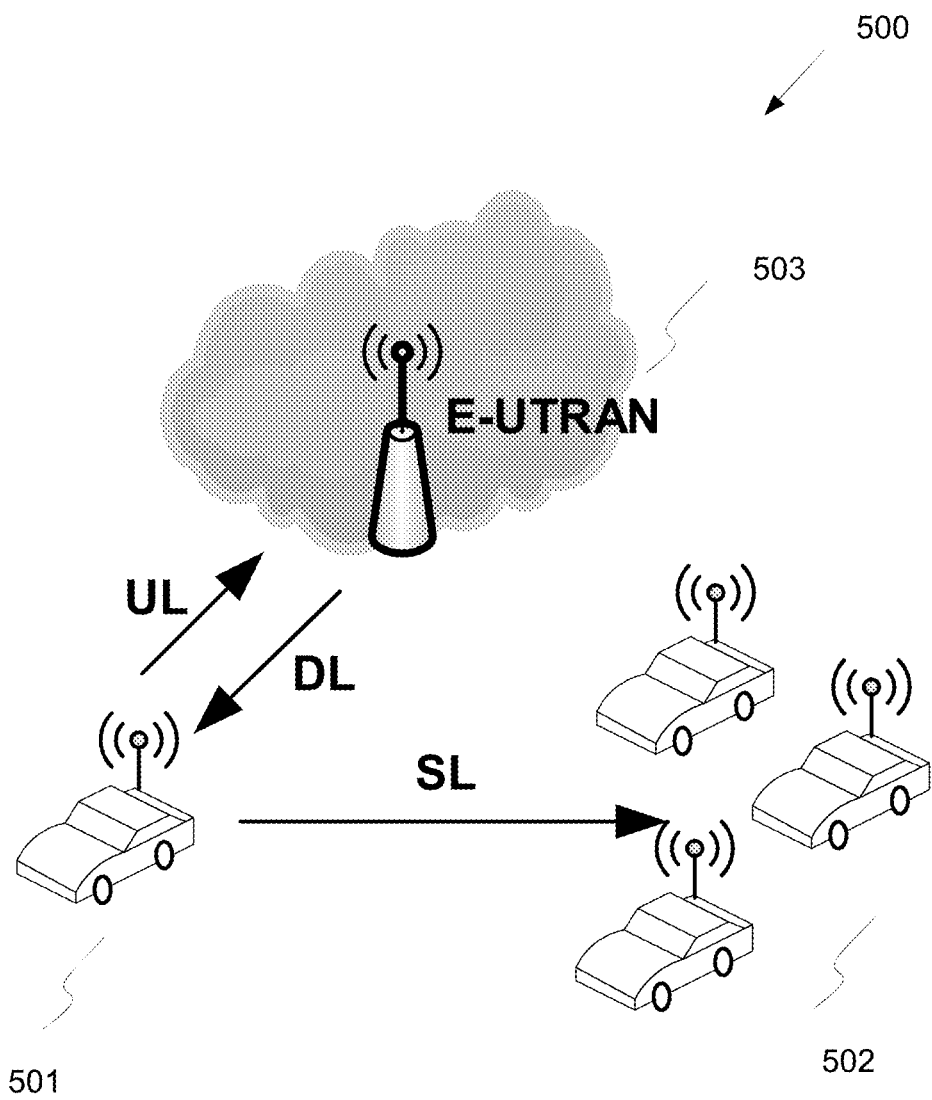
FIG. 5 illustrates an example SL interface according to embodiments of the present disclosure.

FIG. 5 illustrates an example SL interface 500 according to embodiments of the present disclosure. The embodiment of the SL interface 500 illustrated in FIG. 5 is for illustration only. FIG. 5 does not limit the scope of the present disclosure to any particular implementation.

FIG. 5 illustrates an example SL interface according to illustrative embodiments of the present disclosure. While UL designates the link from UE 501 to NodeB 503 and DL designates the reverse direction, SL designates the radio links over the PC5 interfaces between UE 501 and UEs 502. A UE 501 transmits a V2V message to multiple UEs 502 in the SL. SL communication happens directly without using E-UTRAN technology and not traversing any network node NodeB 503.

The PC5 interface re-uses existing frequency allocation, regardless of the duplex mode (frequency division duplex (FDD) or time division duplex (TDD). To minimize hardware impact on a UE and especially on the power amplifier of the UE, transmission of V2V links occurs in the UL band in case of FDD. Similar, the PC5 interface uses SFs that are reserved for UL transmission in TDD. The signal transmission is based on single carrier frequency division multiple access (SC-FDMA) that is also used for UL transmission. The new channels can be largely based on the channel structure applicable for the transmission of the physical UL shared channel (PUSCH).

SL transmission and reception occurs with resources assigned to a group of devices. A resource pool (RP) is a set of resources assigned for sidelink operation. It consists of the subframes and the resource blocks within the subframe. For SL communication, two additional physical channels are introduced: physical sidelink control channel (PSCCH) carrying the control information, and physical sidelink shared channel (PSSCH) carrying the data.

Figure 6:
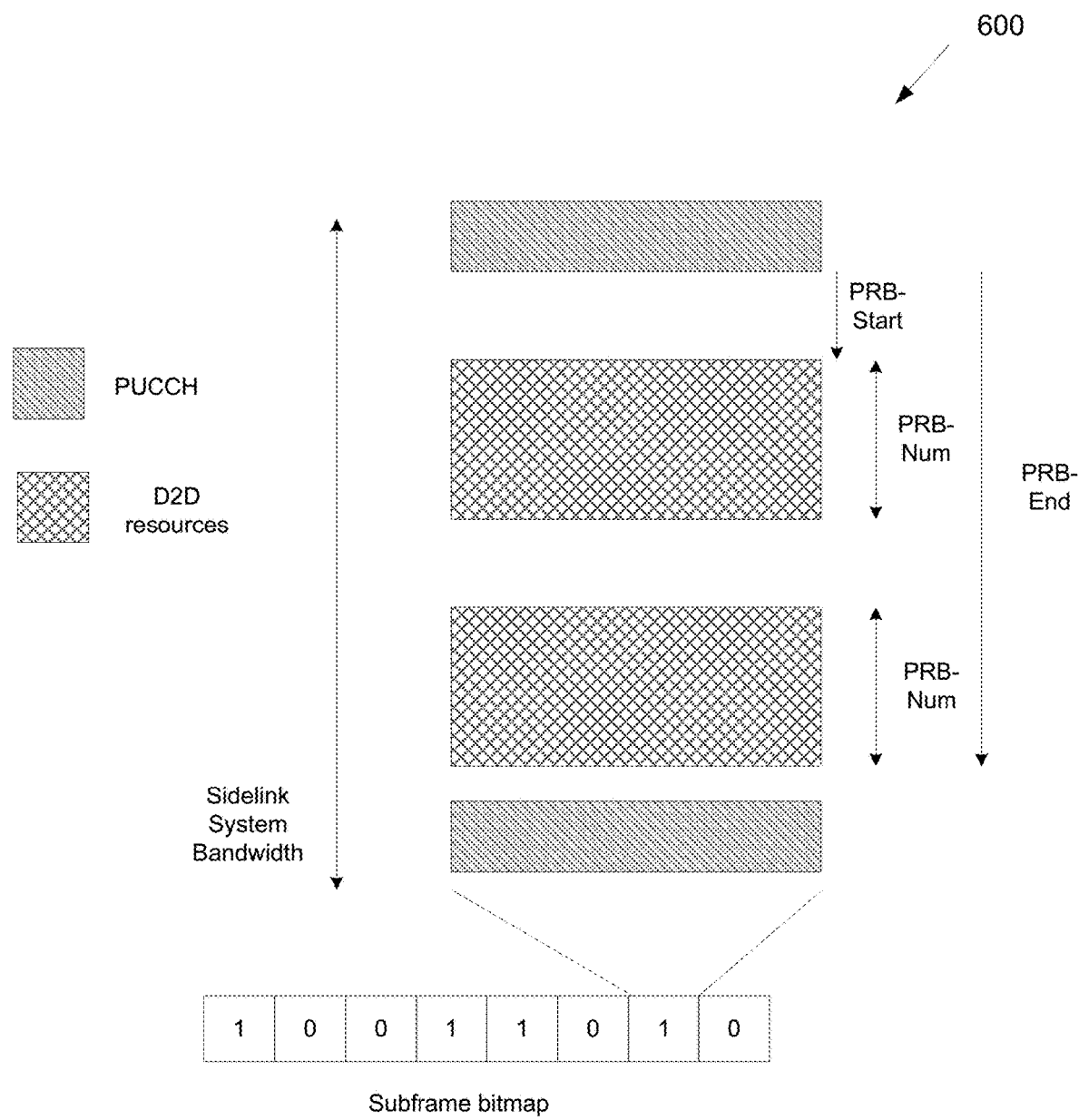
FIG. 6 illustrates an example resource pool for PSCCH according to embodiments of the present disclosure.

FIG. 6 illustrates an example resource pool for PSCCH 600 according to embodiments of the present disclosure. The embodiment of the resource pool for PSCCH 600 illustrated in FIG. 6 is for illustration only. FIG. 6 does not limit the scope of the present disclosure to any particular implementation.

FIG. 6 illustrates an example resource pool for PSCCH according to illustrative embodiments of the present disclosure. In one example, the pool is defined in the frequency, by parameters: PRBnum: that defines the frequency range in Physical Resource Block (PRB) bandwidth units; and PRBstart, PRBend: which defines the location in the frequency domain within the uplink band. In one example, the pool is defined in the time domain, by a bitmap that indicates the 1 msec sub-frames used for PSCCH transmission.

This block of resources is repeated with a period defined by a parameter SC-Period (expressed in sub-frame duration, i.e. 1 msec). The range of possible values for SC-Period is from 40 msec to 320 msec: low values are supported for voice transmission.

In LTE V2X, the data transmission on sidelink does not support HARQ. There is no ACK or NACK feedback for a PSSCH transmission. To improve the transmission reliability, retransmission is one good approach.

Figure 7:
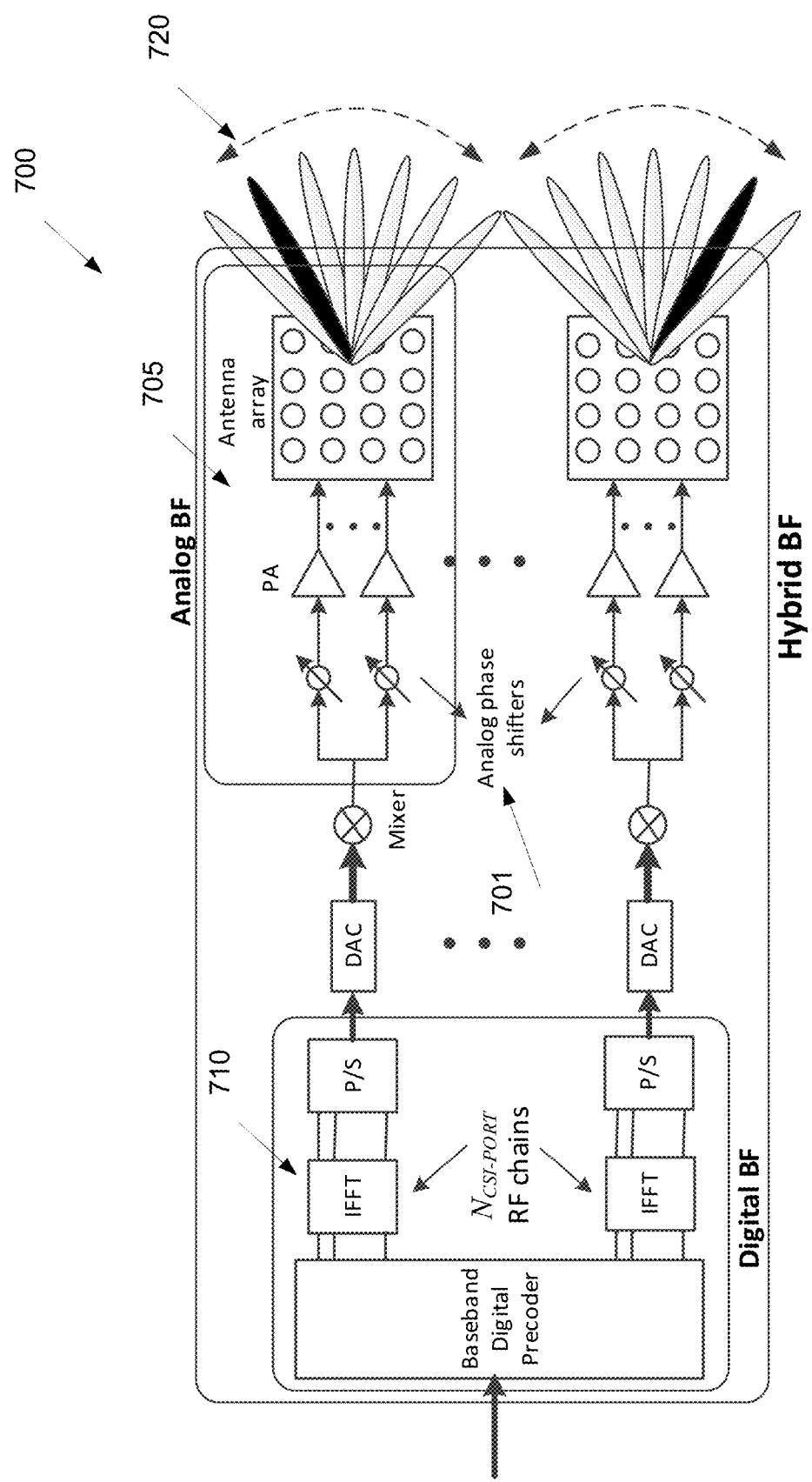
FIG. 7 illustrates an example RF chain according to embodiments of the present disclosure.

FIG. 7 illustrates an example RF chain 700 according to embodiments of the present disclosure. The embodiment of the RF chain 700 illustrated in FIG. 7 is for illustration only. FIG. 7 does not limit the scope of the present disclosure to any particular implementation.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles (720) by varying the phase shifter bank across symbols or subframes. The number of sub-arrays (equal to the number of RF chains) is the same as the number of CSI-RS ports NCSI-PORT. A digital beamforming unit 710 performs a linear combination across NCSI-PORT analog beams to further increase precoding gain. While analog beams are wideband (hence not frequency-selective), digital precoding can be varied across frequency sub-bands or resource blocks.

5G NR systems aim to support multiple services such as eMBB, mMTC and uRLLC with advanced features including higher data rate, higher operating frequency band, wider bandwidth, higher reliability, shorter latency, and increased a number of connectivity.

A vehicular communication, referred to as vehicle-to-everything (V2X), contains the following three different types: 1) vehicle-to-vehicle (V2V) Communications; 2) vehicle-to-infrastructure (V2I) communications; and 3) vehicle-to-pedestrian (V2P) Communications. These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

The LTE-V standard includes two radio interfaces. The cellular interface (i.e., Uu) supports vehicle-to-infrastructure communications, while the PC5 interface supports V2V communications based on direct LTE sidelink. LTE sidelink (or device-to-device communication) was introduced for the first time for public safety, and includes two modes of operation: mode 1 and mode 2. Both modes were designed with the objective of prolonging the battery lifetime of mobile devices at the cost of increasing the latency. Connected vehicles require highly reliable and low-latent V2X communications; therefore, modes 1 and 2 are not suitable for vehicular applications.

Two new communication modes (modes 3 and 4) are introduced and specifically designed for V2V communications. In mode 3, the cellular network selects and manages the radio resources used by vehicles for their direct V2V communications. In mode 4, vehicles autonomously select the radio resources for their direct V2V communications. In contrast, mode 4 can operate without cellular coverage, and is therefore considered the baseline V2V mode since safety applications cannot depend on the availability of cellular coverage. Mode 4 includes a distributed scheduling scheme for vehicles to select their radio resources and includes the support for distributed congestion control.

SA1 has completed enhancement of 3GPP support for V2X services (eV2X services). SA1 has identified 25 use cases for advanced V2X services and the 25 use cases are categorized into four use case groups: vehicles platooning, extended sensors, advanced driving and remote driving. Compared with LTE V2X, the NR V2X requirements need to support much lower end-to-end latency (as low as 3 ms), much higher reliability (as high as 99.999%), much higher data rates (as high as 1 Gbps) and much larger communication range.

Use of a listen-before-talk (LBT) procedure is vital for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. Thus, any LBT procedure involves at least energy detection to determine if the channel is being used.

The LBT scheme defined in the present disclosure is based on the procedure in option B in 3GPP specification except for the following modifications to form a category 4 LBT scheme that ensure fairness with Wi-Fi: the size of the LAA contention window is variable via dynamic variable backoff or semi-static backoff between X and Y ECCA slots; one candidate for variation of the contention window is exponential backoff and it may be noted that most of evaluations are based on exponential backoff; the value of X and Y is a configurable parameter; for PDSCH, the following two approaches to adjust the contention window size may be considered and it may be noted that a combination of the options listed below is not precluded; based on feedback/report of UE(s) (e.g., HARQ ACK/NACK); based on eNB's assessment (e.g., sensing based adjustment); consider minimum ECCA slot size smaller than 20 μs; the initial CCA (ICCA) can be configurable to be comparable to the defer periods of Wi-Fi (e.g., DIFS or AIFS); when ECCA countdown is interrupted, a defer period (not necessarily the same as ICCA) is applied after channel becomes idle. No ECCA countdown is performed during the defer period; the defer period is configurable. It can be configured to be comparable to defer periods of Wi-Fi (e.g., DIFS or AIFS); and initial CCA is performed to transmit a DL transmission burst when the eNB has not transmitted any signal/channel although the random backoff counter reached zero in the backoff procedure.

Adaptability of the energy detection threshold can be applied. In the above procedure, defer period is defined as the minimum time that a node has to wait after the channel becomes idle before transmission, i.e., a node can transmit if the channel is sensed to be idle for a time period not less than the defer period. The procedure described above is shown in FIG. 8.

Figure 8:
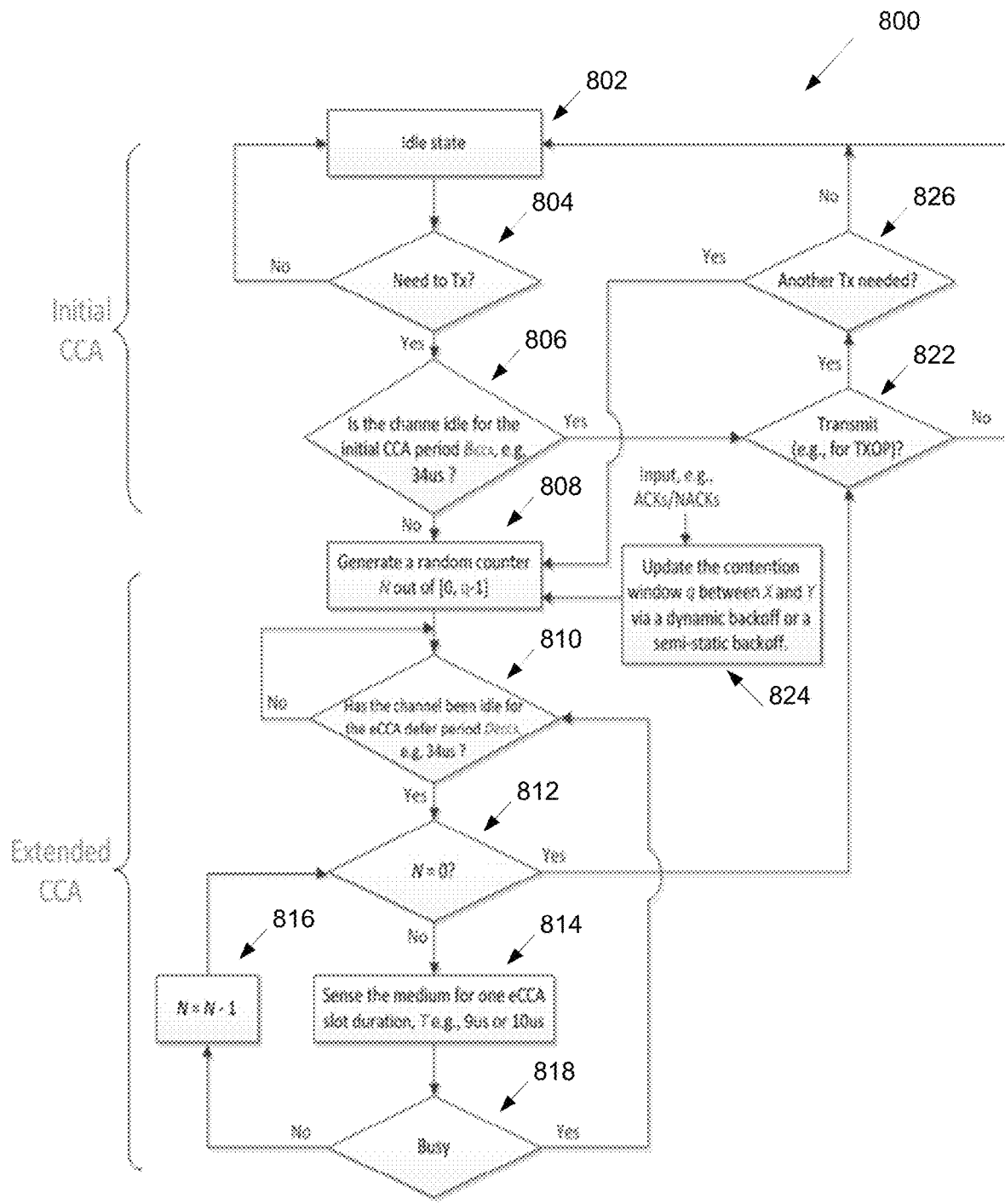
FIG. 8 illustrates a flow chart of a method for DL LAA SCell Cat 4 LBT procedure according to embodiments of the present disclosure.

FIG. 8 illustrates a flow chart of a method 800 for DL LAA SCell Cat 4 LBT procedure according to embodiments of the present disclosure. The embodiment of the method 800 illustrated in FIG. 8 is for illustration only. FIG. 8 does not limit the scope of the present disclosure to any particular implementation.

In order to support aperiodic service, lower latency, higher reliability, mixed numerology and short TTIs in NR V2X. There are a few embodiments for the resource selection in the present disclosure.

In one embodiment, optimized autonomous resource selection is provided.

The following is for improvements on current LTE V2X autonomous resource selection (mode 4) in V2X sidelink.

Preemption Indication.

For a UE autonomous resource selection in a stricter latency application, if no candidate single-subframe resource in the selection window can be successfully sensed to satisfy the latency requirements, a preemption indication can be sent out first to indicate to other UEs the candidate single-subframe resource that the UE needs to use and can satisfy the latency requirements.

In order for a UE to preempt a resource reserved by another UE, the packet that the UE needs to send may have a higher priority than those packets of another UE. The service of the UE that preempts can be periodic or aperiodic. For aperiodic service, the preempted resource can be a few consecutive subframes. For periodic service, the preempted resource can be a group of periodic resources for duration of time.

Figure 9A:
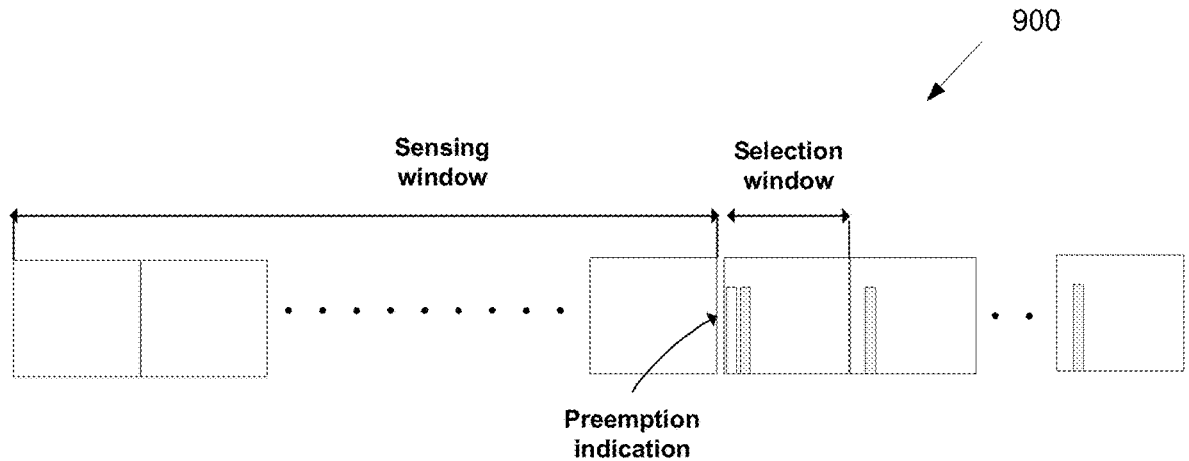
FIG. 9A illustrates an example preemption indication according to embodiments of the present disclosure.

FIG. 9A illustrates an example preemption indication 900 according to embodiments of the present disclosure. The embodiment of the preemption indication 900 illustrated in FIG. 9A is for illustration only. FIG. 9A does not limit the scope of the present disclosure to any particular implementation.

FIG. 9A shows an example where a preemption indication is sent by a UE to notify other UEs that the resource may be preempted in the following periodic cycles.

Figure 9B:
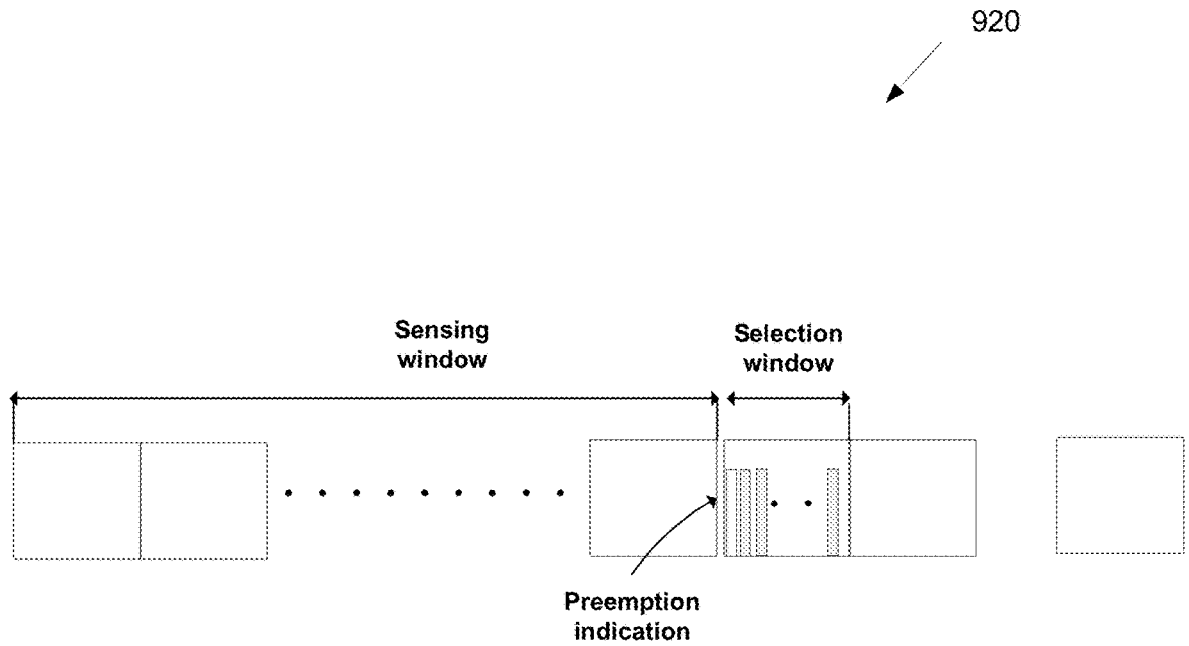
FIG. 9B illustrates another example preemption indication according to embodiments of the present disclosure.

FIG. 9B illustrates another example preemption indication 920 according to embodiments of the present disclosure. The embodiment of preemption indication 920 illustrated in FIG. 9B is for illustration only. FIG. 9B does not limit the scope of the present disclosure to any particular implementation.

FIG. 9B shows an example where a preemption indication is sent by a UE to notify other UEs that the resource may be preempted in a few consecutive subframes.

The preemption indication can be in the form of a PSCCH or another special form of SCI. The UE whose candidate single-subframe is preempted by the UE with stricter latency requirement may either drop the packet or trigger a new resource reselection etc. For a special form of SCI, the SCI can be used to transmit a preemption indication while no PSCCH/PSSCH associated with this preemption indication is sent. For a form of PSCCH, the associated PSSCH is sent along with the PSCCH.

In order to support a special form of preemption indication to indicate resources to be preempted by a UE, separate sensing mechanisms for preemption indication and PSCCH/PSSCH channels can be supported. That means resources used for a preemption indication can be sensed separately with the resources sensed for PSCCH/PSSCH.

For a preemption indication that indicates some resources may be preempted by a UE, a separate or same resource pool as the resource pool of PSCCH and PSSCH can be configured. When a separate resource pool is used, the sensing for the preemption indication occurs in a separate resource pool as PSCCH and PSSCH. While a same resource pool is used, the sensing for the preemption indication occurs in the same resource pool as PSCCH and PSSCH.

The information conveyed in the preemption indication can include one of the following or a combination of the following: (maximum) channel occupancy time: it shows for how long the UE may reserve the preempted resource for this bursty transmission for aperiodic traffic or how many periodic cycles that the UE needs to reserve the resource and the periodicity of the reserved resource for the UE for periodic transmission; frequency resource location: it shows the resource location in frequency domain; and/or priority information: priority information of the packets that the preempting UE may send.

If there are more than one resource that the UE can choose from to preempt, some options to determine the resources that the UE may preempt are as below. In one embodiment of option 1, the UE may use the resources that overlap with minimum number of other UEs in the frequency domain. In another embodiment of option 2, the UE may use the resources that have minimum average energy in the frequency domain. In yet another embodiment of option 3, the UE may use the resources that overlap with minimum number of other UEs in the time domain. In yet another embodiment of option 4, the UE may use the resources that overlap with minimum number of other UEs both in the time domain and frequency domain.

In order for a UE better sense a resource for transmission, the resource selection counter can be carried in the SCI to indicate other UEs how long the resource may be reserved periodically after this transmission for a UE.

Resource Pool.

Different resource pools are configured for applications with different latency requirements, e.g., a separate resource pool for latency sensitive applications and a separate resource pool for regular V2X application.

Figure 10:
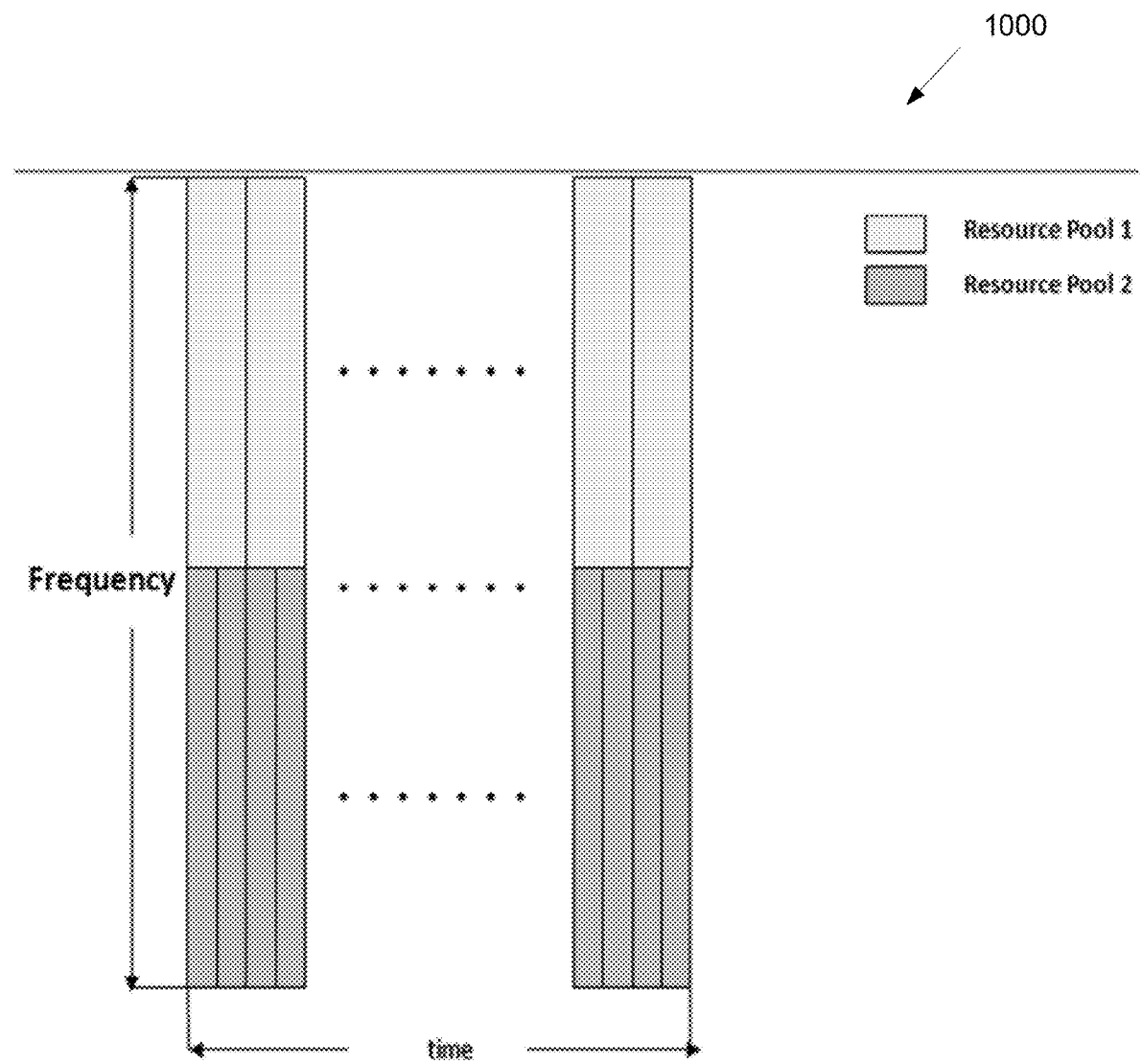
FIG. 10 illustrates an example resource pool according to embodiments of the present disclosure.

FIG. 10 illustrates an example resource pool 1000 according to embodiments of the present disclosure. The embodiment of the resource pool 1000 illustrated in FIG. 10 is for illustration only. FIG. 10 does not limit the scope of the present disclosure to any particular implementation.

For mixed SCS numerology, resource pools for latency sensitive applications are configured in resource blocks with a larger SCS, while resource pools for regular V2X applications are configured in resource blocks with a smaller SCS, as shown in FIG. 10. Different resource pools can be configured for different lengths of TTI.

A resource pool configuration can include the numerology of the resource pool, and/or TTI length, and/or the frequency resource location, and/or resource pool ID etc.

The sensing window, selection window and sensing procedures can be different compared with periodic resource selection, e.g., the size of sensing and selection window can be configured by a gNB or preconfigured with a smaller value.

Mixed Short TTI and Normal TTI.

Short TTI is used to further reduce the latency for stricter latency applications. Short TTI application and normal TTI application can use the same resource pool or different resource pools. A stricter latency application can use a resource pool with a short TTI. A preemption indication can occur in a resource pool with a short TTI.

Figure 11:
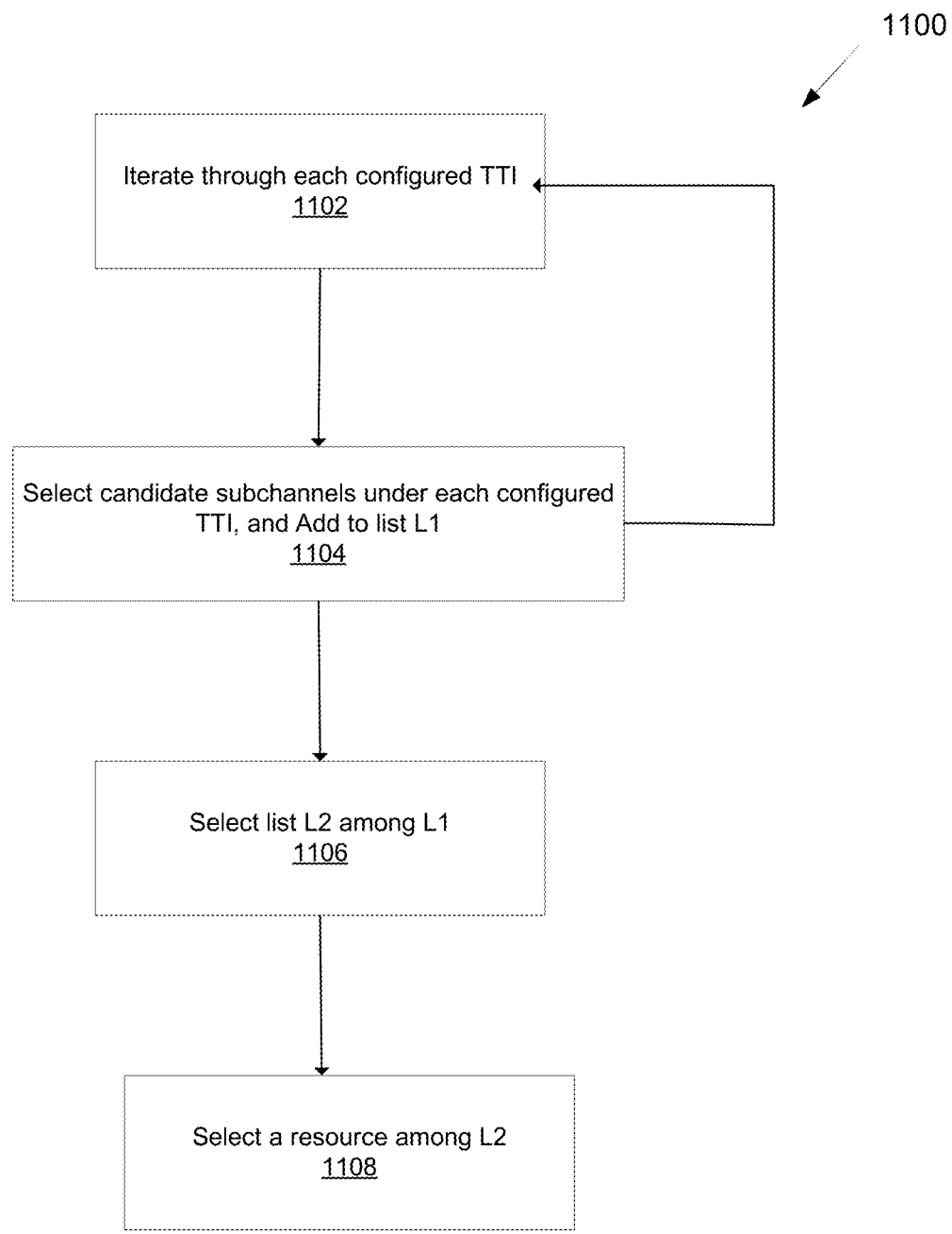
FIG. 11 illustrates an example sensing procedure according to embodiments of the present disclosure.

FIG. 11 illustrates an example sensing procedure 1100 according to embodiments of the present disclosure. The embodiment of the sensing procedure 1100 illustrated in FIG. 11 is for illustration only. FIG. 11 does not limit the scope of the present disclosure to any particular implementation.

When a separate resource pool is used for short TTI and normal TTI applications, the corresponding sensing procedure is used for each resource pool. When the same resource pool is used for short TTI and normal TTI applications, the sensing procedures may be adapted as follows and shown in FIG. 11.

In one embodiment of step 1: suppose that a UE with a reservation interval Tp needs to reserve new candidate subchannels at time (T). It can reserve subchannels between T and the established maximum latency (e.g., K). This time period is referred to as the selection window. Within the selection window, the UE identifies candidate subchannel resources to be reserved by all groups of adjacent subchannels within the same TTI where the SCI and TB to be transmitted may fit.

In one embodiment of step 2: for each configured TTI length, the UE analyzes all the information that the UE has received in the Ni TTIs before T and creates a list (L1) of candidate subchannels the UE could reserve. This list includes all the candidate subchannels in the selection window except those that meet the following two conditions.

In one example, in the last Ni TTIs, the UE has correctly received an SCI from another UE indicating that it may overlap with this candidate subchannels at the same time the UE may need it to perform following transmissions.

In one example, the UE measures an average reference signal received power (RSBP) over the RBs utilized to transmit the TB associated to the SCI and it is higher than a given threshold.

In one embodiment of step 3: The UE creates a second list (L2) of resources of candidate subchannels. The total number of resources of candidate subchannels in L2 may be equal to a percentage of all resources of candidate subchannels in the selection window. L2 includes the resources of candidate subchannels from L1 (after Step 2) that experienced the lowest average received signal strength indicator (RSSI) over all RBs of the candidate subchannels. This RSSI value is averaged over all the previous T−reserve interval*j, where reserve interval*j≤Ni. The UE randomly chooses one of the resources of candidate subchannels in L2, and reserves one of the resources of candidate subchannels for the next transmissions.

As illustrated in FIG. 11, in step 1102, the procedure 1110 iterates through each configured TTI. In step 1104, the procedure 1110 selects candidate subchannels under each configured TTI, and ands to list L1. In step 1106, the procedure 1110 selects list L2 among the list L1. And finally, the procedure 1110 selects a resource among the list L2.

Retransmission.

Retransmission can be performed with a transmission periodicity less than the resource reservation interval. e.g., consecutive transmissions for a same TB to meet the latency and reliability. SCI in the first transmission can indicate parameters e.g., the number of transmissions for this same TB and the subframe gap between transmissions. SCI in the following retransmissions can indicate parameters e.g., remaining retransmissions for this same TB. Each retransmission SCI indicates the Time gap between this retransmission and next retransmission.

The sensing procedure may consider the resources that may be occupied for retransmissions. More than one candidate subchannels resources may be selected that are used by the UE's first transmission and a few retransmissions.

In one embodiment, autonomous resource selection+LBT with the same resource pool is provided.

LBT (listen before talk) is used by UEs to reserve resources for aperiodic service with bursty traffic. Autonomous resource selection is used by UEs to reserve resource for semi-persistent or periodic service. Autonomous resource selection and LBT are combined to comprise the whole V2X resource selection. In embodiment 2, autonomous resource selection and LBT procedures occur in the same resource pool.

Compared with LBT in LAA and IEEE 802.11, a partial bandwidth sensing may be used for LBT in V2X. Similar to autonomous resource selection, resources of candidate subchannels can be used to reserve only a partial bandwidth resource for a UE.

Figure 12:
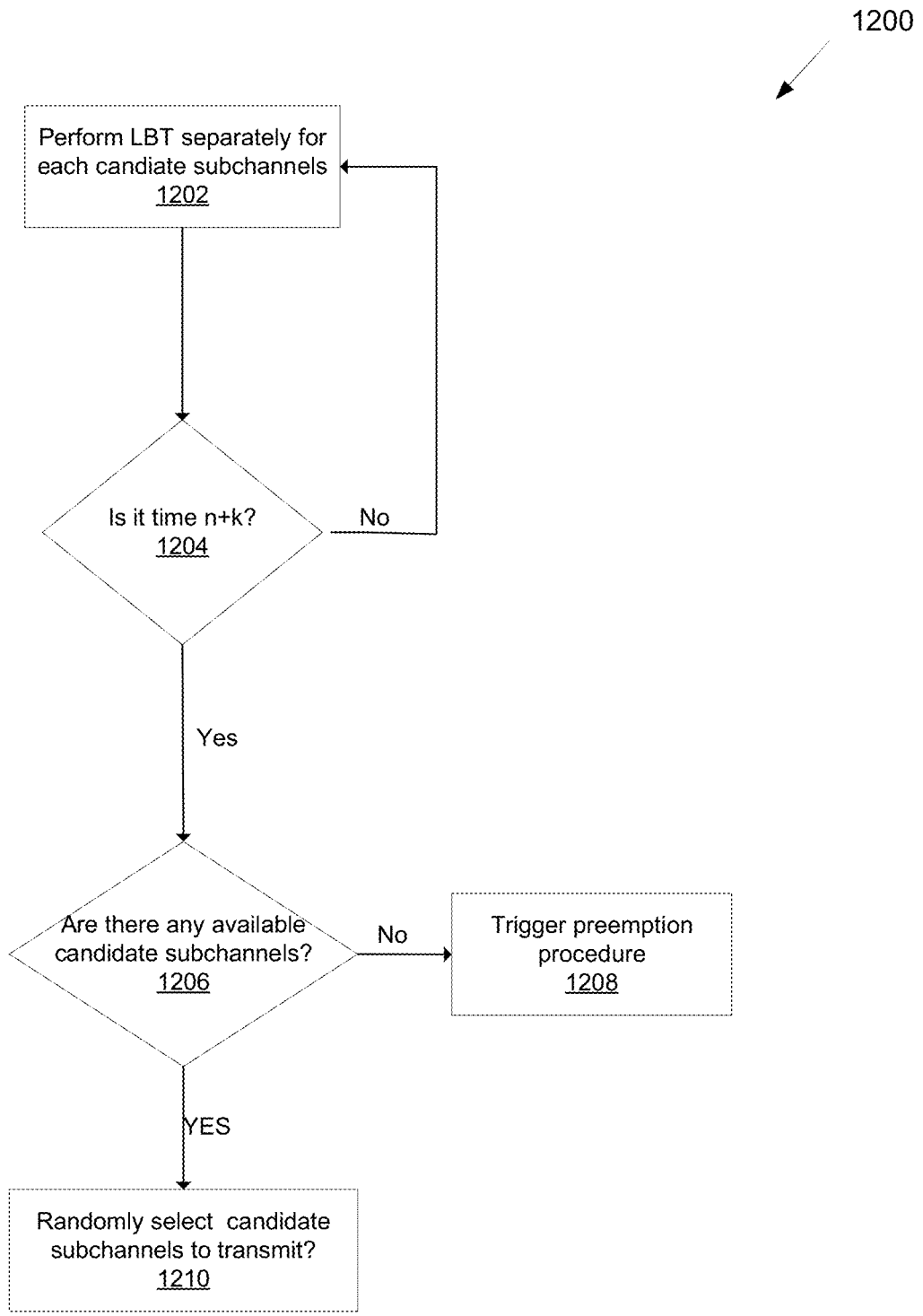
FIG. 12 illustrates an example LBT procedure according to embodiments of the present disclosure.

FIG. 12 illustrates an example LBT procedure 1200 according to embodiments of the present disclosure. The embodiment of the LBT procedure 1200 illustrated in FIG. 12 is for illustration only. FIG. 12 does not limit the scope of the present disclosure to any particular implementation.

One approach for the whole LBT procedure is as followings and shown in FIG. 12. From the time n when there is a higher layer packet arriving, the LBT procedure begins. A candidate subchannels resource for PSSCH transmission $R_x$ is defined as a set of $L_{subCH}$ contiguous sub-channels with sub-channel x+j where j=0, . . . , $L_{subCH}$−1. The UE may assume that any set of $L_{subCH}$ contiguous sub-channels included in the corresponding PSSCH resource pool corresponds to one candidate subchannels resource.

For each candidate subchannels resource for PSSCH transmission, the UE performs the corresponding LBT procedure on corresponding subchannels. When the UE senses the channel, the energy detection can be measured in number of TTIs e.g., 2, 4 or 7 OFDM symbols/1 slot or number of OFDM symbols depending upon specific latency requirements. The content window and The initial CCA (ICCA) and extended CCA deferral period can be in number of TTIs or number of OFDM symbols. The number of TTIs or number of OFDM symbols for energy detection, content window, initial CCA and ECCA deferral period can be configured.

Depending upon the maximum latency requirements, the LBT procedure needs to be terminated at the time n+k, k can be in number of TTIs or number of OFDM symbols and be configured by higher layer or determined by the UE itself considering the latency requirement. When at the time n+k, there is no available candidate subchannels the UE can use to transmit, the preemption indication procedure is triggered as shown in the aforementioned embodiments. If there are more than one resource of candidate subchannels available for the UE to transmit, the UE randomly select an available resource of candidate subchannels to transmit.

As illustrated in FIG. 12, the procedure 1200 performs LBT separately for each candidate subchannels in step 1202. In step 1204, the procedure determines whether time n+k is. In step 1204, if the time is n+k, the procedures performs step 1206. In step 1206, the procedure determines whether there any available candidate subchannels are. In step 1206, if there are any available candidate subchannels, the procedure 1200 randomly selects candidate subchannels to transmit. In step 1204, if the time is not n+k, the procedure 1200 performs step 1202. In step 1206, if there are no any available candidate subchannels, the procedures triggers preemption procedures in step 1208.

Figure 13:
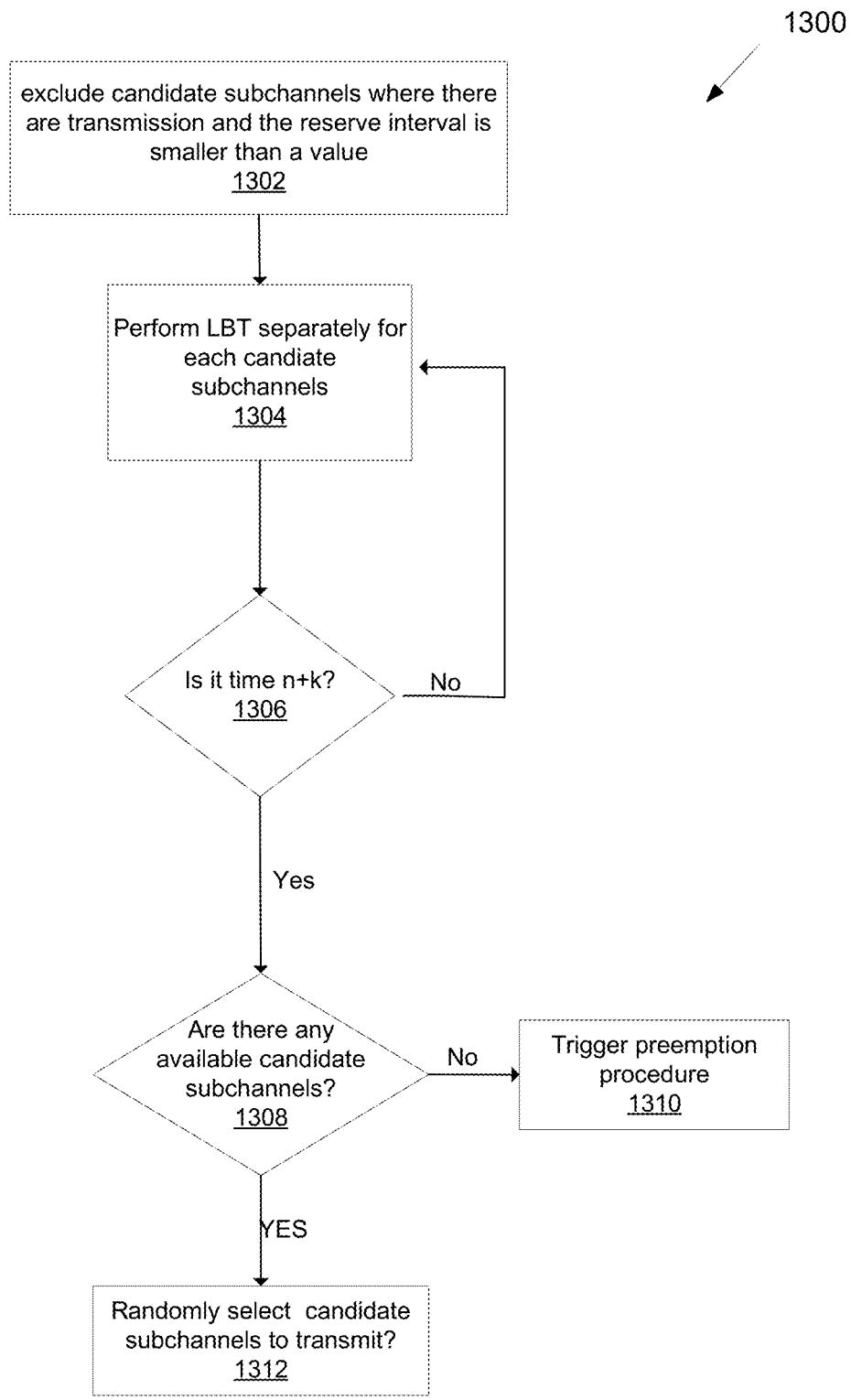
FIG. 13 illustrates another example LBT procedure according to embodiments of the present disclosure.

FIG. 13 illustrates another example LBT procedure 1300 according to embodiments of the present disclosure. The embodiment of the example LBT procedure 1300 illustrated in FIG. 13 is for illustration only. FIG. 13 does not limit the scope of the present disclosure to any particular implementation.

Another approach for the whole LBT procedure is as followings and shown in FIG. 13.

For each candidate subchannels resource for PSSCH transmission, the UE performs the corresponding LBT procedure on corresponding candidate subchannels. Before the UE performs the LBT on each resource of candidate subchannels, the UE excludes resources of candidate subchannels where there are detected SCIs and/or associated data and/or the reservation interval for the candidate subchannels is less than a value, e.g., the (maximum) channel occupancy time. For the candidate subchannel resources, the UE also needs to exclude resources that are known by detected SCIs for aperiodic services.

When the UE senses the channel, the energy detection can be measured in number of TTIs e.g., 2, 4 or 7 OFDM symbols/1 slot or number of OFDM symbols depending upon specific latency requirements. The content window and the initial CCA (ICCA) and extended CCA deferral period can be in number of TTIs or number of OFDM symbols. The number of TTIs or number of OFDM symbols for energy detection, content window, initial CCA and ECCA deferral period can be configured. Depending upon the maximum latency requirements, the LBT procedure needs to be terminated at the time n+k, k can be in number of TTIs or number of OFDM symbols and configured by higher layer or determined by the UE itself considering the latency requirement.

When at the time n+k, there is no available candidate subchannels the UE can use to transmit, the preemption indication procedure is triggered as shown in the aforementioned embodiments. If there are more than one resource of candidate subchannels available for the UE to transmit, the UE randomly select an available resource of candidate subchannels to transmit.

In such embodiment, the same resource pool is used for LBT as well as autonomous resource selection. The UE senses the resource and reserves the resource for a (maximum) channel occupancy time. Priority information is used in the sensing procedure. The following information may be included in the SCI for an aperiodic packet: (Maximum) channel occupancy time: it shows for how long the UE may reserve the reserved/preempted resource for this bursty transmission for aperiodic traffic; frequency resource location: it shows the resource location in frequency domain; and/or priority information: priority information of the packets that the preempting UE may send.

When the resource this UE needs to reserve conflicts with the resource reserved by another semi-persistent UE with lower priority, this UE can preempt the resource with a preemption indication as shown in the aforementioned embodiments. Otherwise, this UE can only select other resources without conflict with another UE with higher priority.

In one embodiment, autonomous resource selection+LBT with different resource pools is provided.

LBT (listen before talk) is used by UEs to reserve resources for aperiodic service with bursty traffic. Autonomous resource selection is used by UEs to reserve resource for semi-persistent or periodic service. Autonomous resource selection and LBT are combined to comprise the whole V2X resource selection procedure. In embodiment 3, autonomous resource selection and LBT procedures occur in different resource pools, and select resources for different services in different resource pools.

The LBT procedure can be the same as one approach in embodiment 2, as the LBT procedure is independent from the autonomous resource selection.

In one embodiment, a gNB centralized resource allocation is provided.

A gNB centralized resource allocation is used to schedule the resource for both aperiodic service and periodic service. If a gNB cannot find adequate resource for a packet with higher priority, preemption procedures can be used and preemption indication can be carried in a DCI format.

Preemption Indication.

One option is the preemption information can be embedded in the DCI format that schedules the resource for the UE in the sidelink interface. Another option is the preemption information is signaled in a separate DCI format. Based upon the preemption information the UE receives, the UE transmit a SCI that carries the preemption indication in the sidelink interface.

The information conveyed in the preemption indication in a DCI format can include one of the following or a combination of the following: (maximum) channel occupancy time: it shows for how long the UE may reserve the preempted resource for this bursty transmission for aperiodic traffic or how many periodic cycles that the UE needs to reserve the resource and the periodicity of the reserved resource for the UE for periodic transmission or semi-persistent transmission; frequency resource location: it shows the resource location in frequency domain; and/or priority information: priority information of the packets that the preempting UE may send.

DCI Format.

A new DCI format may be introduced that considers different lengths of TTI for Uu and sidelink interface, different SCSs for Uu and sidelink interface etc. In addition to the fields in the DCI format 5A used in LTE V2X as copied below, other DCI fields may also be included in the DCI format: resource pool ID: the resource pool ID also indicates the SCS and/or TTI type to be used by the UE for the sidelink resource if a resource pool is configured related to a SCS and/or TTI type; otherwise, fields of TTI and/or SCS type are used to indicate which type of TTI and/or SCS is used by the UE for the sidelink; and/or number of retransmissions: more than one retransmissions are supported in the sidelink transmission.

The time gap and frequency resource location in the DCI format are interpreted according to the configured or indicated SCS and/or TTI type for the sidelink resource allocation.

The following information is transmitted by means of the DCI format 5A. In one example, carrier indicator −3 bits is present. In another example, lowest index of the subchannel allocation to the initial transmission $-\lceil \log_2(N_{subchannel}^{SL}) \rceil$ bits as defined. In yet another example, SCI format 1 fields are provided. In yet another example, frequency resource location of initial transmission and retransmission is provided. In yet another example, a time gap between initial transmission and retransmission is provide. In yet another example, an SL index −2 bits as defined (this field is present only for cases with TDD operation with uplink-downlink configuration 0-6).

When the format 5A CRC is scrambled with SL-SPS-V-RNTI, the following fields are present: SL SPS configuration index −3 bits; and activation/release indication −1 bit.

In one embodiment, LBT for periodic and aperiodic services in the same resource pool is provided.

When periodic and aperiodic services are configured in the same resource pool. LBT may be used in sensing resources for aperiodic services by excluding resources reserved by periodic services as is done in LTE V2X autonomous resource selection.

When LBT for aperiodic services and LTE-mode 4 like resource allocation for periodic services are used together in the same resource pool, there are some interactions between them. In the LTE-mode 4 like resource selection for periodic services, the UE may exclude resources reserved for aperiodic services. The SCI for aperiodic services may indicate the time duration the resources are reserved. When the SCI is not correctly decoded, the UE that performs the sensing cannot know how long the resources are reserved for aperiodic services, and may select candidate resources with minimum energy measurements in the sensing window. It may have a high probability that a resource reserved for aperiodic services is selected and may degrade the resource selection performance.

Figure 14:
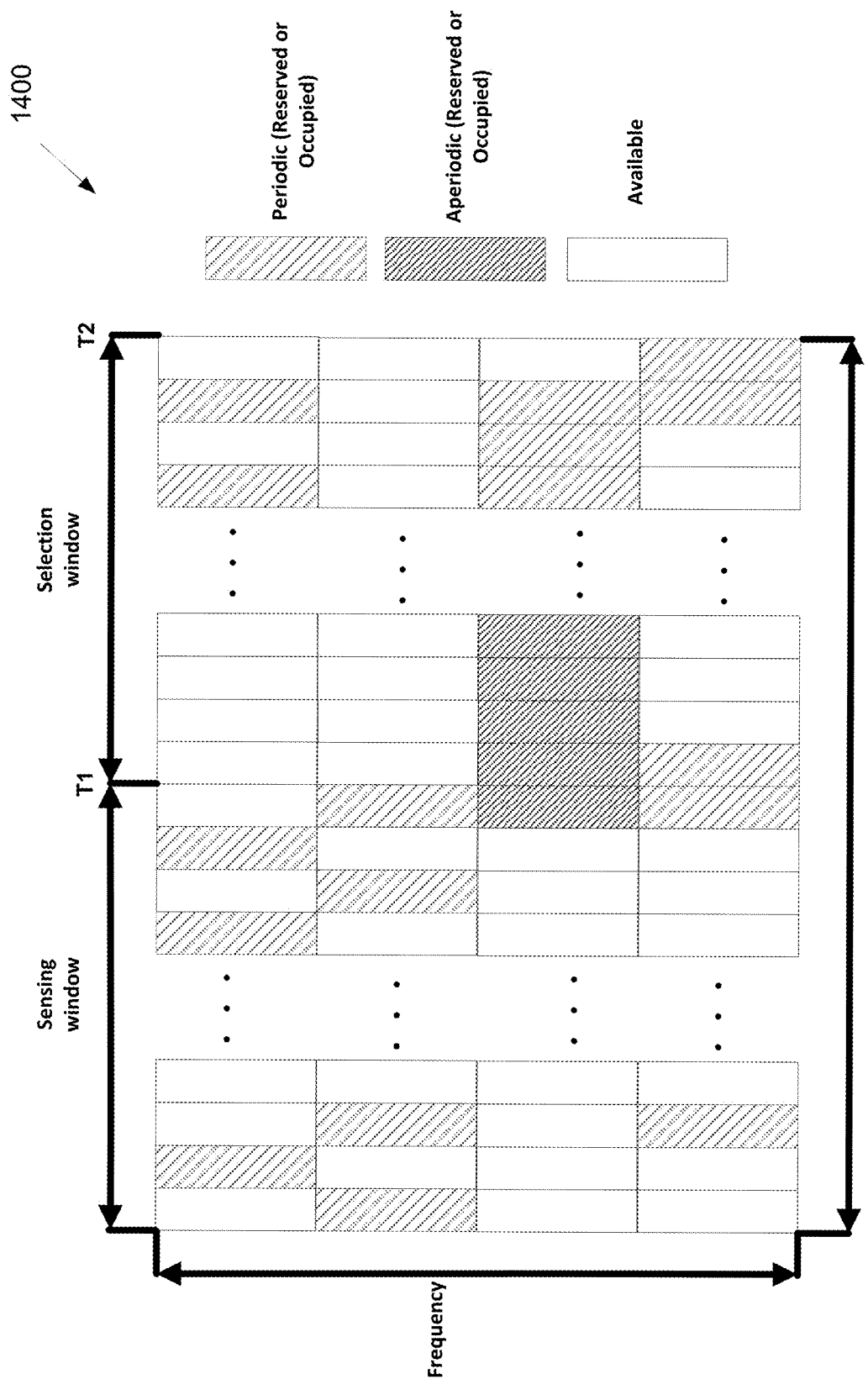
FIG. 14 illustrates an example resource selection according to embodiments of the present disclosure.

FIG. 14 illustrates an example resource selection 1400 according to embodiments of the present disclosure. The embodiment of the resource selection 1400 illustrated in FIG. 14 is for illustration only. FIG. 14 does not limit the scope of the present disclosure to any particular implementation.

As illustrated in FIG. 14, the UE performs resource selection for periodic services. If the UE doesn't know the resources are reserved by another UE for aperiodic services in the selection window, the UE may not exclude those resources in the resource selection. When the UE performs the energy measurements in the sensing window and select a resource with minimum energy measurements, the UE may have a high probability that the UE selects a resource reserved for aperiodic services.

One of the considerations for periodic services is the UE performs the LBT on selected candidate resources and reserves a set of periodic resources when it is time to perform resource re-selection. These periodic resources may not conflict with resources excluded by decoded SCIs in the first step of the LBT as shown in embodiment 2. The drawback is more resources may be wasted for resource sensing that is required by LBT. But the resource waste only occurs at the time when the UE performs resource reselection.

For each resource reselection procedure, the UE performs LBT and selects a periodic resource for duration of time (resource reselection counter). At each transmission time, the resource reselection counter is decremented by one. When the resource reselection counter is decremented to zero, the UE performs resource selection and LBT again, and reserves a set of periodic resources for a duration of time (i.e., resource reselection counter*resource period).

In the example shown in FIG. 14, when the UE performs LBT for periodic services in the selection window, the UE may detect the resources that are occupied by other UEs for aperiodic services. The UE may have a higher probability that a resource that is not occupied by aperiodic services is selected.

Another approach for periodic services is the UE performs the LBT on selected candidate resources and start the transmission when the LBT is finished and one of the channels is sensed to be available for transmission. Similarly, the candidate resources where the LBT is performed may not conflict with resources excluded by decoded SCIs in the first step of the LBT as shown in embodiment 2. Like aperiodic services, each time when a periodic packet arrives, the UE restarts the LBT procedure for resource allocation.

In one embodiment, automatic resource selection after resource exclusion is provided. The resource exclusion methods described here may be applied to embodiment 6 as well as other embodiments e.g., embodiments 1-5.

Candidate resources may be obtained by excluding resources in the resource selection window reserved or being used by other UEs by decoded SCIs of these UEs. The reserved resources may be aperiodic traffic or periodic traffic. SCI format may indicate whether the resources reserved by a UE are one-time resource or semi-persistent (periodic) resources corresponding to periodic traffic and aperiodic traffic. For either one-time or semi-persistent (periodic) resource, multi-slot T-F resources are reserved for a large packet. For a multi-slot reserved T-F resource, SCI format may indicate the multiple slots where resources are reserved.

Figure 15:
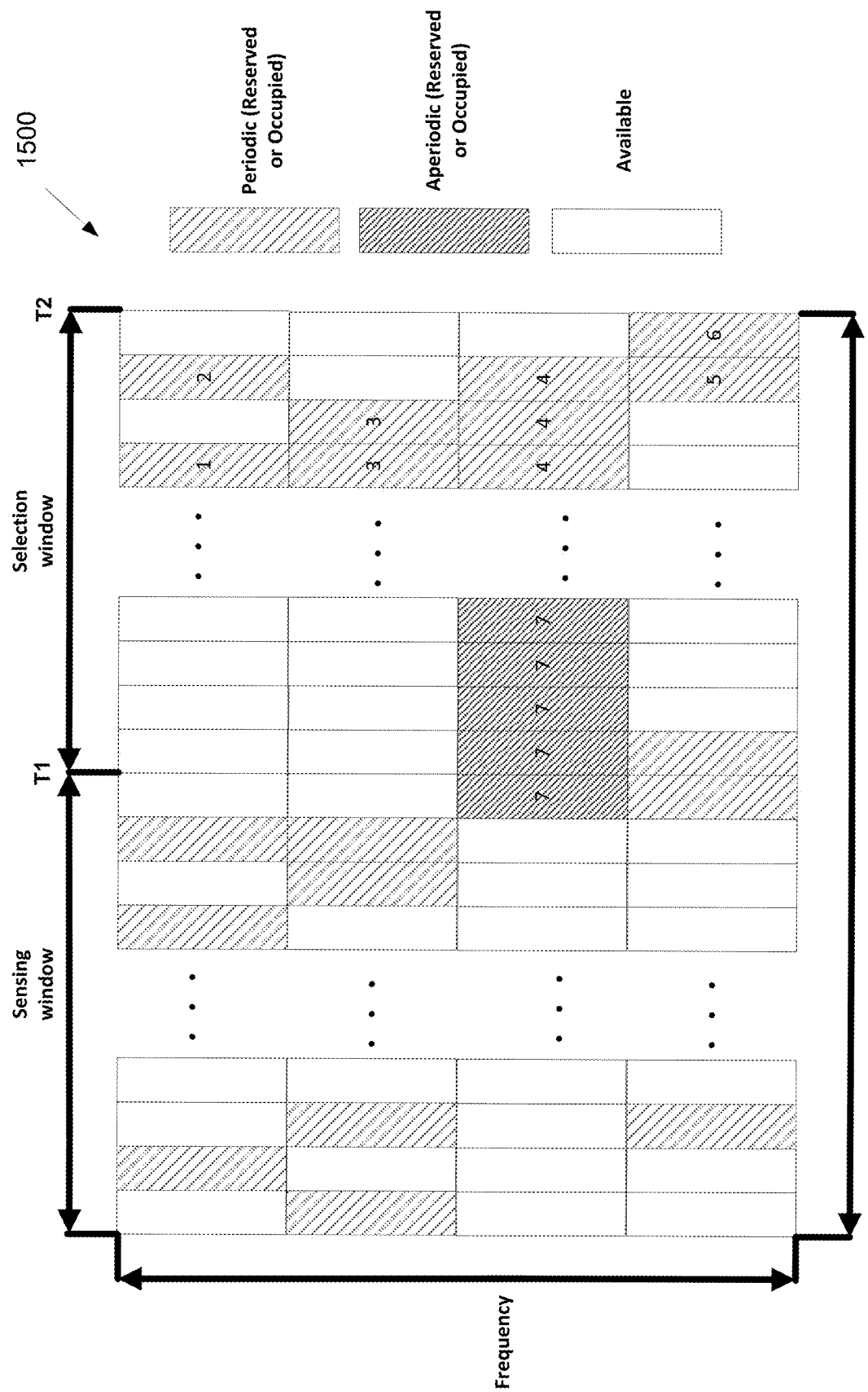
FIG. 15 illustrates another example resource selection according to embodiments of the present disclosure.

FIG. 15 illustrates another example resource selection 1500 according to embodiments of the present disclosure. The embodiment of the resource selection 1500 illustrated in FIG. 15 is for illustration only. FIG. 15 does not limit the scope of the present disclosure to any particular implementation.

FIG. 15 shows an example where resource 1, 2, 5, and 6 are semi-persistent (periodic) one slot resource, resources 3-4 are semi-persistent (periodic) multi-slot resource and resource 7 is one-time (aperiodic) multi-slot resource.

In order to achieve an easier implementation for the indication in the SCI format, a consecutive multi-slot resource allocation can be supported where an additional field in the SCI format indicates the number of slots that are reserved for a UE in the following slots after this slot.

For example, in FIG. 15, resource 7 is one-time (aperiodic) multi-slot resource. A field in the SCI in the first slot of this resource indicates 4 slots that are reserved for this UE in the following slots after the first slot. A field in the SCI in the last slot of this resource indicates 0 slots that are reserved for this UE in the following slots after the slot, which means that the resource may be released for this UE after this slot.

When performing resource exclusion, the UE may measure PSSCH-RSBP for the decoded SCI. The resource is excluded only when the measured PSSCH-RSBP is higher than a PSSCH-RSBP threshold, otherwise, the resource may still remain in the candidate resource set for later resource selection. The measured PSSCH-RSBP may be an average PSSCH-RSBP in the past slots that indicate the resource is reserved in the resource selection window. The measured PSSCH-RSBP may be also a most recent measured PSSCH-RSBP in the past slot(s) that indicate(s) the resource is reserved in the resource selection window.

For example, in FIG. 15, resource 7 is one-time (aperiodic) multi-slot resource. The measured PSSCH-RSBP may be PSSCH-RSBP measured in the first slot of resource 7.

As an approach, when there are no enough available candidate resources remaining in the selection window after resource exclusion, the UE may measure PSSCH-RSBP for the decoded SCI and iteratively increase the PSSCH-RSBP threshold for deciding the reserved resources until there are enough available resources remaining in the selection window. PSSCH-RSBP threshold may be the same or different for one-time and semi-persistent (periodic) resource. The resource exclusion order for one-time and semi-persistent (periodic) resource may also be the same or different.

That means, in one example, after increasing PSSCH-RSSP threshold for semi-persistent (periodic) resources, more semi-persistent (periodic) resources may remain in the candidate resources that are enough for the available candidate resources. Those one-time resources may still remain excluded from the candidate resources. In one example, after increasing PSSCH-RSSP threshold for semi-persistent (periodic) resources, more semi-persistent (periodic) resources may remain in the candidate resources that are enough for the available candidate resources. Some more one-time resources may also be included in the candidate resources by increasing a PSSCH-RSSP threshold.

After resource exclusion, among available candidate resources in the selection window, the UE may randomly select or select resources for transmission with the input and help from other sidelink measurements and reports.

Sidelink measurements and reports may be used for the input and assistance in the resource selection procedure. Sidelink measurements and reports may be performed and obtained from either receiver side or transmitter side. Sidelink measurement and reports at receiver side are more useful than transmitter side ones for resource selection.

The resource selection assistance methods described here may be applied to embodiment 6 as well as other embodiments e.g., embodiments 1-5, such as LBT-like resource selection.

Some examples of sidelink measurements and reports are ACK/NACK, CQI, PMI, RI, RSBP, RSRQ, pathloss, SRI, CRI, interference condition, and vehicle motion etc. The following are applied to ACK/NACK feedback and RSBP/RSSI/CSI report as well as other sidelink measurements and reports with some necessary adaptation.

Sidelink measurements and reports may include ACK/NACK feedback and RSBP/RSSI/CSI report. When a UE receives a NACK for a TB on a resource (e.g., semi-persistent (periodic) resource or a frequency resource), the UE may be given a lower priority to get selected or excluded in the resource reselection. When a UE receive an ACK for a TB on a resource (e.g., semi-persistent (periodic) resource or a frequency resource), the UE may be given a higher priority to get selected or included in the resource reselection.

Similarly, when a UE obtained a CSI/RSBP/RSSI report with a bad quality for a resource ((e.g., semi-persistent (periodic) resource or a frequency resource), the UE may be given a lower priority to get selected or excluded in the resource reselection. When a UE obtains a CSI/RSBP/RSSI report with a good quality for a resource ((e.g., semi-persistent (periodic) resource or a frequency resource), the UE may be given a higher priority to get selected or included in the resource reselection.

RSRQ/RSSI Measurements.

In LTE sensing procedures, a UE uses the PSSCH_RSBP measurement of the PSSCH associated with a decoded SCI of another UE for excluding resources that are reserved by this another UE. If the PSSCH_RSBP measurement is higher than a threshold, the reserved resource is excluded from the candidate resource sets.

There is a possibility that if the PSSCH_RSBP measurement is lower than a threshold, but the PSSCH_RSRQ is lower than a threshold. That means the interferences from other UEs are high. In this case, the reserved resource may be excluded from the candidate resource sets.

There is also a possibility that if the PSSCH_RSBP measurement is lower than a threshold, but the PSSCH_RSRQ is also higher than a threshold. That means the interferences from other UE are low. In this case, the reserved resource may not be excluded from the candidate resource sets.

Therefore, there is a need that PSCCH/PSSCH_RSRQ is also used as a metric in the sensing procedure to exclude the reserved resource from the candidate resource sets.

As an alternative approach, there is also a need that PSCCH/PSSCH_RSSI is also used as a metric in the sensing procedure to exclude the reserved resource from the candidate resource sets.

In one embodiment, the whole procedure for resource exclusion is shown in TABLE 1.

TABLE 1

| Whole procedure for resource exclusion |
|---|
| If PSCCH/PSSCH_RSRP of a decoded SCI or the associated PSSCH is higher than a threshold $Th_{RSRP\ 1}$, then <br>     the resource reserved by the decoded SCI is excluded. <br>     else if PSCCH/PSSCH_RSRQ of a decoded SCI or the associated PSSCH is higher than a threshold $Th_{RSRQ\ 1}$ <br>     the resource reserved by the decoded SCI is not excluded. <br>     else if PSCCH/PSSCH_RSRQ of a decoded SCI or the associated PSSCH is not higher than a threshold $Th_{RSRQ\ 1}$ <br>     the resource reserved by the decoded SCI is not excluded. <br>     else if PSCCH/PSSCH_RSRP of a decoded SCI or the associated PSSCH is lower than a threshold $Th_{RSRP\ 2}$, then <br>     the resource reserved by the decoded SCI is not excluded. <br> end |

In one embodiment, the whole procedure for resource exclusion is shown in TABLE 2.

TABLE 2

| Whole procedure for resource exclusion |
|---|
| If PSCCH/PSSCH_RSRP of a decoded SCI or the associated PSSCH is higher than a threshold $Th_{RSRP\ 1}$, then <br>     the resource reserved by the decoded SCI is excluded. <br>     else if PSCCH/PSSCH_RSSI of a decoded SCI or the associated PSSCH is higher than a threshold $Th_{RSSI1}$ <br>     The resource reserved by the decoded SCI is not excluded. <br>     else if PSCCH/PSSCH_RSRQ of a decoded SCI or the associated PSSCH is not higher than a threshold $Th_{RSSI1}$ <br>     the resource reserved by the decoded SCI is not excluded. <br>     else if PSCCH/PSSCH_RSRP of a decoded SCI or the associated PSSCH is lower than a threshold $Th_{RSRP\ 2}$, then <br>     the resource reserved by the decoded SCI is not excluded. <br> end |

LTE V2X defines subchannels as a group of RBs in the same subframe, and the number of RBs per subchannel can vary. Subchannels are used to transmit data and control information. The data is transmitted in transport blocks (TBs) over physical sidelink shared channels (PSSCH), and the sidelink control information (SCI) messages are transmitted over physical sidelink control channels (PSCCH). A UE that wants to transmit a TB may also transmit an associated SCI, which is also referred to as a scheduling assignment. The SCI includes information such as the modulation and coding scheme (MCS) used to transmit the TB, the frequency resource allocation, and the resource reservation interval for semi-persistent scheduling (SPS). A TB and its associated SCI may always be transmitted in the same subframe.

LTE V2X defines two subchannelization schemes. In one example of adjacent PSCCH+PSSCH, the SCI and TB are transmitted in adjacent RBs. For each SCI+TB transmission, the SCI occupies the first two RBs of the first subchannel utilized for the transmission. The TB is transmitted in the RBs following the SCI, and can occupy several subchannels (depending on a size). If it does so, the TB may also occupy the first two RBs of the following subchannels.

In another example of nonadjacent PSCCH+PSSCH, the RBs are divided into pools. One pool is dedicated to transmit only SCIs, and the SCIs occupy two RBs. The second pool is reserved to transmit only TBs and is divided into subchannels.

Multiplexing physical channels considering at least the above aspects are provided. In one example, multiplexing of PSCCH and the associated PSSCH (here, the "associated" means that the PSCCH at least carries information necessary to decode the PSSCH).

In one instance, PSCCH and the associated PSSCH are transmitted using non-overlapping time resources. In such instance, the frequency resources used by the two channels are the same. In such instance, the frequency resources used by the two channels can be different.

In one instance, PSCCH and the associated PSSCH are transmitted using non-overlapping frequency resources in the all the time resources used for transmission. The time resources used by the two channels are the same.

In one instance, a part of PSCCH and the associated PSSCH are transmitted using overlapping time resources in non-overlapping frequency resources, but another part of the associated PSSCH and/or another part of the PSCCH are transmitted using non-overlapping time resources.

In 3GPP standardization, at least two sidelink resource allocation modes are defined for NR-V2X sidelink communication. In one example of mode 1, base station schedules sidelink resource(s) to be used by UE for sidelink transmission(s). In one example of mode 2, a UE determines (i.e. base station does not schedule) sidelink transmission resource(s) within sidelink resources configured by base station/network or pre-configured sidelink resources.

It is noted that eNB control of NR sidelink and gNB control of LTE sidelink resources may be separately considered in corresponding agenda items. Mode-2 definition covers potential sidelink radio-layer functionality or resource allocation sub-modes (subject to further refinement including merging of some or all of them) where: a UE autonomously selects sidelink resource for transmission; a UE assists sidelink resource selection for other UE(s); a UE is configured with NR configured grant (type-1 like) for sidelink transmission; and/or a UE schedules sidelink transmissions of other UEs.

Multiplexing of PSCCH and the Associated PSSCH.

In LTE V2X, the number of frequency RBs each PSCCH channel occupies is fixed to be 2 RBs and the time duration each PSCCH occupies is fixed to be one subframe. In order to support more efficient resource utilization, the NR needs to support varying time duration and varying number of frequency RBs of PSCCH channels. This is especially useful in unicast/groupcast cases that are to be supported in NR V2X.

For option 1: PSCCH and the associated PSSCH are transmitted using non-overlapping time resources. There are two sub-options: option 1A and option 1B. Option 1A: the frequency resources used by the two channels are the same. Option 1B: the frequency resources used by the two channels can be different.

Figure 16:
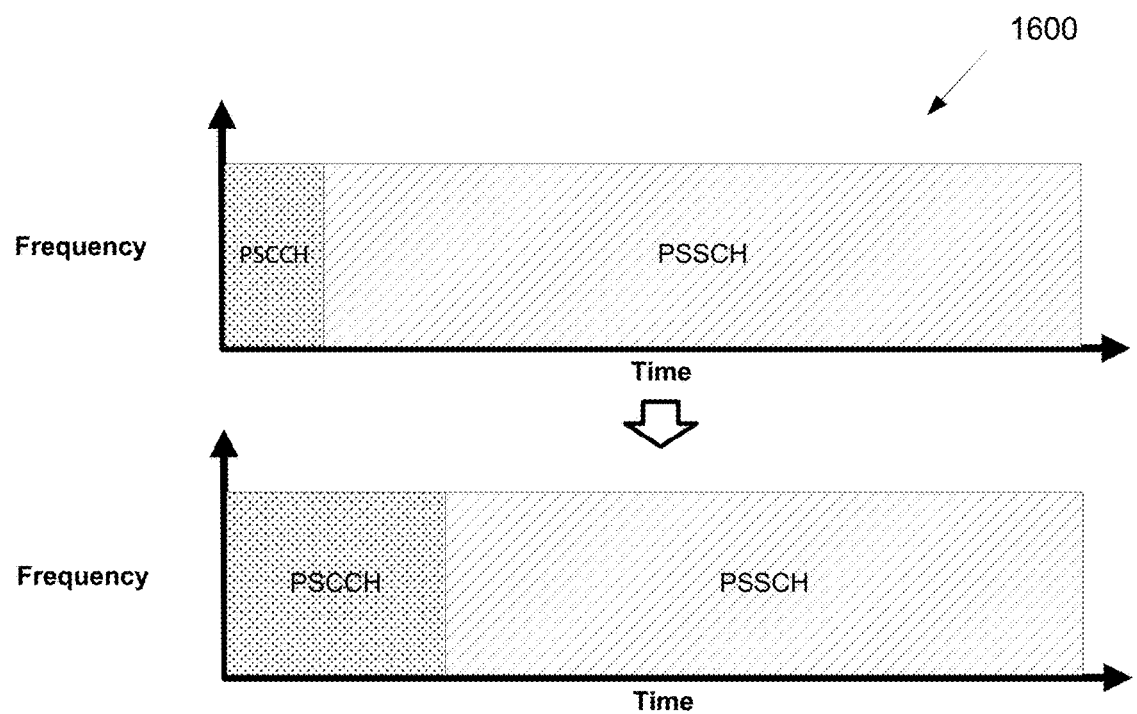
FIG. 16 illustrates an example OFDM symbols for PSCCH according to embodiments of the present disclosure.

FIG. 16 illustrates an example OFDM symbols for PSCCH 1600 according to embodiments of the present disclosure. The embodiment of the OFDM symbols for PSCCH 1600 illustrated in FIG. 16 is for illustration only. FIG. 16 does not limit the scope of the present disclosure to any particular implementation.

For option 1A, if a PSCCH and its associated PSSCH are multiplexed in the same slot, the number of OFDM symbols that the PSCCH uses may vary depending upon the channel states and number of frequency RBs that the PSCCH and the PSSCH occupy. FIG. 16 shows the case where the number of OFDM symbols that the PSCCH occupies changes in different conditions. The receiver UE needs to blindly decode the PSCCH channel while trying different numbers of OFDM symbols.

Figure 17:
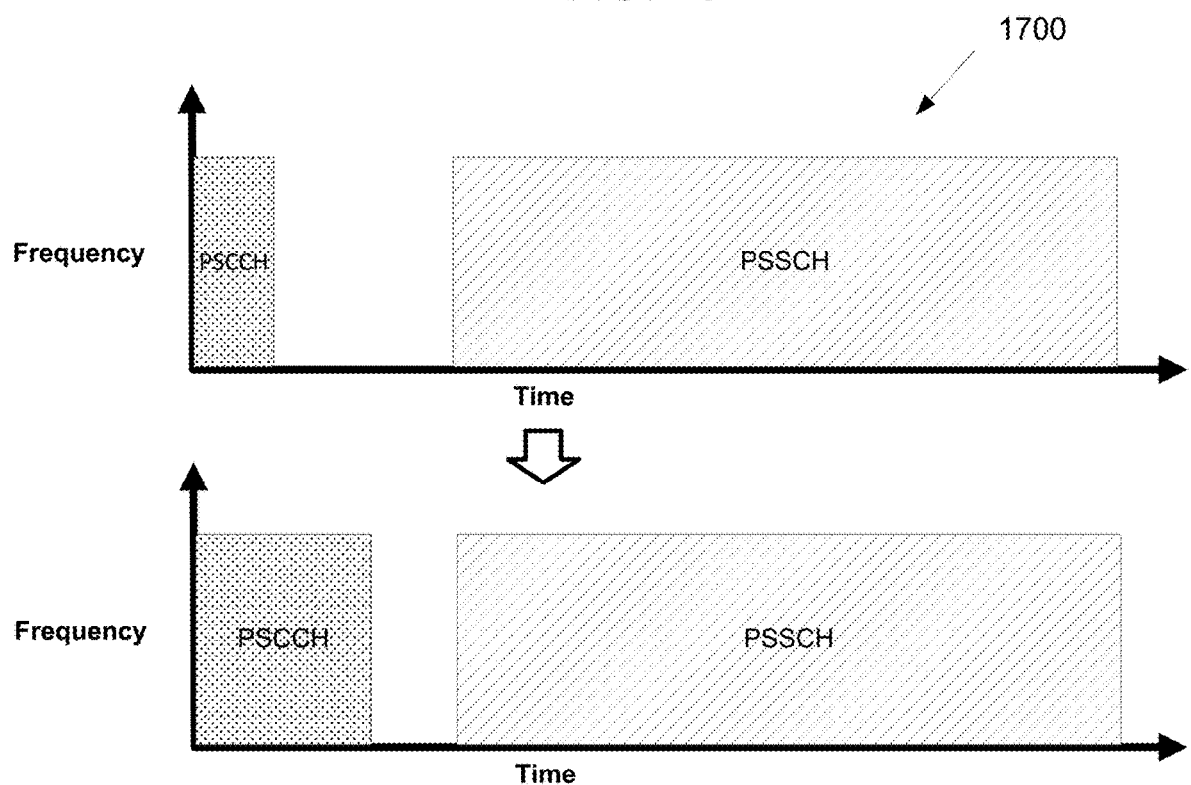
FIG. 17 illustrates another example OFDM symbols for PSCCH according to embodiments of the present disclosure.

FIG. 17 illustrates another example OFDM symbols for PSCCH according 1700 to embodiments of the present disclosure. The embodiment of the OFDM symbols for PSCCH illustrated in FIG. 17 is for illustration only. FIG. 17 does not limit the scope of the present disclosure to any particular implementation.

For option 1A, if a PSCCH and its associated PSSCH are multiplexed in different slots and the number of OFDM symbols that the PSCCH uses may vary depending upon the channel states and number of frequency RBs that the PSCCH and the PSSCH occupy. FIG. 17 shows the case where the number of OFDM symbols that the PSCCH occupies changes in different conditions. The receiver UE needs to blindly decode the PSCCH channel while trying different numbers of OFDM symbols.

Figure 18:
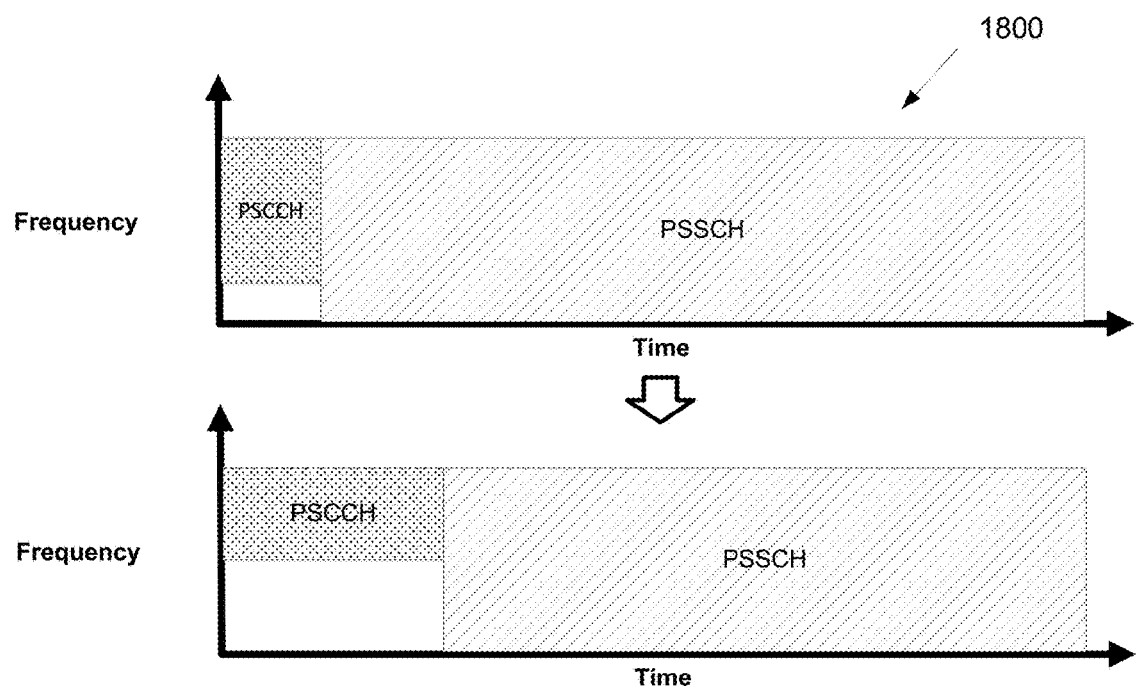
FIG. 18 illustrates yet another example OFDM symbols for PSCCH according to embodiments of the present disclosure.

FIG. 18 illustrates yet another example OFDM symbols for PSCCH 1800 according to embodiments of the present disclosure. The embodiment of the OFDM symbols for PSCCH 1800 illustrated in FIG. 18 is for illustration only. FIG. 18 does not limit the scope of the present disclosure to any particular implementation.

For option 1B, the frequency resources used by the two channels of PSCCH and PSSCH may be different. If a PSCCH and its associated PSSCH are multiplexed in the same slot, both/either the number of OFDM symbols and/or the number of frequency RBs that the PSCCH uses may vary depending upon the channel states and number of frequency RBs that the PSSCH occupies. FIG. 18 shows the case where both/either the number of OFDM symbols and/or the number of frequency RBs that the PSCCH occupies changes in different conditions. The receiver UE needs to blindly decode the PSCCH channel while trying both/either different numbers of OFDM symbols and/or different numbers of frequency RBs.

Figure 19:
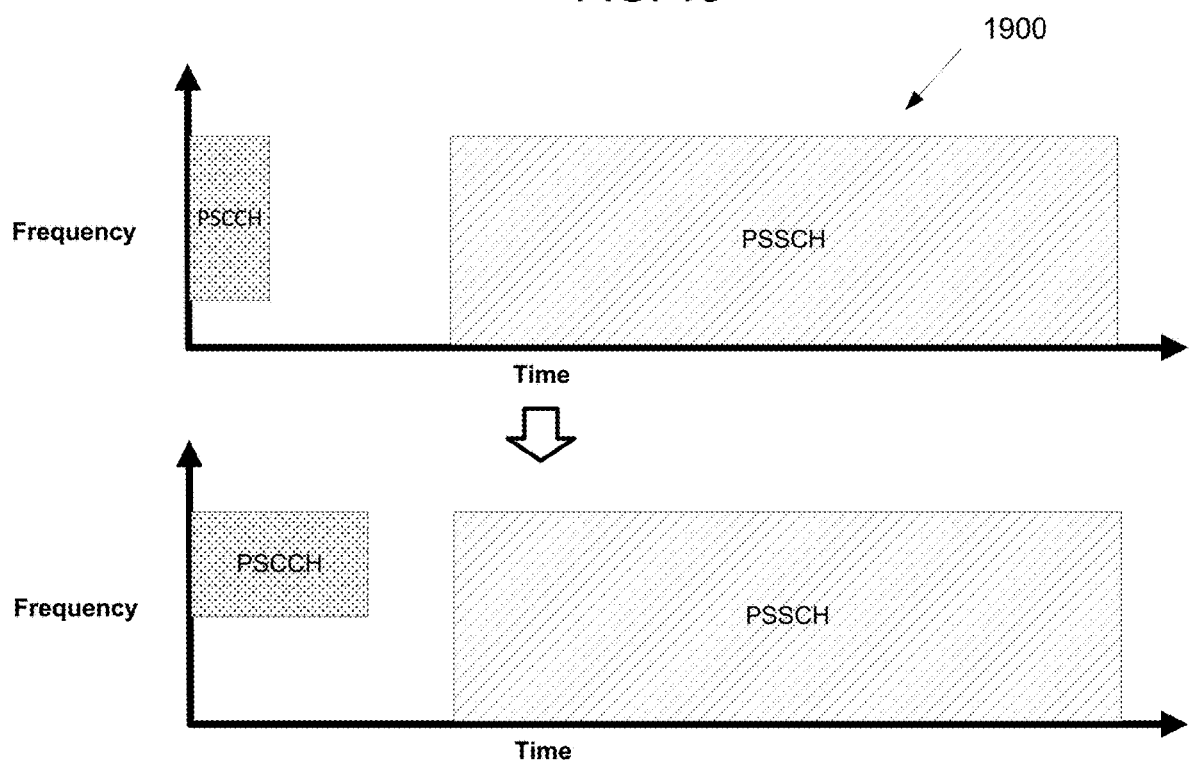
FIG. 19 illustrates yet another example OFDM symbols for PSCCH according to embodiments of the present disclosure.

FIG. 19 illustrates yet another example OFDM symbols for PSCCH 1900 according to embodiments of the present disclosure. The embodiment of the OFDM symbols for PSCCH 1900 illustrated in FIG. 19 is for illustration only.

FIG. 19 does not limit the scope of the present disclosure to any particular implementation.

For option 1B, the frequency resources used by the two channels may be different. If a PSCCH and its associated PSSCH are multiplexed in different slots, both/either the number of OFDM symbols and/or the number of frequency RBs that the PSCCH uses may vary depending upon the channel states and number of frequency RBs that the PSSCH occupies. FIG. 19 shows the case where the number of OFDM symbols and the number of frequency RBs that the PSCCH occupies changes in different conditions. The receiver UE needs to blindly decode the PSCCH channel while trying both/either different numbers of OFDM symbols and/or different numbers of frequency RBs.

Figure 20:
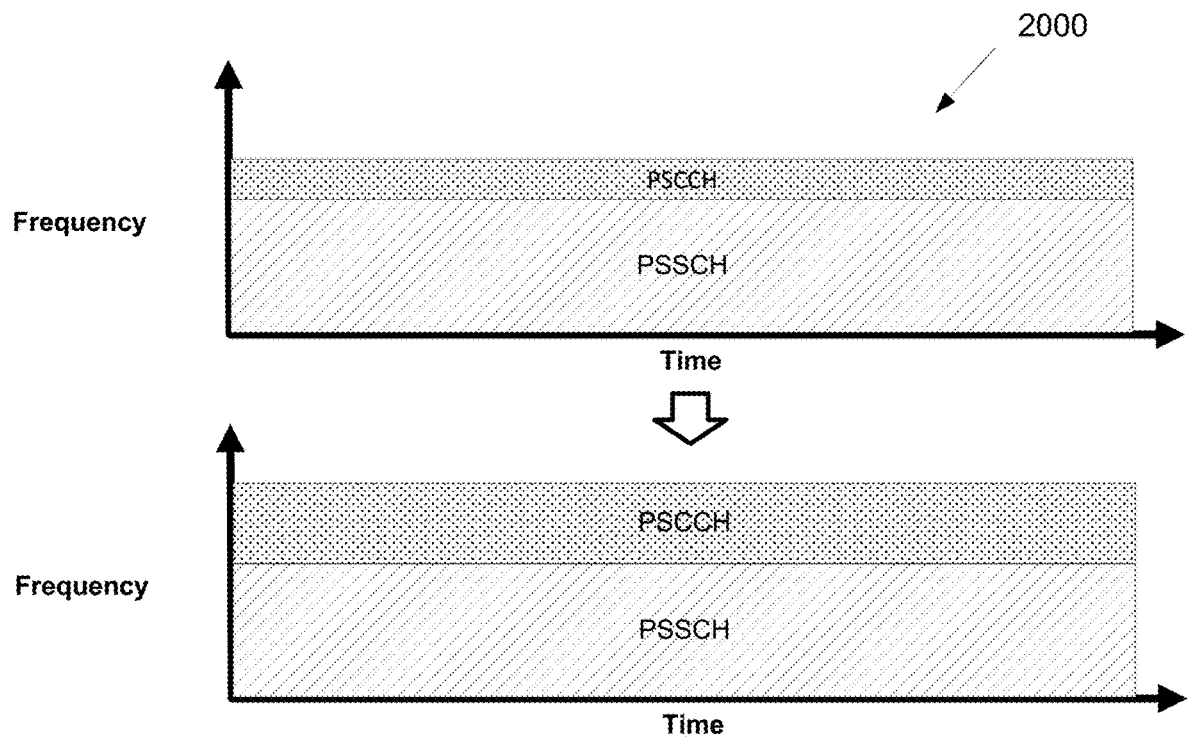
FIG. 20 illustrates yet another example OFDM symbols for PSCCH according to embodiments of the present disclosure.

FIG. 20 illustrates yet another example OFDM symbols for PSCCH 2000 according to embodiments of the present disclosure. The embodiment of the OFDM symbols for PSCCH 2000 illustrated in FIG. 20 is for illustration only. FIG. 20 does not limit the scope of the present disclosure to any particular implementation.

For option 2: PSCCH and the associated PSSCH are transmitted using non-overlapping frequency resources in all the time resources used for transmission. The time resources used by the two channels are the same. The frequency resources that PSCCH and the associated PSSCH occupy can be either adjacent or non-adjacent. The number of frequency RBs that the PSCCH uses may vary depending upon the channel states. FIG. 20 shows the case where the number of frequency RBs that the PSCCH occupies changes in different cases. The receiver UE needs to blindly decode the PSCCH channel while trying different numbers of frequency RBs.

Figure 21:
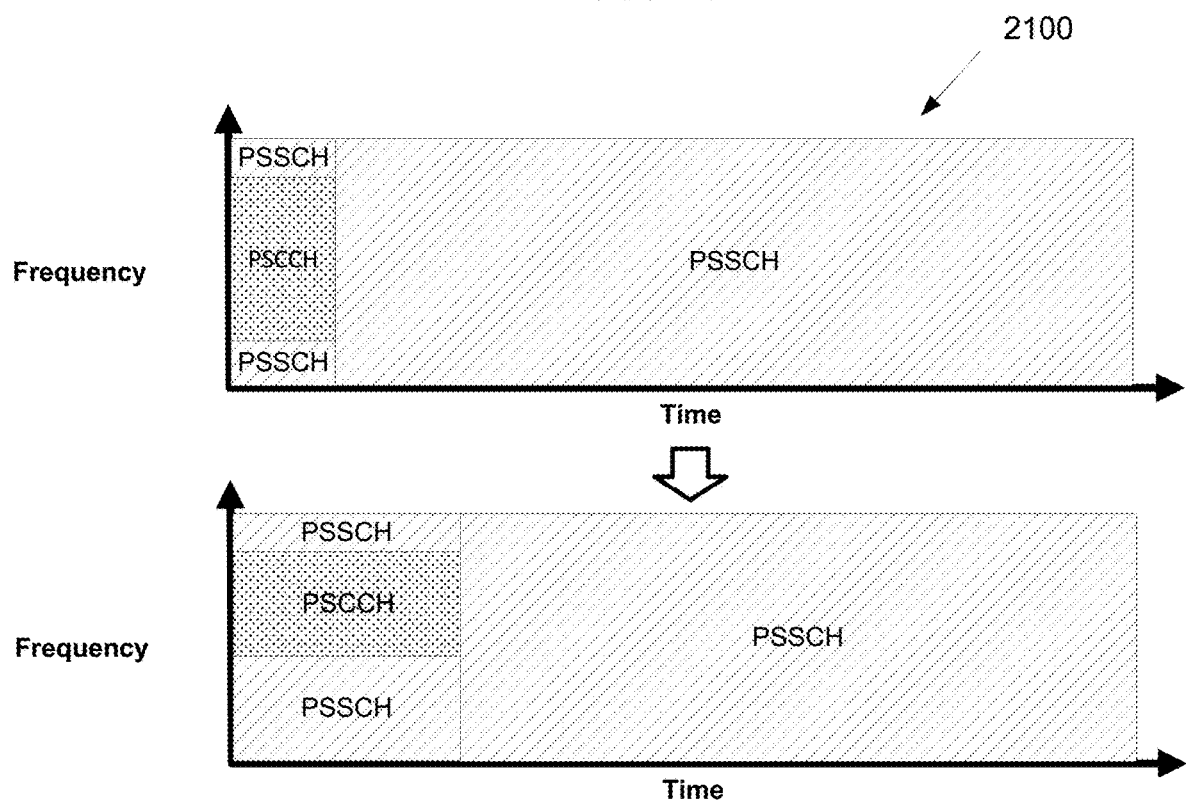
FIG. 21 illustrates yet another example OFDM symbols for PSCCH according to embodiments of the present disclosure.

FIG. 21 illustrates yet another example OFDM symbols for PSCCH 2100 according to embodiments of the present disclosure. The embodiment of the OFDM symbols for PSCCH 2100 illustrated in FIG. 21 is for illustration only. FIG. 21 does not limit the scope of the present disclosure to any particular implementation.

For option 3: a part of PSCCH and the associated PSSCH are transmitted using overlapping time resources in non-overlapping frequency resources, but another part of the associated PSSCH and/or another part of the PSCCH are transmitted using non-overlapping time resources. Both/either the number of OFDM symbols and/or the number of frequency RBs that the PSCCH uses may vary depending upon the channel states and number of frequency RBs that the PSSCH occupies. FIG. 21 shows the case where the number of OFDM symbols and the number of the frequency RBs that the PSCCH occupies changes in different conditions. The receiver UE needs to blindly decode the PSCCH channel while trying both/either different numbers of OFDM symbols and/or different numbers of frequency RBs.

Resource Allocation for Semi-Persistent/Periodic Services.

Depending upon whether option 1, option 2, or, option 3 is configured with a resource pool, the resource allocation mechanism for semi-persistent/periodic service in NR mode 2 can be different.

When option 1A is configured, and a PSCCH and its associated PSSCH are multiplexed in the same slot.

The resource allocation procedure for PSCCH and PSSCH can be the same one, i.e., there is only one resource allocation procedure for both PSCCH and PSSCH. But different UEs share the same resource pool for both PSCCH and PSSCH. There are two resource sets $S_A$ and $S_B$. The set $S_A$ is initialized to the union of all the candidate single-slot resources. The set $S_B$ is initialized to an empty set.

The UE needs to decode possible SCIs and exclude all resources from $S_A$ that are reserved and indicated by the decoded SCIs of other UEs for the following reservation intervals within the selection window with the PSCCH-RSBP/PSSCH-RSBP measurement higher than a PSCCH-RSBP/PSSCH-RSBP threshold. Because different UEs may have different numbers of OFDM symbols for corresponding PSCCH, blind decoding is required for each SCI by trying different numbers of OFDM symbols for each SCI. The UE moves a (pre)configured number of candidate resources for PSCCH and PSSCH with the smallest metric of RSSI to the candidate resource set $S_B$. The UE randomly selects one of the candidate resources for PSCCH and PSSCH from set $S_B$.

When option 1A is configured, and a PSCCH and its associated PSSCH are multiplexed in different slots.

The resource allocation procedure for PSCCH and PSSCH can be separate but related. For PSCCH and PSSCH multiplexed in different slots, the time slot offset between PSCCH and PSSCH in the selection window is assumed to be same as that in the sensing window. For PSCCH and PSSCH channels, there are two separate resource sets $S_A$ and $S_B$ respectively for each channel. The set $S_A$ for each channel is initialized to the union of all the candidate single-slot resources. The set $S_B$ for each channel is initialized to an empty set.

For the PSCCH resource selection, the UE needs to decode possible SCIs and exclude all resources from PSCCH $S_A$ that are reserved by the decoded SCIs of other UEs for the following reservation intervals within the selection window with the PSCCH-RSBP measurement higher than a PSCCH-RSBP threshold. Because different UEs may have different numbers of OFDM symbols for corresponding PSCCH, blind decoding is required for each SCI by trying different numbers of OFDM symbols for each SCI.

For the PSSCH resource selection, the UE needs to exclude all resources from PSSCH $S_A$ that are reserved and indicated by the SCIs of other UEs that are blindly decoded in the PSCCH resource selection for the following reservation intervals in the selection window with the PSSCH-RSBP measurement higher than a PSSCH-RSBP threshold.

When PSCCH and PSSCH are configured in the same resource pool, the PSCCH or PSSCH needs to exclude from the respective PSCCH and PSSCH $S_A$ all resources that are occupied or reserved by PSSCH or PSCCH.

When PSCCH and PSSCH are multiplexed in different slots, the resource selection for PSCCH and PSSCH needs to be considered together. A PSCCH-RSBP and PSSCH-RSBP can be (pre)configured or iteratively increased by a delta dB until the number of candidate PSCCH and PSSCH resources remaining in PSCCH $S_A$ and PSSCH $S_A$ is larger than a (pre)configured value.

The UE moves a (pre)configured number of candidate resources for PSCCH and PSSCH with the smallest metric of RSSI to their respective candidate resource sets $S_B$. The UE may select the resources of PSCCH and PSSCH that lie in the same frequency RBs from their respective PSCCH and PSSCH candidate resource sets $S_B$, rather than randomly selecting the resources of PSCCH and PSSCH independently.

When there are more than one resource of PSCCH and PSSCH that lie in the same frequency RBs in their respective PSCCH and PSSCH candidate resource sets, the UE can e.g., randomly select the resources for PSCCH and PSSCH that lie in the same frequency RBs. When there are no resources of PSCCH and PSSCH that lie in the same frequency RBs in their respective PSCCH and PSSCH candidate resource sets, the UE moves another (pre)configured number of candidate resources for PSCCH and PSSCH with the smallest metric of RSSI to their respective candidate resource sets $S_B$.

When there are no more candidate resources for PSCCH and PSSCH that can be moved from $S_A$ to $S_B$. The above procedure can be repeated by increasing both/either the PSCCH-RSBP threshold and/or PSSCH-RSBP by a delta dB value until at least one candidate resource for PSCCH and PSSCH can be found that lies in the same frequency RBs from their respective candidate resource sets $S_B$.

Figure 22:
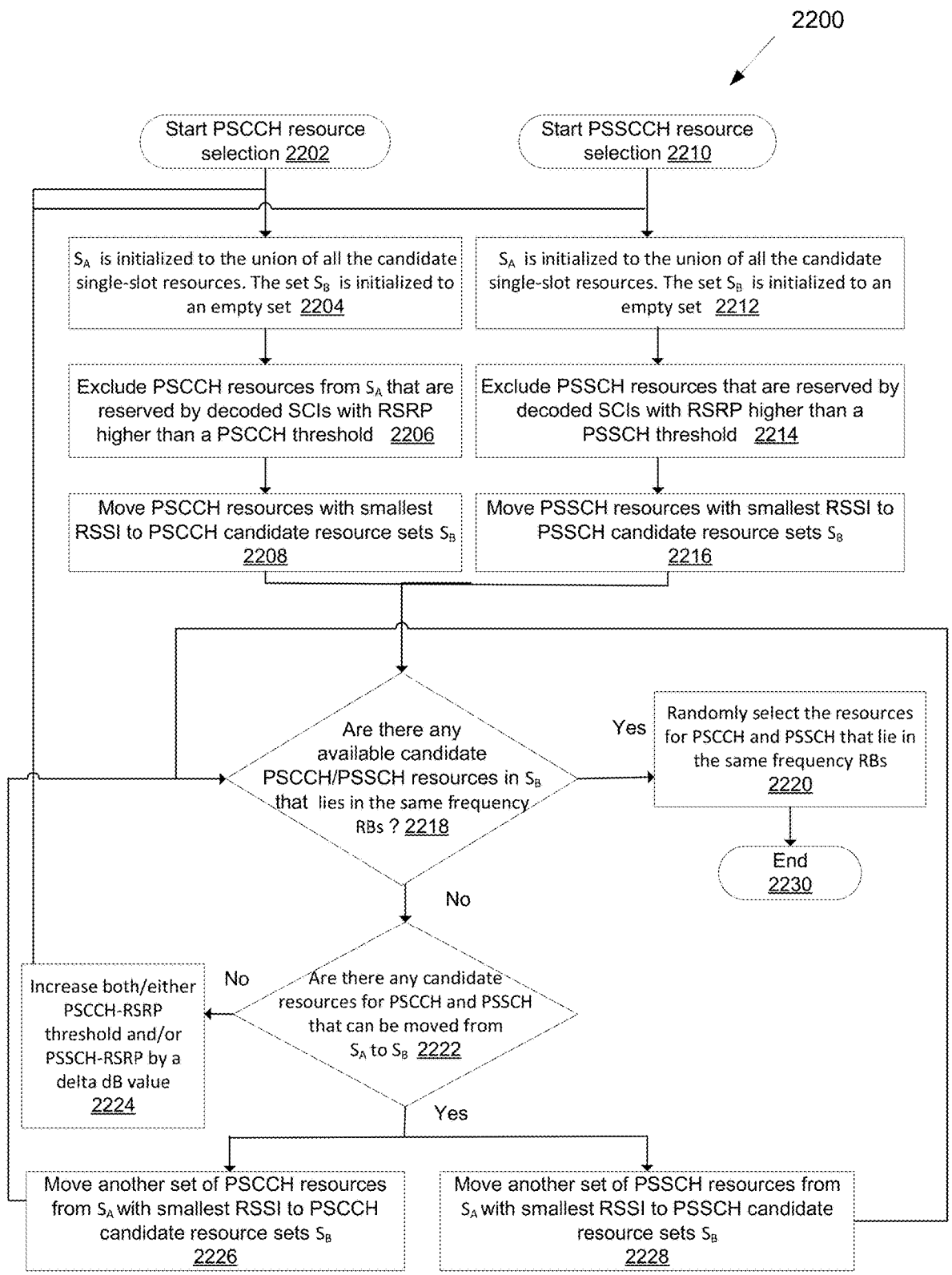
FIG. 22 illustrates a flowchart of a method for resource allocation procedures according to embodiments of the present disclosure.

FIG. 22 illustrates a flowchart of a method 2200 for resource allocation procedures according to embodiments of the present disclosure. The embodiment of the method 2200 illustrated in FIG. 22 is for illustration only. FIG. 22 does not limit the scope of the present disclosure to any particular implementation. The whole resource allocation procedure is shown in FIG. 22.

When option 1B is configured, and a PSCCH and its associated PSSCH are multiplexed in the same slot.

The resource allocation procedure for PSCCH and PSSCH can be the same one, i.e., there is only one resource allocation procedure for both PSCCH and PSSCH. But different UEs share the same resource pool for both PSCCH and PSSCH. There are two resource sets $S_A$ and $S_B$. The set $S_A$ is initialized to the union of all the candidate single-slot resources. The set $S_B$ is initialized to an empty set.

The UE needs to decode possible SCIs and exclude all resources from $S_A$ that are reserved and indicated by the decoded SCIs of other UEs for the following reservation intervals within the selection window with the PSSCH-RSBP measurement higher than a PSSCH-RSBP threshold. Because different UEs may have both/either different numbers of OFDM symbols and/or different numbers of frequency RBs for corresponding PSCCH, the blind decoding is required for each SCI by trying both/either different numbers of OFDM symbols and/or different numbers of frequency RBs for each SCI. The UE moves a (pre)configured number of candidate resources for PSCCH and PSSCH with the smallest metric of RSSI to the candidate resource set $S_B$. The UE randomly selects one of the resources for PSCCH and PSSCH from set $S_B$.

When option 1B is configured, and a PSCCH and its associated PSSCH are multiplexed in different slots.

The resource allocation procedure for PSCCH and PSSCH can be separate. For PSCCH and PSSCH multiplexed in different slots, the time slot offset between PSCCH and PSSCH in the selection window may be assumed the same as that in the sensing window. For PSCCH and PSCCH, there are two separate resource sets $S_A$ and $S_B$ for each channel. The set $S_A$ for each channel is initialized to the union of all the candidate single-slot resources. The set $S_B$ for each channel is initialized to an empty set.

For the PSCCH resource selection, the UE needs to decode possible SCIs and exclude all resources from PSCCH $S_A$ that are reserved by the decoded SCIs of other UEs for the following reservation intervals within the selection window with the PSCCH-RSBP measurement higher than a PSCCH-RSBP threshold. Because different UEs may have both/either different numbers of OFDM symbols and/or different numbers of frequency RBs for corresponding PSCCH, blind decoding is required for each SCI by trying both/either different numbers of OFDM symbols and/or different numbers of frequency RBs for each SCI.

For the PSSCH resource selection, the UE needs to exclude all resources from PSSCH $S_A$ that are reserved by the SCIs of other UEs that are blindly decoded in the PSCCH resource selection for the following reservation intervals in the selection window with the PSSCH-RSBP measurement higher than a PSSCH-RSBP threshold.

When PSCCH and PSSCH are configured in the same resource pool, the PSCCH or PSSCH needs to exclude from the respective PSCCH and PSSCH $S_A$ all resources that are occupied or reserved by PSSCH or PSCCH.

A PSCCH-RSBP and PSSCH-RSBP can be (pre)configured or iteratively increased by a delta dB until the number of candidate PSCCH and PSSCH resources remaining in PSCCH $S_A$ and PSSCH $S_A$ is larger than a (pre)configured value. The UE moves a (pre)configured number of candidate resources for PSCCH and PSSCH with the smallest metric of RSSI to their respective candidate resource sets $S_B$. The UE may randomly select the resources for PSCCH and PSSCH independently.

When option 2 is configured, PSCCH and the associated PSSCH are transmitted using non-overlapping adjacent frequency resources.

When PSCCH and the associated PSSCH are adjacent in frequency resources. The resource allocation procedure for PSCCH and PSSCH can be the same one, i.e., there is only one resource allocation procedure for both PSCCH and PSSCH. But different UEs share the same resource pool for both PSCCH and PSSCH. There are two resource sets $S_A$ and $S_B$. The set $S_A$ is initialized to the union of all the candidate single-slot resources. The set $S_B$ is initialized to an empty set.

The UE needs to decode possible SCIs and exclude all resources from $S_A$ that are reserved and indicated by the decoded SCIs of other UEs for the following reservation intervals within the selection window with the PSCCH-RSBP/PSSCH-RSBP measurement higher than a PSCCH-RSBP/PSSCH-RSBP threshold. Because different UEs may have different numbers of frequency RBs for corresponding PSCCH, blind decoding is required for each SCI by trying different numbers of frequency RBs for each SCI. The UE moves a (pre)configured number of candidate resources for PSCCH and PSSCH with the smallest metric of RSSI to their respective candidate resource set $S_B$. The UE randomly selects one of the resources for PSCCH and PSSCH from set $S_B$.

When option 2 is configured, PSCCH and the associated PSSCH are transmitted using non-overlapping non-adjacent frequency resources.

The resource allocation procedure for PSCCH and PSSCH can be separate but related. For PSCCH and PSSCH multiplexed in non-adjacent frequency RBs, the frequency RB offset between PSCCH and PSSCH in the selection window is assumed to be the same as that in the sensing window. For PSCCH and PSCCH, there are two separate resource sets $S_A$ and $S_B$ for each channel. The set $S_A$ for each channel is initialized to the union of all the candidate single-slot resources. The set $S_B$ for each channel is initialized to an empty set.

For the PSCCH resource selection, the UE needs to decode possible SCIs and exclude all resources from PSCCH $S_A$ that are reserved by the decoded SCIs of other UEs for the following reservation intervals within the selection window with the PSCCH-RSBP measurement higher than a PSCCH-RSBP threshold. Because different UEs may have different numbers of frequency RBs for corresponding PSCCH, blind decoding is required for each SCI by trying different numbers of frequency RBs for each SCI.

For the PSSCH resource selection, the UE needs to exclude all resources from PSSCH $S_A$ that are reserved and indicated by the SCIs of other UEs that are blindly decoded in the PSCCH resource selection for the following reservation intervals in the selection window with the PSSCH-RSBP measurement higher than a PSSCH-RSBP threshold.

When PSCCH and PSSCH are configured in the same resource pool, the PSCCH or PSSCH needs to exclude from the respective PSCCH and PSSCH $S_A$ all resources that are occupied or reserved by PSSCH or PSCCH.

The resource selection for PSCCH and PSSCH needs to be considered together. A PSCCH-RSBP and PSSCH-RSBP can be (pre)configured or iteratively increased by a delta dB until the number of candidate PSCCH and PSSCH resources remaining in PSCCH $S_A$ and PSSCH $S_A$ is larger than a (pre)configured value. The UE moves a (pre)configured number of candidate resources for PSCCH and PSSCH with the smallest metric of RSSI to their respective candidate resource sets $S_B$.

The UE may select the resources of PSCCH and PSSCH that lie in the same time slots from their respective PSCCH and PSSCH candidate resource sets $S_B$, rather than randomly selecting the resources of PSCCH and PSSCH independently. When there is more than one resource of PSCCH and PSSCH that lies in the same time slot in their respective PSCCH and PSSCH candidate resource sets, the UE randomly selects the resources for PSCCH and PSSCH that lie in the same time slot. When there is no resource of PSCCH and PSSCH that lies in the same time slot in their respective PSCCH and PSSCH candidate resource sets, the UE moves another (pre)configured number of candidate resources for PSCCH and PSSCH with the smallest metric of RSSI to their respective candidate resource sets $S_B$.

When there are no more candidate resources for PSCCH and PSSCH that can be moved from $S_A$ to $S_B$. The above procedure can be repeated by increasing both/either the PSCCH-RSBP threshold and/or PSSCH-RSBP by a delta dB value until at least one candidate resource for PSCCH and PSSCH can be found that lies in the same time slot from their respective candidate resource sets $S_B$.

As illustrated in FIG. 22, the method 2200 in step 2202 starts PSCCH resource selection. The method 2200 in step 2204 determines that $S_A$ is initialized to the union of all the candidate single-slot resources. The set $S_B$ is initialized to an empty set. In step 2206, the method 2200 excludes PSCCH resources from $S_A$ that are reserved by decoded SCIs with RSBP higher than a PSCCH threshold. In step 2208, the method 2200 moves PSCCH resources with smallest RSSI to PSCCH candidate resource sets $S_B$. In step 2218, the method 2200 determines whether there are any available candidate PSCCH/PSSCH resources in $S_B$ that lie in the same frequency RBs. In step 2218, if there are available candidate PSCCH/PSSCH resources, the method 2200 in step 2220 randomly selects the resources for PSCCH and PSSCH that lie in the same frequency RBs, and then the method 2200 ends the method in step 2230. In step 2218, if there are no available candidate PSCCH/PSSCH resources, the method 2200 performs step 2222. In step 2222, the method 2200 determines there are any candidate resources for PSCCH and PSSCH that can be moved from $S_A$ to $S_B$. In step 2222, if there are candidate resources for PSCCH and PSSCH, the method 2200 in step 2226 moves another set of PSCCH resources from $S_A$ with smallest RSSI to PSCCH candidate resource sets $S_B$ and moves in step 2228 another set of PSSCH resources from $S_A$ with smallest RSSI to PSSCH candidate resource sets $S_B$. If there are no candidate resources for PSCCH and PSSCH in step 2222, the method 2200 increases both/either PSCCH-RSBP threshold and/or PSSCH-RSBP by a delta dB value in step 2224, and then procedure performs step 2202. The method 2200 start PSCCH resource selection in step 2210. The method 2200 in step 2212 determines that $S_A$ is initialized to the union of all the candidate single-slot resources. The set $S_B$ is initialized to an empty set. In step 2214, the method 2200 excludes PSSCH resources that are reserved by decoded SCIs with RSBP higher than a PSSCH threshold. In step 2216, the method 2200 moves PSSCH resources with smallest RSSI to PSSCH candidate resource sets $S_B$ and then the method 2200 performs step 2218.

Figure 23:
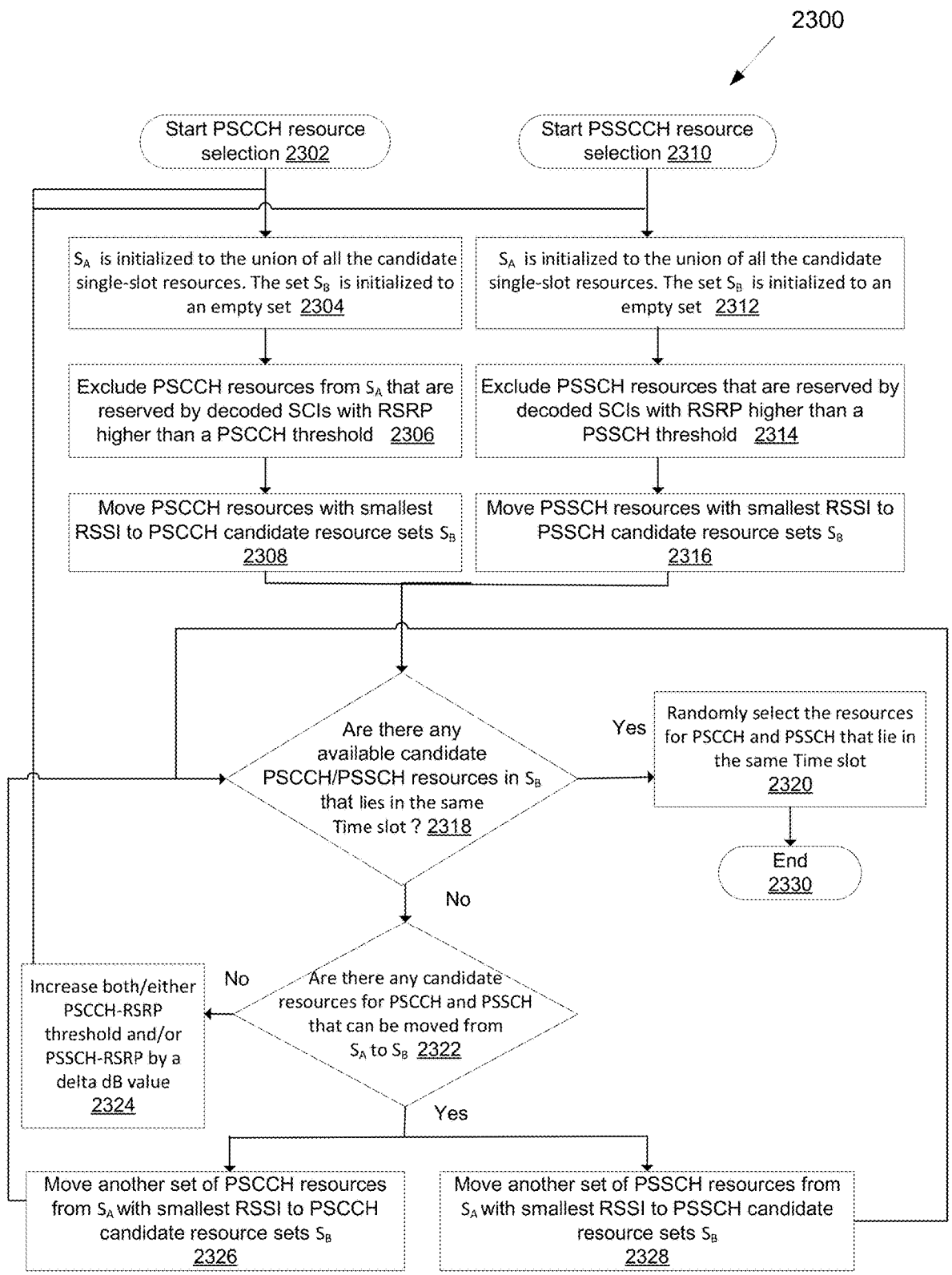
FIG. 23 illustrates another flowchart of a method for resource allocation procedures according to embodiments of the present disclosure.

FIG. 23 illustrates another flowchart of a method 2300 for resource allocation procedures according to embodiments of the present disclosure. The embodiment of method 2300 illustrated in FIG. 23 is for illustration only. FIG. 23 does not limit the scope of the present disclosure to any particular implementation.

The whole resource allocation procedure is shown in FIG. 23.

When option 3 is configured, the PSCCH and its associated PSSCH are multiplexed in the same slot. The resource allocation procedure for PSCCH and PSSCH can be the same one, i.e., there is only one resource allocation procedure for both PSCCH and PSSCH. But different UEs share the same resource pool for both PSCCH and PSSCH. There are two resource sets $S_A$ and $S_B$. The set $S_A$ is initialized to the union of all the candidate single-slot resources. The set $S_B$ is initialized to an empty set.

The UE needs to decode possible SCIs and exclude all resources from $S_A$ that are reserved and indicated by the decoded SCIs of other UEs for the following reservation intervals within the selection window with the PSCCH-RSBP/PSSCH-RSBP measurement higher than a PSCCH-RSBP/PSSCH-RSBP threshold. Because different UEs may have both/either different numbers of OFDM symbols and/or different numbers of frequency RBs for corresponding PSCCH, blind decoding is required for each SCI by trying both/either different numbers of OFDM symbols and/or different numbers of frequency RBs for each SCI.

The UE moves a (pre)configured number of candidate resources for PSCCH and PSSCH with the smallest metric of RSSI to the candidate resource set $S_B$. The UE randomly selects one of the resources for PSCCH and PSSCH from set $S_B$.

For the above 7 cases, if aperiodic services utilize the same resource pool as that of semi-persistent/periodic services, the UE needs to exclude resources from $S_A$ that are reserved and indicated by SCIs for aperiodic services. When moving candidate resources from $S_A$ to $S_B$ with the smallest metric RSSI, the UE needs to perform linear average of RSSI of past resources in the sensing window that don't overlap with resources occupied by aperiodic services.

As illustrated in FIG. 23, the method 2300 in step 2302 starts PSCCH resource selection. The method 2300 in step 2304 determines that $S_A$ is initialized to the union of all the candidate single-slot resources and the set $S_B$ is initialized to an empty set. In step 2306, the method 2300 excludes PSCCH resources from $S_A$ that are reserved by decoded SCIs with RSBP higher than a PSCCH threshold. In step 2308, the method 2300 moves PSCCH resources with smallest RSSI to PSCCH candidate resource sets $S_B$. In step 2318, the method 2300 determines whether there are any available candidate PSCCH/PSSCH resources in $S_B$ that lies in the same time slot. In step 2318, if there are available candidate PSCCH/PSSCH resources, the method 2300 in step 2320 randomly select the resources for PSCCH and PSSCH that lie in the same frequency RBs. And the method 2300 ends the method 2300 in step 2330. In step 2318, if there are no available candidate PSCCH/PSSCH resources, the method 2300 performs step 2322. In step 2322, the method 2300 determines there are any candidate resources for PSCCH and PSSCH that can be moved from $S_A$ to $S_B$. In step 2322, if there are candidate resources for PSCCH and PSSCH, the method 2300 in step 2326 moves another set of PSCCH resources from $S_A$ with smallest RSSI to PSCCH candidate resource sets $S_B$ and in step 2328 moves another set of PSSCH resources from $S_A$ with smallest RSSI to PSSCH candidate resource sets $S_B$. If there are no candidate resources for PSCCH and PSSCH in step 2322, the method 2300 increases both/either PSCCH-RSBP threshold and/or PSSCH-RSBP by a delta dB value in step 2324, and then procedure performs step 2302. The method 2300 starts PSCCH resource selection in step 2310. The method 2300 in step 2312 determines that $S_A$ is initialized to the union of all the candidate single-slot resources. The set $S_B$ is initialized to an empty set. In step 2314, the method 2300 excludes PSSCH resources that are reserved by decoded SCIs with RSBP higher than a PSSCH threshold. In step 2316, the method 2300 moves PSSCH resources with smallest RSSI to PSSCH candidate resource sets $S_B$ and then the method 2300 performs step 2318.

LBT Resource Allocation.

For option 1A where PSCCH and the associated PSSCH are multiplexed in the same slot, option 1B where PSCCH and the associated PSSCH are multiplexed in the same slot, option 2 and option 3, the sensing occasion can be slot based if the resource allocation is slot based, or sensing occasion can be mini-slot based if the resource allocation is mini-slot based.

For option 1A where PSCCH and the associated PSSCH are multiplexed in different slots, option 1B where PSCCH and the associated PSSCH are multiplexed in different slots, because PSCCH and its associated PSSCH can be located in different slots, there are opportunities that in one slot, the PSCCH symbols are occupied, but PSSCH symbols are not occupied. Therefore, for LBT procedure, the sensing occasion may start in the middle of the slot.

In one embodiment of step 1, the UE finds a set of candidate resources for LBT that are consecutive in both frequency domain and time domain and can meet the latency requirement for aperiodic/periodic traffic transmission.

There are two resource sets $S_A$ and $S_B$. The set $S_A$ is initialized to all the T-F resources in the selection window. The set $S_B$ is initialized to an empty set. If aperiodic services utilize the same resource pool as semi-persistent/periodic services, the UE needs to decode possible SCIs and exclude all resources from $S_A$ that partly or fully overlap with the resources that are reserved and indicated by the decoded SCIs of other UEs for the following reservation intervals within the selection window with the PSCCH-RSBP/PSSCH-RSBP measurement higher than a PSCCH-RSBP/PSSCH-RSBP threshold.

The UE also needs to exclude resources from $S_A$ that are reserved and indicated by SCIs for aperiodic services. Because different UEs may have both/either different numbers of OFDM symbols and/or different numbers of frequency RBs for corresponding PSCCH, blind decoding is required for each SCI by trying both/either different numbers of OFDM symbols and/or different numbers of frequency RBs for each SCI. The UE moves a (pre)configured number of candidate resources that meet the resource amount requirement for LBT detection to the candidate resource set $S_B$ e.g., with the smallest metric of RSSI in the sensing window or with longest number of available consecutive time slots.

When calculating RSSI, the UE needs to perform linear average of RSSI for past resources in the sensing window that don't overlap with resources occupied by aperiodic services. If there are no candidate resource sets in $S_B$, one option is to increase a PSSCH-RSBP threshold iteratively by a delta dB until there are a (pre)configured number of candidate resources in set $S_B$.

Figure 24:
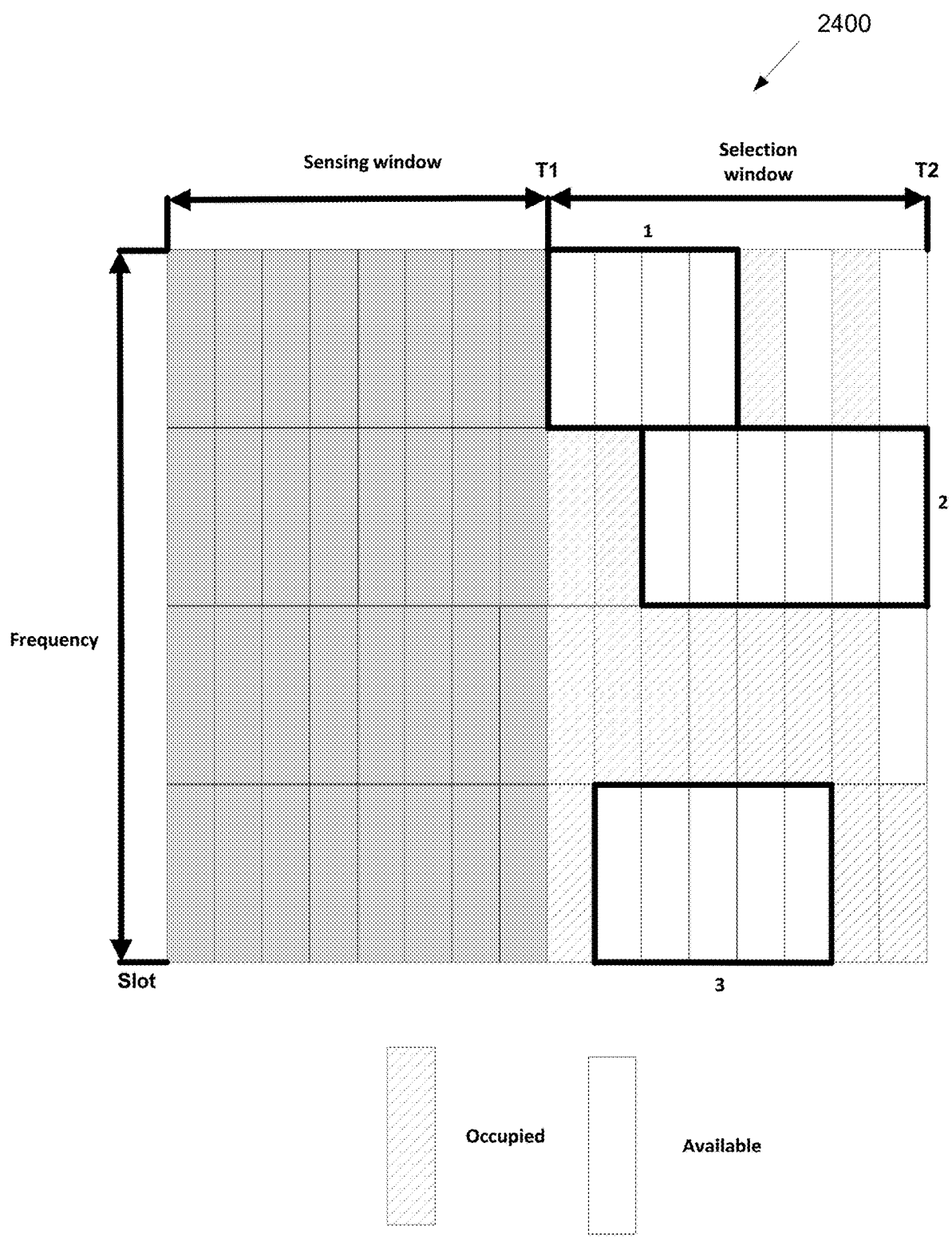
FIG. 24 illustrates an example frequency resource allocation according to embodiments of the present disclosure.

FIG. 24 illustrates an example frequency resource allocation 2400 according to embodiments of the present disclosure. The embodiment of the frequency resource allocation 2400 illustrated in FIG. 24 is for illustration only. FIG. 24 does not limit the scope of the present disclosure to any particular implementation.

As illustrated in FIG. 24, the UE needs one frequency resource in three consecutive slots to transmit a bursty/periodic packet. The UE excludes the resources that are reserved by other UEs from $S_A$ and moved the candidate resources of consecutive slots to $S_B$. So there are three candidate resources in $S_B$ numbered 1, 2 and 3 for LBT in FIG. 24. If a (pre)configured number of candidate resources is 2, the UE needs to move only 2 candidate resources to $S_B$. If the longest number of available consecutive time slots for candidate resources is used as the metric to select candidate resources to move to $S_B$, the candidate resources numbered 2 and 3 in FIG. 24 are moved to $S_B$ for LBT. If the smallest metric of RSSI is used as the metric to select candidate resources, and the candidate resources numbered 1 and 2 have the lowest metric of RSSI, candidate resources numbered 1 and 2 in FIG. 24 are moved to $S_B$ for LBT.

In one embodiment of step 2, the UE may use all or select only some of the candidate resources from set $S_B$ and does LBT resource sensing on these candidate resources respectively. When the resource allocation is slot based or mini-slot based for option 1A where PSCCH and the associated PSSCH are multiplexed in the same slot, option 1B where PSCCH and the associated PSSCH are multiplexed in the same slot and option 2 and option 3, the sensing occasion for LBT on each candidate resource is slot aligned or mini-slot aligned. Another option is the sensing occasion for LBT on each candidate resource may start from any OFDM symbol that is not excluded from set $S_A$.

For option 1A where PSCCH and the associated PSSCH are multiplexed in different slots, option 1B where PSCCH and the associated PSSCH are multiplexed in different slots, the sensing occasion for LBT on each candidate resource may start from any OFDM symbol that is not excluded from set $S_A$ and not occupied by PSCCH symbols.

In one embodiment, the LBT procedure is provided on each candidate resource selected for LBT. In one example, the LBT procedure sets $N=N_{init}$, where $N_{init}$ is a random number uniformly distributed between 0 and $CW_p$, and go to step 4. In one example, if N>0 and the eNB chooses to decrement the counter, set N=N−1. In one example, the LBT procedure senses the channel for additional slot duration, and if the additional slot duration is idle, goes to step 4; else, goes to step 5. In one example, if N=0, the LBT procedure stops; else, goes to step 2. In one example, the LBT procedure senses the channel until either a busy slot is detected within an additional defer duration Td or all the slots of the additional defer duration Td are detected to be idle. In one example, if the channel is sensed to be idle during all slot durations of the additional defer duration $T_d$, the LBT procedure goes to step 4; else, goes to step 5.

In one embodiment, the LBT procedure is provided on each candidate resource selected for LBT. The difference is that whenever the UE detects any transmission in current resource allocation slot, the LBT procedure is paused in current resource allocation slot. The UE may not resume the LBT until next available resource allocation slot. In one example, the LBT procedure sets $N=N_{init}$, where $N_{init}$ is a random number uniformly distributed between 0 and $CW_p$, and goes to step 4. In one example, if N>0 and the eNB chooses to decrement the counter, sets N=N−1. In one example, the LBT procedure senses the channel for additional slot duration, and if the additional slot duration is idle, goes to step 4; else, goes to step 5. In one example, if N=0, the LBT procedure stops; else, goes to step 2. In one example, the LBT procedure waits until next resource allocation slot to resume LBT procedure, and the LBT procedure goes to step 1.

In one example of selection of the N in each slot, when the UE fails to sense in current slot, N in next slot can be decreased by a value (e.g., n) to N−n. n may be configured by higher layers or set by the UE itself. The initial N at the beginning of each LBT can be configured by higher layers or set by the UE itself. There may be a constraint on the maximum value for N so that the remaining symbols in a resource allocation slot can be used for transmitting some data.

The slot duration and defer duration Td defined here can be configured to be a symbol duration or more or less than a symbol duration. When the LBT procedure finishes, and some candidate channels are sensed to be idle, the UE can (e.g., randomly or select the candidate channel with the longest available consecutive time slots) select one of the candidate channels to continue the following transmission. When the current timing is not slot or mini-slot aligned, the UE can transmit some data on one of the candidate channels until the timing comes to a slot or mini-slot time point.

This data may be data for other purposes other than aperiodic/periodic traffic packets. From the start of next slot or mini-slot, the UE starts to transmit the aperiodic/periodic packet. This data may also be data for other purposes other than aperiodic/periodic traffic packets followed by part of the aperiodic/periodic traffic packets (including either PSCCH or PSSCH or both).

There are some options for transmitting data other than traffic packet as shown in FIG. 25 to FIG. 30.

Figure 25:
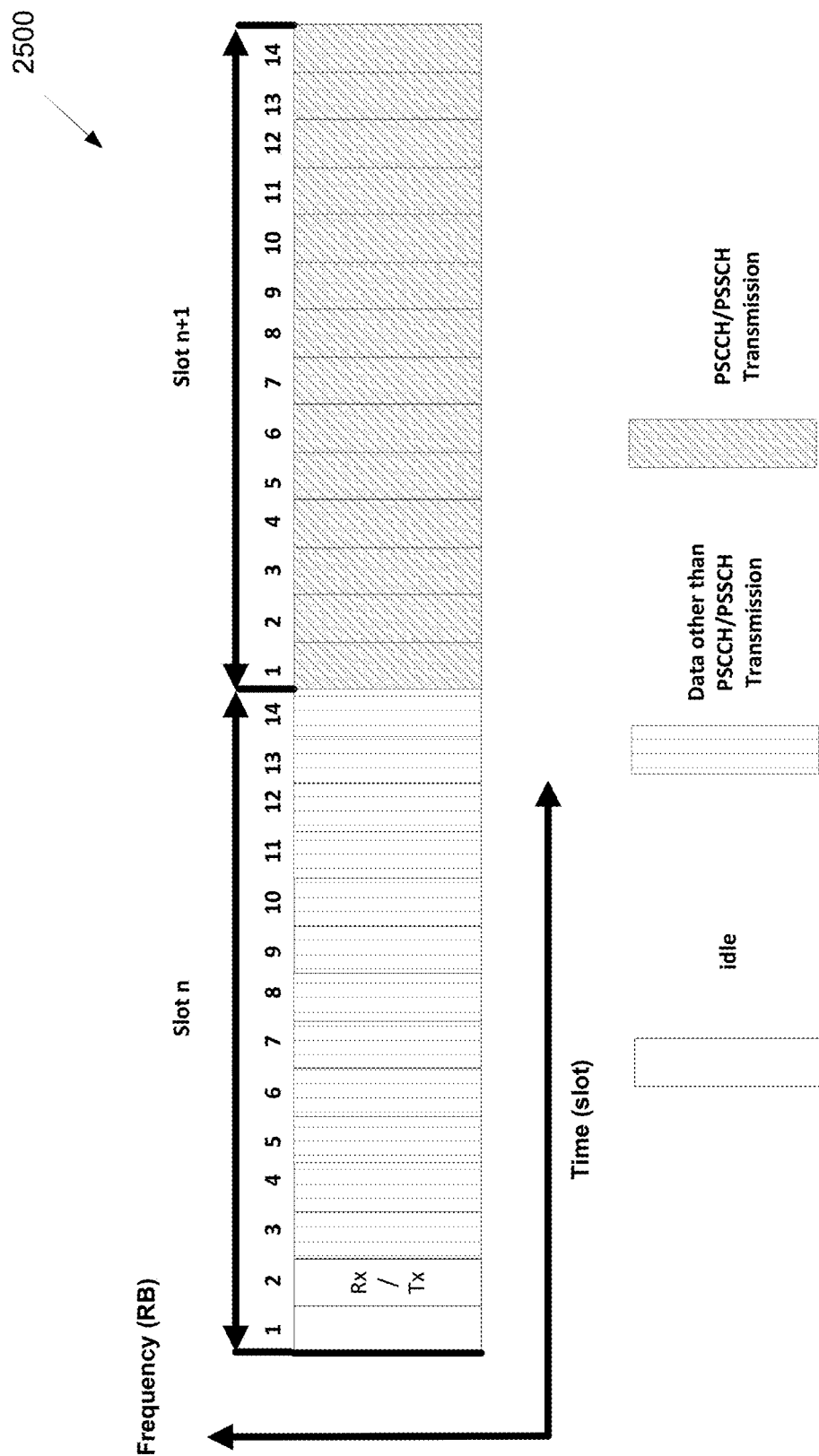
FIG. 25 illustrates an example frequency and time resource allocation according to embodiments of the present disclosure.

FIG. 25 illustrates an example frequency and time resource allocation 2500 according to embodiments of the present disclosure. The embodiment of the frequency and time resource allocation 2500 illustrated in FIG. 25 is for illustration only. FIG. 25 does not limit the scope of the present disclosure to any particular implementation.

Figure 26:
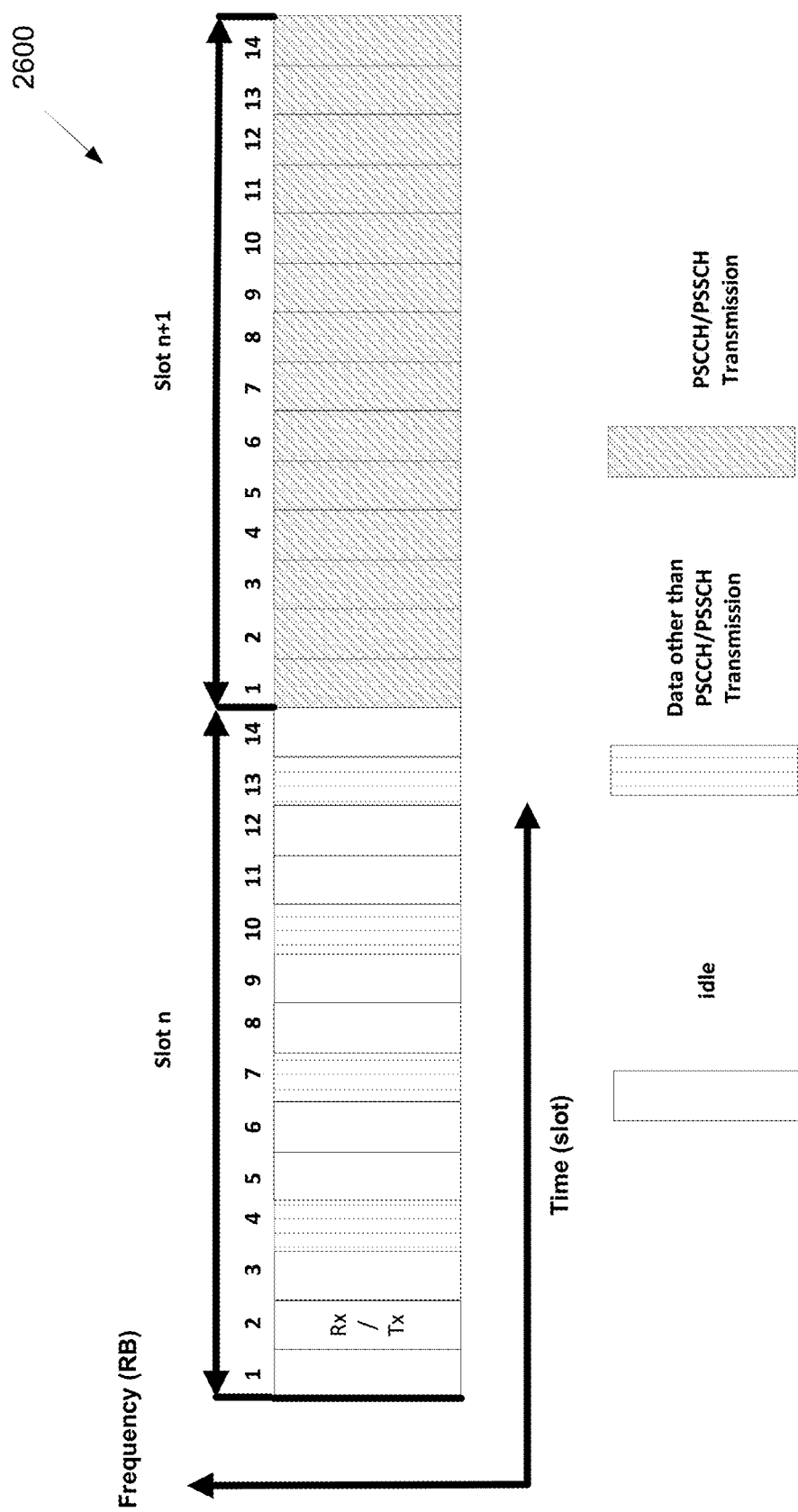
FIG. 26 illustrates another example frequency and time resource allocation according to embodiments of the present disclosure.

FIG. 26 illustrates another example frequency and time resource allocation 2600 according to embodiments of the present disclosure. The embodiment of the frequency and time resource allocation 2600 illustrated in FIG. 26 is for illustration only. FIG. 26 does not limit the scope of the present disclosure to any particular implementation.

Figure 27:
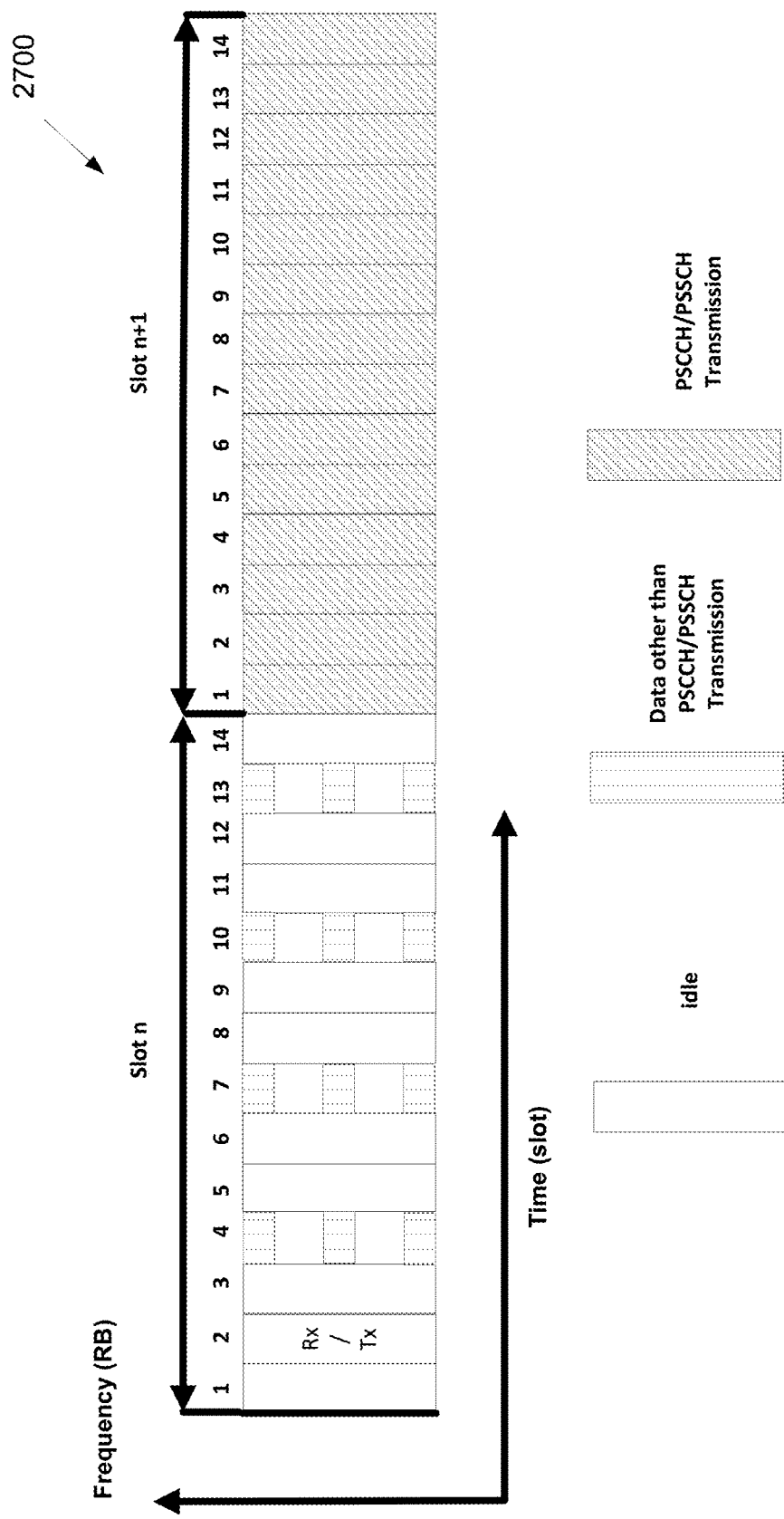
FIG. 27 illustrates yet another example frequency and time resource allocation according to embodiments of the present disclosure.

FIG. 27 illustrates yet another example frequency and time resource allocation 2700 according to embodiments of the present disclosure. The embodiment of the frequency and time resource allocation 2700 illustrated in FIG. 27 is for illustration only. FIG. 27 does not limit the scope of the present disclosure to any particular implementation.

Figure 28:
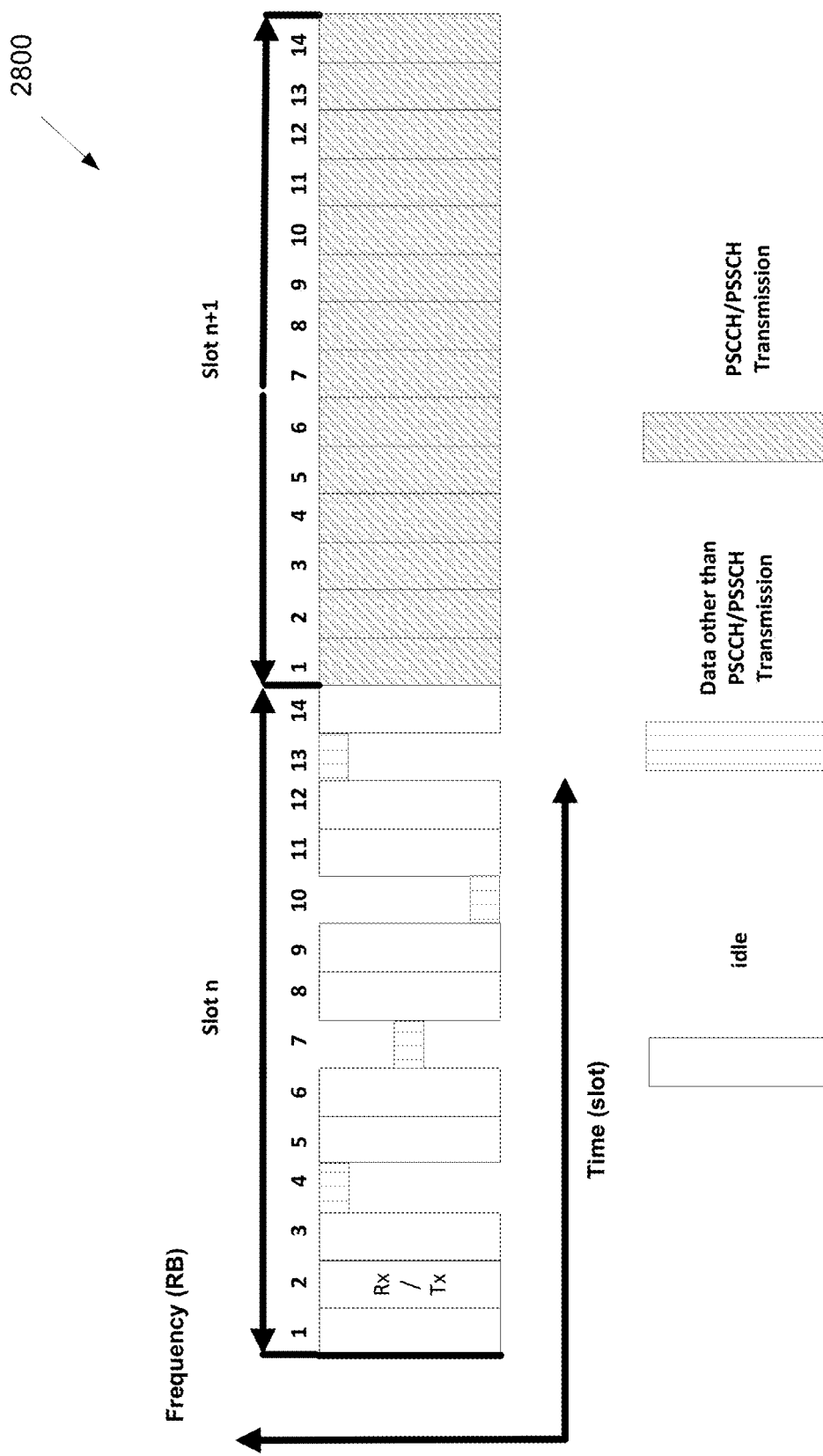
FIG. 28 illustrates yet another example frequency and time resource allocation according to embodiments of the present disclosure.

FIG. 28 illustrates yet another example frequency and time resource allocation 2800 according to embodiments of the present disclosure. The embodiment of the frequency and time resource allocation 2800 illustrated in FIG. 28 is for illustration only. FIG. 28 does not limit the scope of the present disclosure to any particular implementation.

Figure 29:
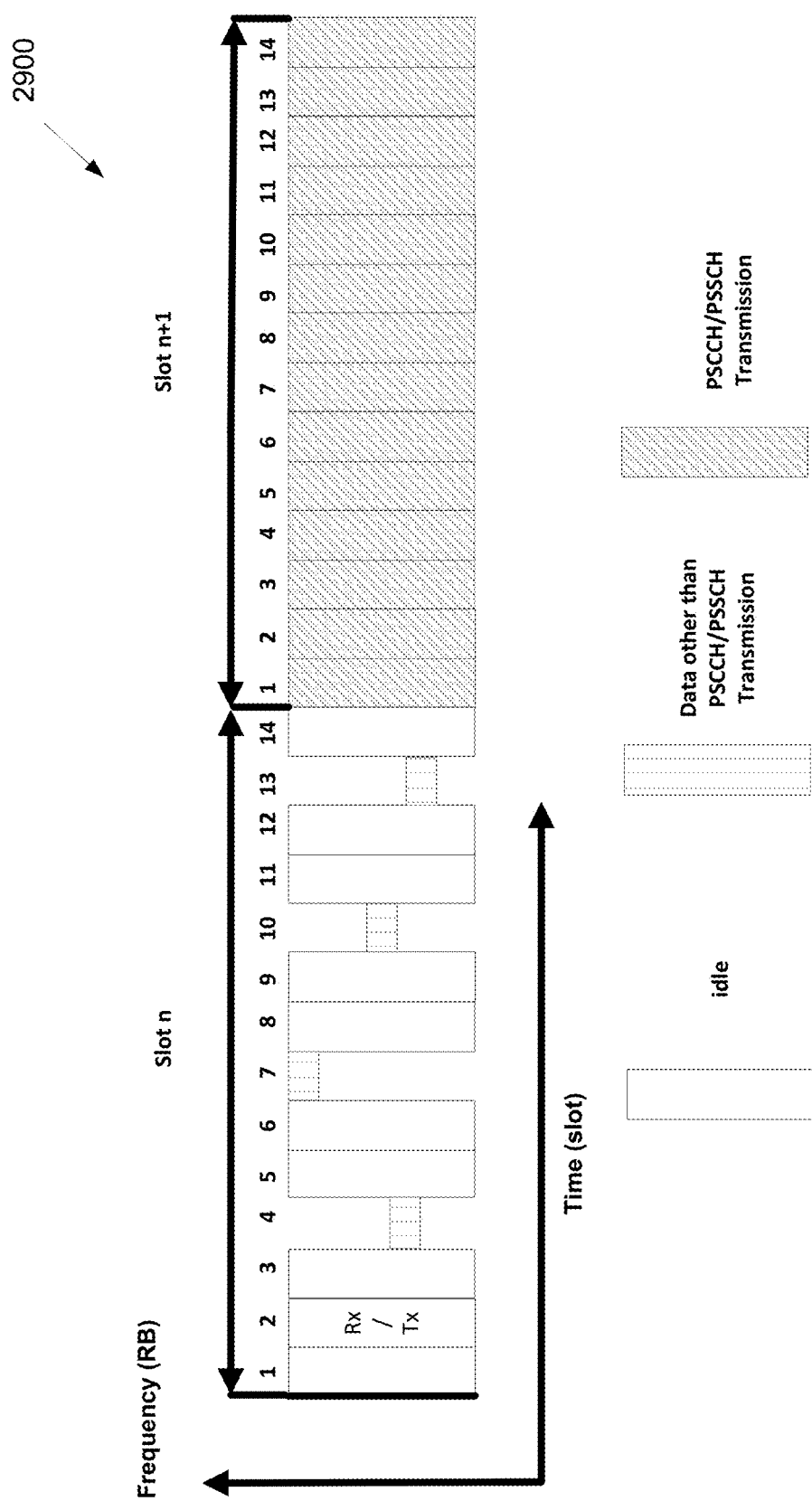
FIG. 29 illustrates yet another example frequency and time resource allocation according to embodiments of the present disclosure.

FIG. 29 illustrates yet another example frequency and time resource allocation 2900 according to embodiments of the present disclosure. The embodiment of the frequency and time resource allocation 2900 illustrated in FIG. 29 is for illustration only. FIG. 29 does not limit the scope of the present disclosure to any particular implementation.

Figure 30:
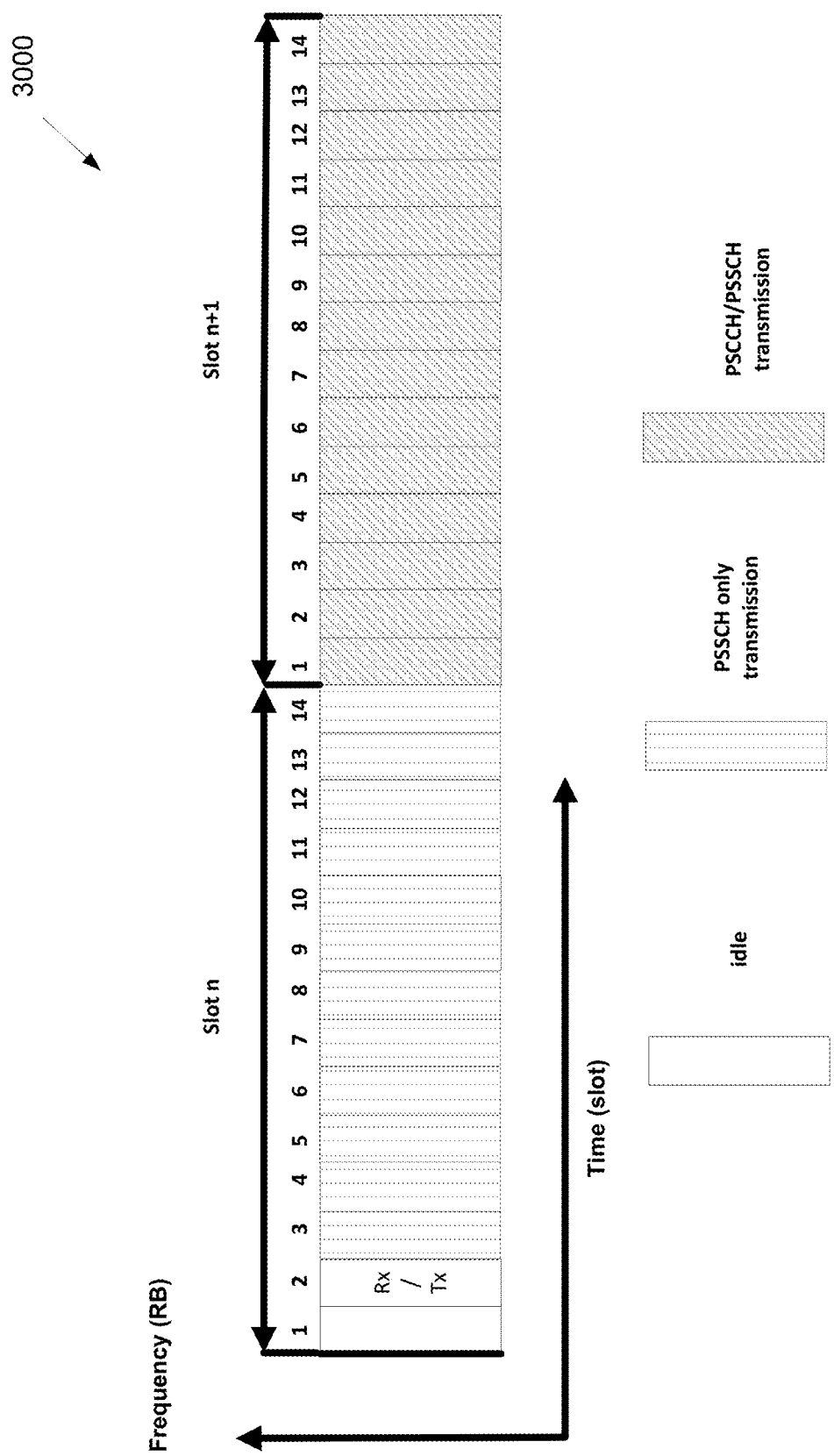
FIG. 30 illustrates yet another example frequency and time resource allocation according to embodiments of the present disclosure.

FIG. 30 illustrates yet another example frequency and time resource allocation 3000 according to embodiments of the present disclosure. The embodiment of the frequency and time resource allocation 3000 illustrated in FIG. 30 is for illustration only. FIG. 30 does not limit the scope of the present disclosure to any particular implementation.

Figure 31:
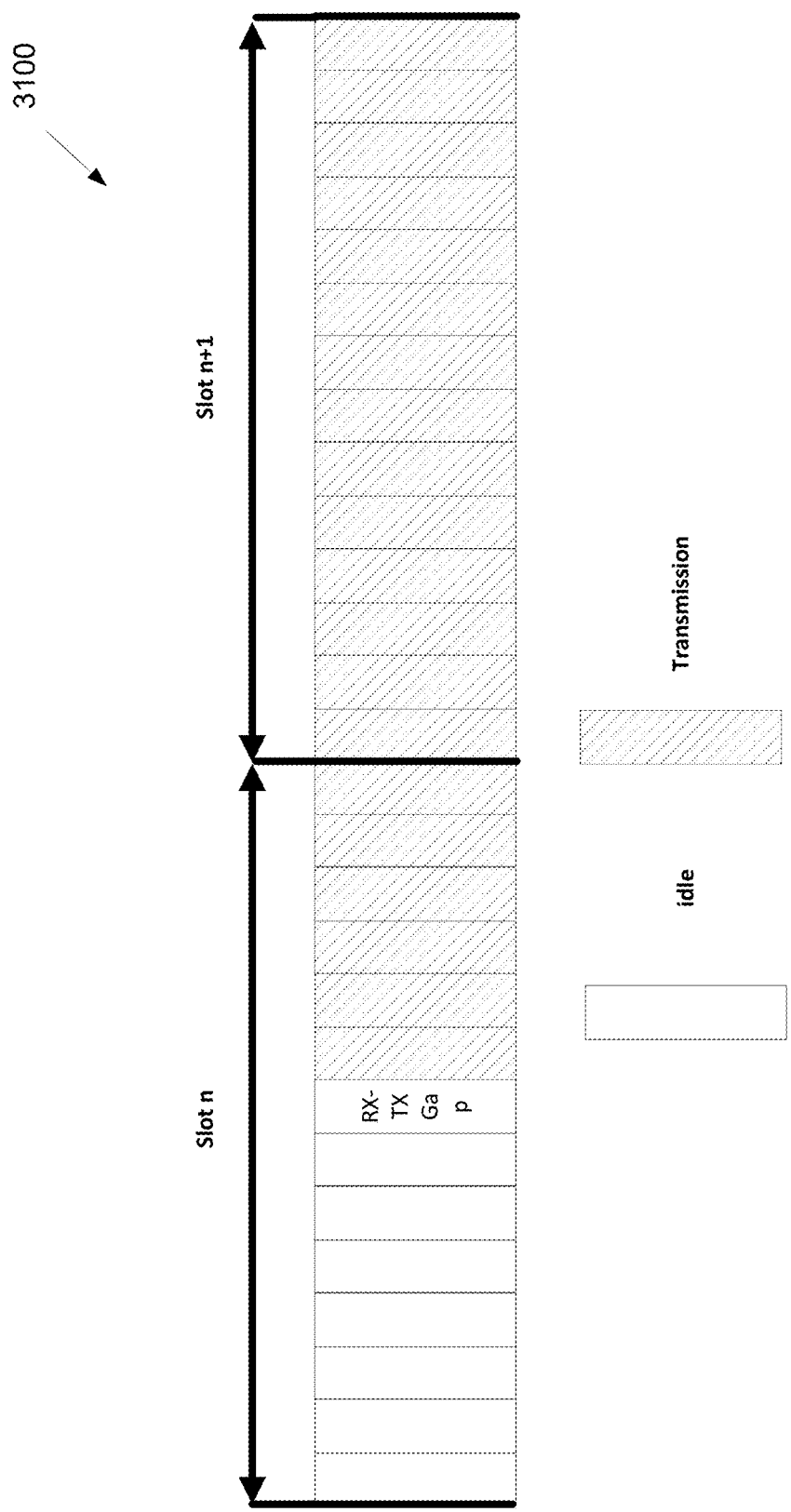
FIG. 31 illustrates yet another example frequency and time resource allocation according to embodiments of the present disclosure.
Figure 32:
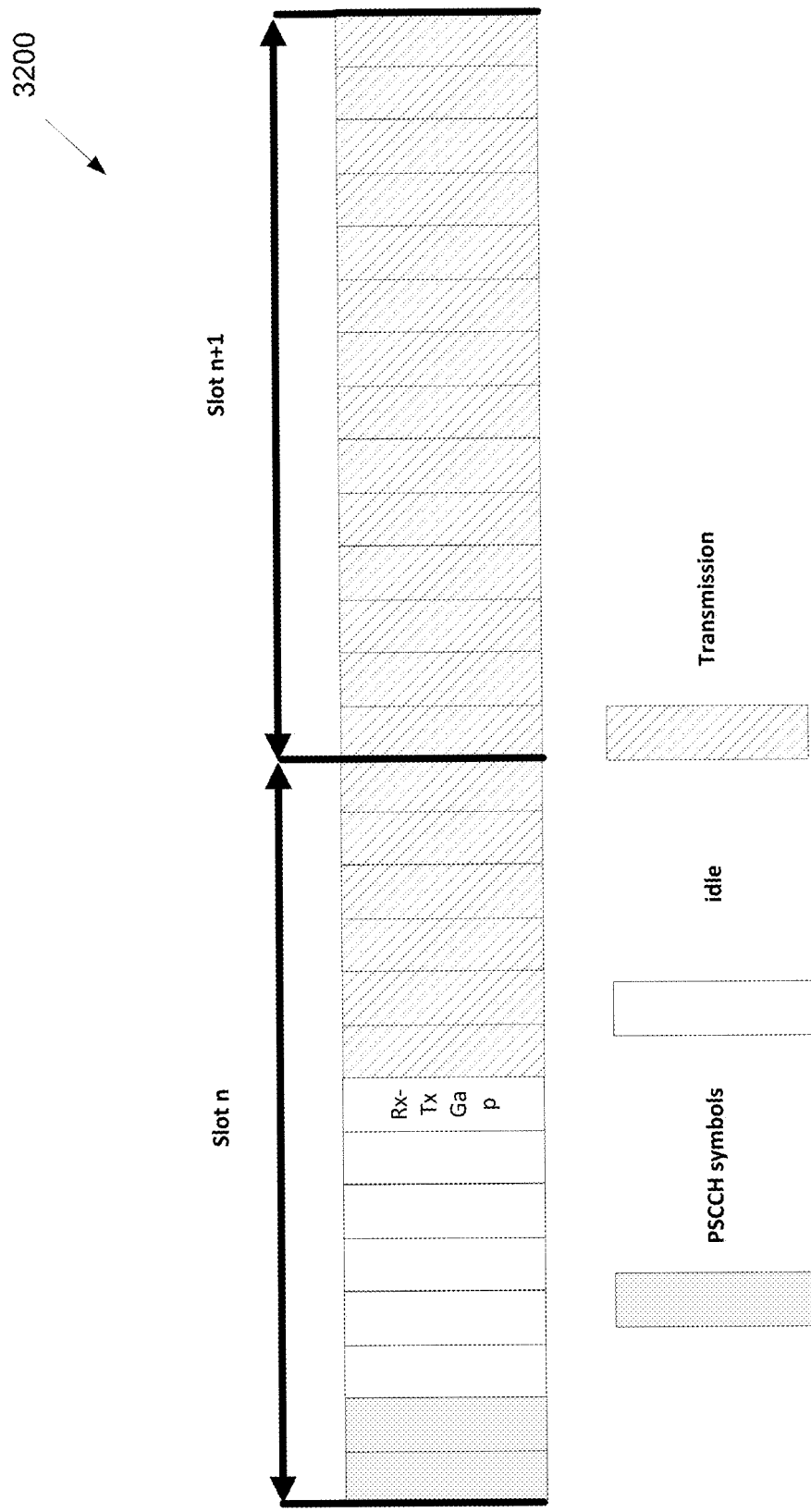
FIG. 32 illustrates yet another example frequency and time resource allocation according to embodiments of the present disclosure.

In one embodiment of option 1 as illustrated in FIGS. 31 and 32, the data may be a separate control channel that indicates the resources reserved by the following PSCCH and PSSCH. The timing point when this data is transmitted may be aligned with a unit of m symbols in order to reduce blind decoding complexity. The receiver UE may decode this data starting at some fixed symbols. The number of symbols that this data occupies may be fixed or configured to l symbols.

Following this data are the PSCCH and PSSCH symbols. The bandwidth that this data occupies may be the same as that of PSCCH and/or PSSCH symbols. In order to reduce blind decoding complexity, the bandwidth that this data occupies may also be fixed to a number of RBs. Other resources or resources on symbols that are not occupied by this data may be used to transmit some trash data so that other UEs may be aware that resources are occupied by another UE when performing LBT.

This data may carry a time or frequency domain or both domains resource allocation information of PSCCH that can reduce the blind decoding complexity for PSCCH.

In one embodiment of option 2 as illustrated in FIGS. 31 and 32, the data may be a separate control channel that indicates the resources reserved by the following PSCCH and PSSCH. The timing point when this data is transmitted may be aligned with a unit of m symbols in order to reduce blind decoding complexity. The receiver UE may decode this data starting at some fixed symbols. The number of symbols that this data occupies may be fixed or configured to l symbols. A repetition of this data may be performed until the end of the slot that can improve the decoding performance if there are sufficient symbols available for repetition transmission.

The bandwidth that this data occupies may be the same as that of PSCCH and/or PSSCH symbols. In order to reduce blind decoding complexity, the bandwidth that this data occupies may also be fixed to a number of RBs. Other resources or resources on symbols that are not occupied by this data may be used to transmit some trash data so that other UEs may be aware that resources are occupied by another UE when performing LBT.

This data may carry a time or frequency domain or both domains resource allocation information of PSCCH that can reduce the blind decoding complexity for PSCCH.

In one embodiment of option 3 as illustrated in FIGS. 31 and 32, the data may be PSCCH itself that indicates the resources reserved by the following PSSCH. The timing point when this PSCCH is transmitted may be aligned with a unit of m symbols in order to reduce blind decoding complexity. The receiver UE may decode this PSCCH starting at some fixed symbols. The number of symbols that this PSCCH occupies may be fixed or configured to l symbols. Following this PSCCH are the PSSCH symbols.

The bandwidth that this PSCCH occupies may be the same as that of PSSCH symbols. In order to reduce blind decoding complexity, the bandwidth that this data occupies may also be fixed to a number of RBs. Other resources or resources on symbols that are not occupied by this PSCCH may be used to transmit some trash data so that other UEs may be aware that resources are occupied by another UE when performing LBT.

In one embodiment of option 4 as illustrated in FIGS. 31 and 32, the data may be PSCCH itself that indicates the resources reserved by the following PSSCH. The timing point when this PSCCH is transmitted may be aligned with a unit of m symbols in order to reduce blind decoding complexity. The receiver UE may decode this PSCCH starting at some fixed symbols. The number of symbols that this PSCCH occupies may be fixed or configured to 1 symbols. A repetition of this PSCCH may be performed that can improve the decoding performance if there are sufficient symbols available for repetition transmission.

The bandwidth that this PSCCH occupies may be the same as that of PSSCH symbols. In order to reduce blind decoding complexity, the bandwidth that this data occupies may also be fixed to a number of RBs. Other resources or resources on symbols that are not occupied by this PSCCH may be used to transmit some trash data so that other UEs may be aware that resources are occupied by another UE when performing LBT.

In one embodiment of option 5 as illustrated in FIG. 25, the data is reservation data only for reservation purpose. The exact data is up to UE implementation. The PSCCH/PSSCH is transmitted in the next slot. Below is an example for option 5 where slot n is for sensing slot. The remaining symbols other than for sensing purpose in the sensing slot is used for data other than PSCCH/PSSCH transmission. The data is only for reservation purpose. From slot n+1, PSCCH/PSSCH is started for transmission.

In one example of option 6 as illustrated in FIGS. 26 to 29, the data is reservation data only for reservation purpose. The exact data is up to UE implementation. The PSCCH/PSSCH is transmitted in the next slot. Below is an example for option 6 where slot n is for sensing slot. The remaining symbols other than for sensing purpose in the sensing slot is used for data other than PSCCH/PSSCH transmission. The data is only for reservation purpose. From slot n+1, PSCCH/PSSCH is started for transmission.

For the data transmitted in each sensing slot, only at symbols where other UEs may perform sensing data is transmitted by a UE for reservation purpose when the UE senses the channel to be idle. In one example, when a UE performs sensing at symbol 1 in slot n to be idle, the UE may transmit data only at symbols 4, 7, 10 and 13 for reservation purpose. In this example, it is assumed that UEs perform sensing only at symbols 1, 4, 7, 10 and 13.

For the data transmitted in each sensing slot, only at symbols where other UEs may perform sensing data is transmitted by a UE for reservation purpose when the UE senses the channel to be idle. In the frequency domain, only subcarriers where other UEs may perform sensing data are transmitted for reservation purpose. In one example, when a UE performs sensing at symbol 1 in slot n to be idle on some of the subcarriers, the UE may transmit data only at symbols 4, 7, 10 and 13 for reservation purpose on some of the subcarriers. In this example, it is assumed that UEs perform sensing only at symbols 1, 4, 7, 10 and 13 on some of the subcarriers.

Different UEs may send data in some or all of the subcarriers for reservation purpose. The subcarriers that can be used for transmission can be (pre)configured in each OFDM sensing symbol. In each OFDM sensing symbol, the location of the subcarriers can also be different. In each RB or subchannel, the location of the subcarriers can also be different. For example, one subcarrier every RB in a fixed location in an OFDM sensing symbol is (pre)configured to transmit data for reservation purpose.

In different OFDM sensing symbols, the subcarrier's location can vary. The subcarriers that can be used for transmission for different UEs in each OFDM sensing symbol can also be (pre)configured to be different. In this case, the UE can select the subcarrier(s) location among the (pre)configuration(s).

In one example, for a UE, the subcarriers used for reservation can differ from one OFDM sensing symbol to another OFDM sensing symbol.

In another example, for a different UE, the subcarriers used for reservation can differ from the subcarriers for another UE in each OFDM sensing symbol.

Transmission Power of the Data in Sensing Slots.

In one example, for option 5 (e.g., illustrated in FIG. 25) and option 6 (e.g., illustrated in FIGS. 26 to 29), because the data in the sensing slot is transmitted only for reservation purpose, the data is not necessarily transmitted with the same power as the PSCCH/PSSCH power. A lower transmission power than PSCCH/PSSCH is required for a lower impact on the AGC of other UEs receiving data in the slot. A power offset of the data for reservation purpose to PSCCH/PSSCH may be specified or predefined.

In one example of option 7 as illustrated in FIG. 30, the data is PSSCH only data in slot n. The PSCCH/PSSCH is transmitted in the next slot. Below is an example for option 7 where slot n is for sensing slot. The remaining symbols other than for sensing purpose in the sensing slot is used for data of PSSCH only transmission. From slot n+1, PSCCH/PSSCH is started for transmission. FIG. 31 illustrates yet another example frequency and time resource allocation 3100 according to embodiments of the present disclosure. The embodiment of the frequency and time resource allocation 3100 illustrated in FIG. 31 is for illustration only. FIG. 31 does not limit the scope of the present disclosure to any particular implementation.

In one example is shown in FIG. 31. For option 1A where PSCCH and the associated PSSCH are multiplexed in the same slot, option 1B where PSCCH and the associated PSSCH are multiplexed in the same slot and option 2 and option 3. For a candidate resource selected for LBT, the UE does the LBT starting from slot n, where the UE detects the channel to be idle for 7 OFDM symbols. Before transmission, the UE needs to perform RX-RX switching at OFDM symbol 8.

In one example of option 1, this data in slot n may be a separate control channel followed by the PSCCH and PSSCH. If this separate control channel occupies 2 symbols and aligned with a unit of 2 symbols, the separate control channel is transmitted at OFDM symbols 9-10. From OFDM symbols 11 in slot n to slot n+1, the UE transmits the PSCCH and PSSCH of the aperiodic/periodic packet.

In one example of option 2, this data in slot n may be a separate control channel with repetitions. If this separate control channel occupies 2 symbols and aligned with a unit of 2 symbols, the separate control channel is transmitted at OFDM symbols 9-10 with repetitions at OFDM symbols 11-12 and 13-14. From slot n+1, the UE begins to transmit the PSCCH and PSSCH of the aperiodic/periodic packet.

In one example of for option 3, this data in slot n may be the PSCCH. If this PSCCH occupies 2 symbols and aligned with a unit of 2 symbols, the PSCCH is transmitted at OFDM symbols 9-10. From OFDM symbols 11 in slot n to slot n+1, the UE transmits the PSSCH of the aperiodic/periodic packet.

In one example of option 4, this data in slot n may be the PSCCH with repetitions. If this PSCCH occupies 2 symbols and aligned with a unit of 2 symbols, the PSCCH is transmitted at OFDM symbols 9-10 with repetitions at OFDM symbols 11-12 and 13-14. From slot n+1, the UE begins to transmit the PSSCH of the aperiodic/periodic packet.

FIG. 32 illustrates yet another example frequency and time resource allocation 3200 according to embodiments of the present disclosure. The embodiment of frequency and time resource allocation 3200 illustrated in FIG. 32 is for illustration only. FIG. 32 does not limit the scope of the present disclosure to any particular implementation.

As illustrated in FIG. 32, for option 1A where PSCCH and the associated PSSCH are multiplexed in different slots, option 1B where PSCCH and the associated PSSCH are multiplexed in different slots. For a candidate resource selected for LBT, the UE starts the LBT in slot n from OFDM symbol 3, where the UE detects the channel to be idle for 5 OFDM symbols from OFDM symbol 3-7 (OFDM symbol 1-2 is used for PSCCH and occupied by PSCCH). Before transmission, the UE needs to perform Rx-Tx switching at OFDM symbol 8.

In one example of option 1, this data in slot n may be a separate control channel followed by the PSCCH and PSSCH. If this separate control channel occupies 2 symbols and aligned with a unit of 2 symbols, the separate control channel is transmitted at OFDM symbols 9-10. From OFDM symbols 11 in slot n to slot n+1, the UE transmits the PSCCH and PSSCH of the aperiodic/periodic packet.

In one example of option 2, this data in slot n may be a separate control channel with repetitions. If this separate control channel occupies 2 symbols and aligned with a unit of 2 symbols, the separate control channel is transmitted at OFDM symbols 9-10 with repetitions at OFDM symbols 11-12 and 13-14. From slot n+7, the UE begins to transmit the PSCCH and PSSCH of the aperiodic/periodic packet.

In one example of option 3, this data in slot n may be the PSCCH. If this PSCCH occupies 2 symbols and aligned with a unit of 2 symbols, the PSCCH is transmitted at OFDM symbols 9-10. From OFDM symbols 11 in slot n to slot n+1, the UE transmits the PSSCH of the aperiodic/periodic packet.

In one example of option 4, this data in slot n may be the PSCCH with repetitions. If this PSCCH occupies 2 symbols and aligned with a unit of 2 symbols, the PSCCH is transmitted at OFDM symbols 9-10 with repetitions at OFDM symbols 11-12 and 13-14. From slot n+1, the UE begins to transmit the PSSCH of the aperiodic/periodic packet.

Figure 33:
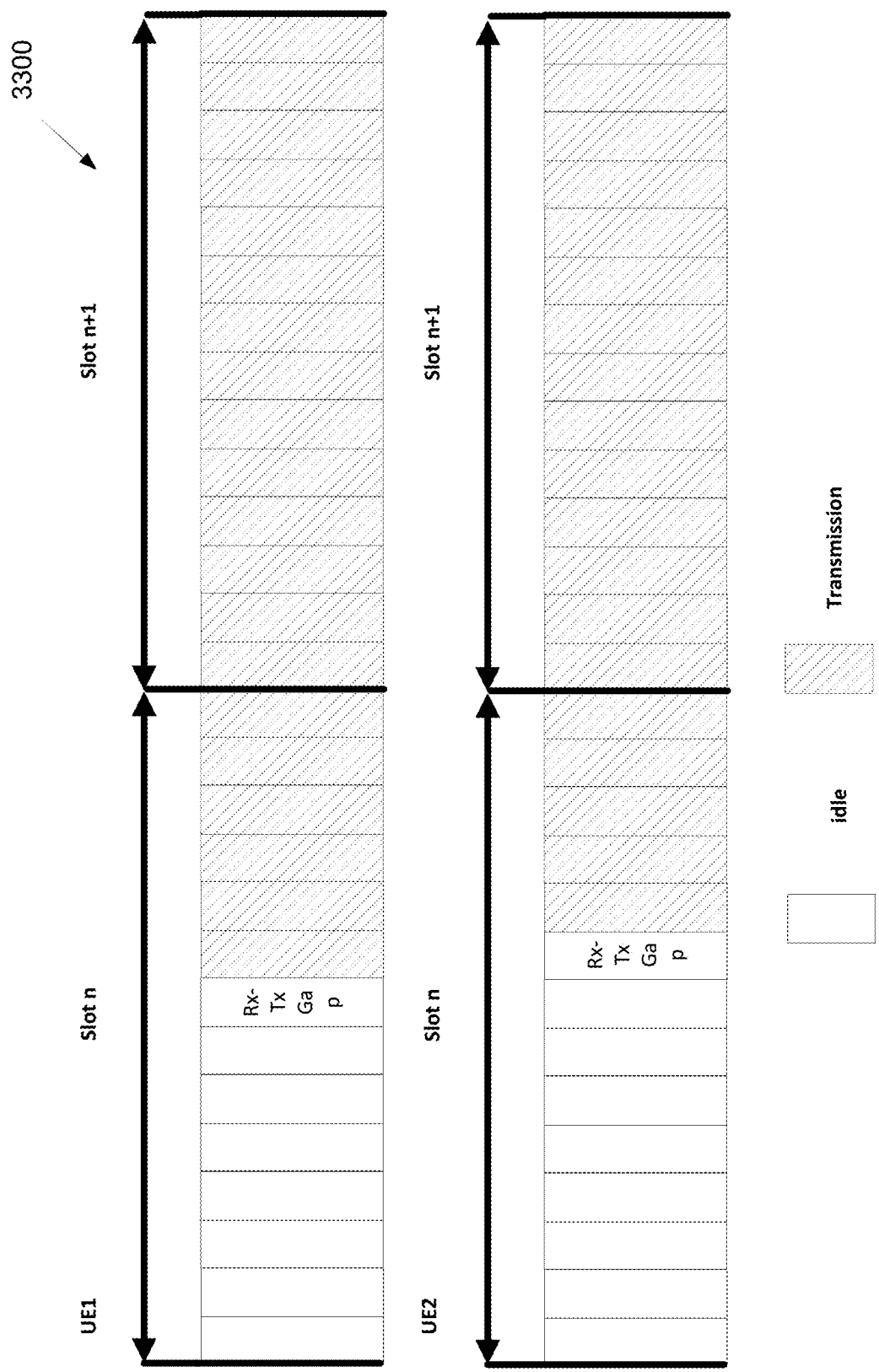
FIG. 33 illustrates yet another example frequency and time resource allocation according to embodiments of the present disclosure.

FIG. 33 illustrates yet another example frequency and time resource allocation 3300 according to embodiments of the present disclosure. The embodiment of the frequency and time resource allocation 3300 illustrated in FIG. 33 is for illustration only. FIG. 33 does not limit the scope of the present disclosure to any particular implementation.

Figure 34:
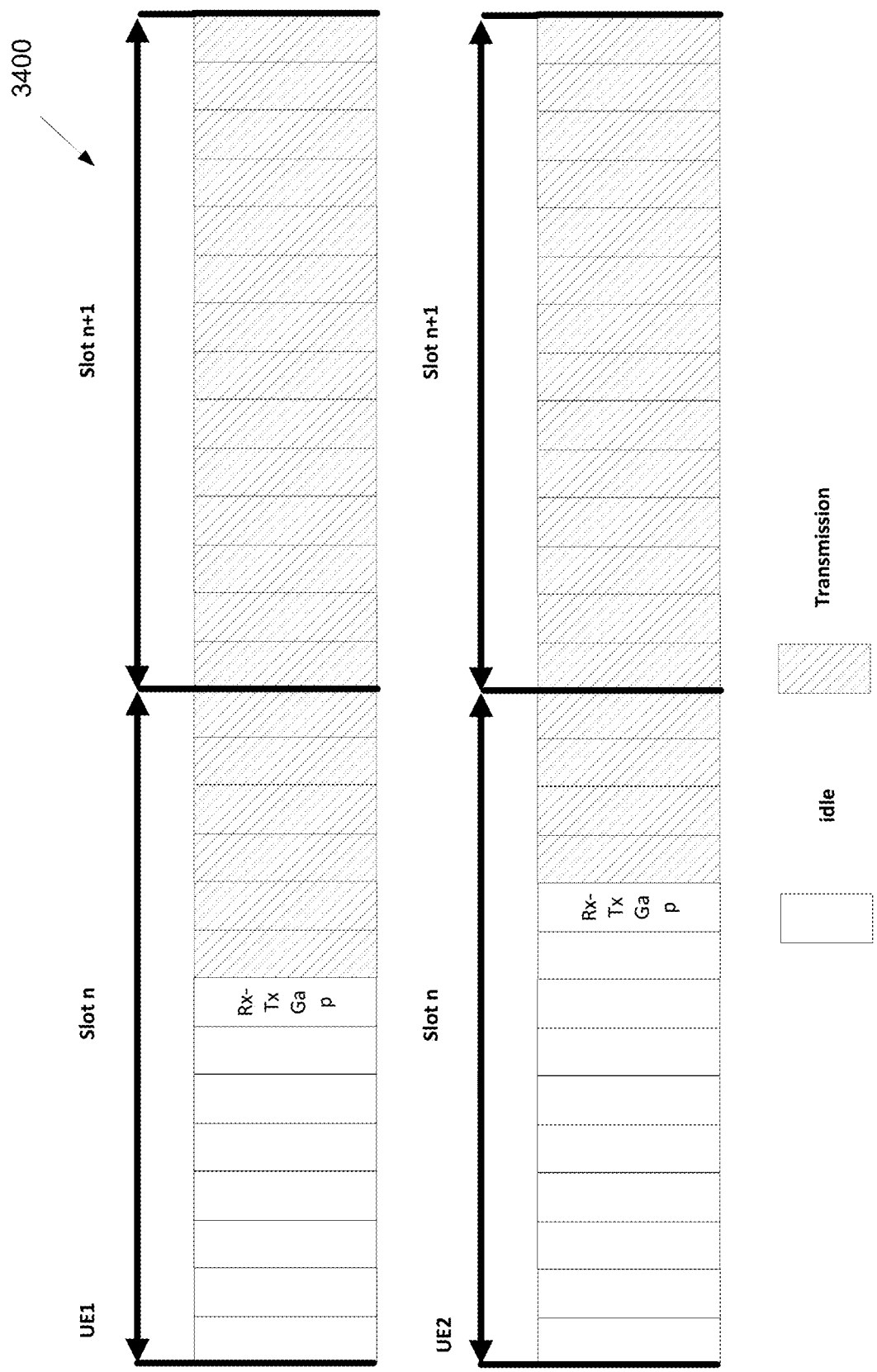
FIG. 34 illustrates yet another example frequency and time resource allocation according to embodiments of the present disclosure.

FIG. 34 illustrates yet another example frequency and time resource allocation 3400 according to embodiments of the present disclosure. The embodiment of the frequency and time resource allocation 3400 illustrated in FIG. 34 is for illustration only. FIG. 34 does not limit the scope of the present disclosure to any particular implementation.

Figure 35:
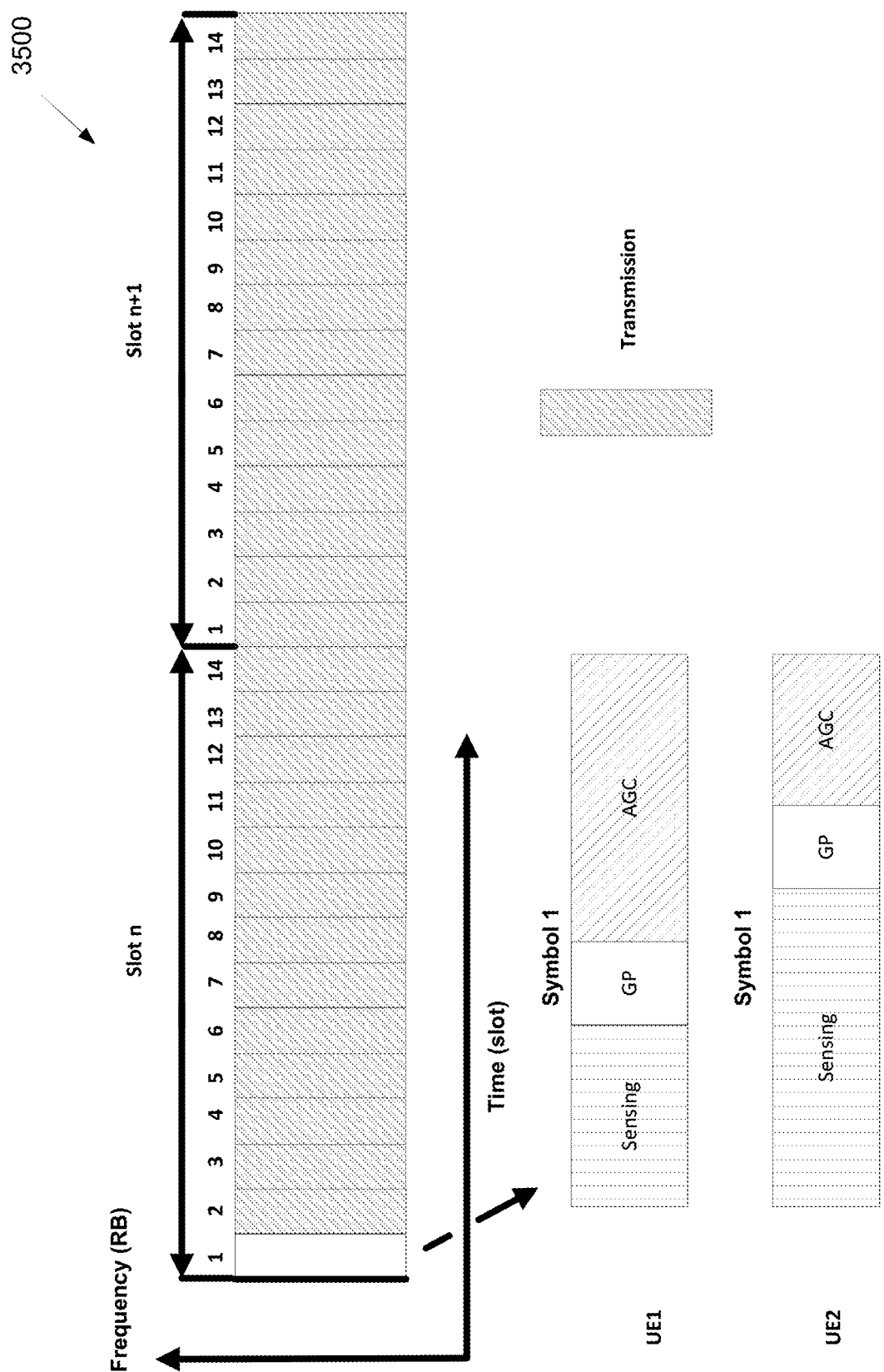
FIG. 35 illustrates yet another example frequency and time resource allocation according to embodiments of the present disclosure.

FIG. 35 illustrates yet another example frequency and time resource allocation 3500 according to embodiments of the present disclosure. The embodiment of the frequency and time resource allocation 3500 illustrated in FIG. 35 is for illustration only. FIG. 35 does not limit the scope of the present disclosure to any particular implementation.

Due to half-duplex, there is a problem of resource collision if no restriction on the counter N is applied. Consider a case shown in FIG. 33 where the counter N can take a continuous number, 0, 1, 2 . . . . If a UE1 senses the channel to be idle until OFDM symbol 7 (N=7 for UE1), the UE 1 performs Rx-Tx switching at OFDM symbol 8. Because the UE1 doesn't transmit data at OFDM symbol 8 (Rx-Tx switching at OFDM symbol 8), a UE2 also senses the channel to be idle until OFDM symbol 8 (N=8 for UE2). Both the UE1 and the UE2 sense the channel is idle and can be used for data transmission. A resource collision between the UE1 and the UE2 may result.

A solution to this problem is as follows. A constraint on the number the counter N can be applied. If the counter N takes the numbers of 0, 1, 3, 5 . . . or 0, 2, 4 . . . , then the collision can be avoided. That means there is a difference of at least 2 between any two numbers that the counter N can take except the number 0. Considering an example shown in FIG. 33 and FIG. 34, a UE1 senses the channel to be idle until OFDM symbol 7 (N=7 for UE1), and performs Rx-Tx switching at OFDM symbol 8. A UE2 also senses the channel to be idle until OFDM symbol 8, but senses the channel to be busy at OFDM symbol 9 (N=9 for UE2). The UE2 senses the channel to be busy and may not start the data transmission. A resource collision due to half-duplex between the UE1 and the UE2 can be avoided.

Another Method for Sensing.

In NR V2X, the first symbol only in the sensing slot may be used for sensing. The first symbol may include three parts: a sensing part, a GP part (guard period), and an AGC (automatic gain control) part. To avoid collision, different UEs may have different length of sensing part, thus the different length of AGC part.

FIG. 35 shows the structure for the first symbol used in the sensing. In the sensing, each UE senses in a period of time (sensing part) that is (pre)configured or determined by the UE itself. If the symbol is sensed to be idle, the UE can start a transmission from the AGC part after the GP time. In order to differentiate between different UEs, the sensing time length difference between different UEs may be at least be greater than a GP length so that a UE with a larger sensing time may still be performing sensing when the other UE with a smaller sensing time starts an AGC transmission.

Methods to Reduce Resource Fragmentation.

Reducing resource fragmentation in both/either time domain and/or frequency domain is beneficial. For frequency domain fragmentation, it might lead to resource holes in frequency domain that cannot be efficiently exploited by UEs incapable of transmitting on non-contiguous set of resources. For time domain fragmentation, an aperiodic service may need consecutive slot resources for bursty packet transmissions. Consecutive slot resources are also useful for sensing in both periodic and aperiodic services because periodic and aperiodic services need to know how long the aperiodic service may occupy the T-F resources. A number of consecutive slots of T-F resources are useful to indicate in the control channel to other UEs how long the UE needs to occupy the T-F resources. The UE performing sensing may exclude the resources that are reserved by aperiodic services. Three cases needs to be considered depending upon the services that are multiplexed in the same resource pool.

Periodic Service Only.

In one embodiment, instead of randomly selecting a resource from set $S_B$, the UE autonomously selects a subset of resources from set $S_B$ that are neighboring with other excluded resources in the frequency domain and in the same time slot. If there are more than one resource in the selected subset, the UE may randomly select one resource from the subset.

In one embodiment, the UE selects a subset of resources from set $S_B$ that are located in the same frequency as resources that are excluded from set $S_A$, but differ (e.g., neighboring) in the time domain. If there are more than one resource in the selected subset, the UE may randomly select one resource from the subset.

Aperiodic Service Only.

In one embodiment, the UE autonomously select the resources from set $S_B$ to perform LBT that are neighboring with other excluded resources in the time domain, but in the same resources as or overlapping with those excluded resources in the frequency domain.

In one embodiment, the UE autonomously selects a subset of resources from set $S_B$ that are neighboring with other excluded resources in the frequency domain.

Periodic+Aperiodic Service.

In one embodiment for sensing for periodic services, instead of randomly selecting a resource from set $S_B$, the UE autonomously selects a subset of resources from set $S_B$ that are neighboring with other excluded resources in the frequency domain and in the same time slot. If there are more than one resource in the selected subset, the UE may randomly select one resource from the subset.

In another embodiment for sensing for periodic services, the UE selects a subset of resources from set $S_B$ that are located in the same frequency as resources that are excluded from set $S_A$, but neighboring in the time domain. If there are more than one resource in the selected subset, the UE may randomly select one resource from the subset.

In yet another embodiment for sensing for aperiodic services, the UE autonomously selects the resources from set $S_B$ to perform LBT that are neighboring with other excluded resources in the time domain, but in the same resources as or overlapping with those excluded resources in the frequency domain.

In yet another embodiment for sensing for aperiodic services, the UE autonomously selects a subset of resources from set $S_B$ that are neighboring with other excluded resources in the frequency domain.

A physical sidelink feedback channel (PSFCH) is defined and it is supported to convey SFCI for unicast and groupcast via PSFCH.

Sensing procedure is defined as SCI decoding from other UEs and/or sidelink measurements: information extracted from SCI decoding; sidelink measurements used; UE behavior and timescale of sensing procedure; it is up to further discussion whether SFCI is to be used in sensing procedure; and sensing procedure can be discussed in the context of other modes.

Resource (re)-selection procedure uses results of sensing procedure to determine resource(s) for sidelink transmission: timescale and conditions for resource selection or re-selection; resource selection/re-selection details for PSCCH and PSSCH transmissions; PSFCH (e.g. whether resource (re)-selection procedure based on sensing is used or there is a dependency/association b/w PSCCH/PSSCH and PSFCH resource); and impact of sidelink QoS attributes on resource selection/re-selection procedure.

Sidelink control information (SCI) is defined. SCI is transmitted in PSCCH. SCI includes at least one SCI format which includes the information necessary to decode the corresponding PSSCH: NDI, if defined, is a part of SCI.

Sidelink feedback control information (SFCI) is defined. SFCI includes at least one SFCI format which includes HARQ-ACK for the corresponding PSSCH: whether a solution may use only one of "ACK," "NACK," "DTX," or use a combination of them. How to include other feedback information (if supported) in SFCI may be provided. How to convey SFCI on sidelink in PSCCH, and/or PSSCH, and/or a new physical sidelink channel may be provided.

In the context of Mode 1, it may be provided: whether/how to convey information for SCI on downlink; and whether/how to convey information of SFCI on uplink.

At least two sidelink resource allocation modes are defined for NR-V2X sidelink communication. In one example of Mode 1, base station schedules sidelink resource(s) to be used by UE for sidelink transmission(s). In one example of Mode 2, a UE determines (i.e. base station does not schedule) sidelink transmission resource(s) within sidelink resources configured by base station/network or pre-configured sidelink resources. In one example, an eNB control of NR sidelink and gNB control of LTE sidelink resources may be separately considered in corresponding agenda items. In one example, Mode-2 definition covers potential sidelink radio-layer functionality or resource allocation sub-modes (subject to further refinement including merging of some or all of them) where: a UE autonomously selects sidelink resource for transmission; a UE assists sidelink resource selection for other UE(s); a UE is configured with NR configured grant (type-1 like) for sidelink transmission; and/or a UE schedules sidelink transmissions of other UEs.

At least for sidelink HARQ feedback. NR sidelink supports at least a PSFCH format which uses last symbol(s) available for sidelink in a slot.

A physical uplink control channel (PUCCH) carries the uplink control information (UCI) from the UE to the gNB. Five formats of PUCCH exist, depending on the duration of PUCCH and the UCI payload size.

In one example of Format #0, a short PUCCH of 1 or 2 symbols with small UCI payloads of up to two bits with UE multiplexing capacity of up to 6 UEs with 1-bit payload in the same PRB.

In one example of Format #1, a long PUCCH of 4-14 symbols with small UCI payloads of up to two bits with UE multiplexing capacity of up to 84 UEs without frequency hopping and 36 UEs with frequency hopping in the same PRB.

In one example of Format #2, a short PUCCH of 1 or 2 symbols with large UCI payloads of more than two bits with no UE multiplexing capability in the same PRBs.

In one example of Format #3, a long PUCCH of 4-14 symbols with large UCI payloads with no UE multiplexing capability in the same PRBs.

In one example of Format #4, a long PUCCH of 4-14 symbols with moderate UCI payloads with multiplexing capacity of up to 4 UEs in the same PRBs.

The short PUCCH format of up to two UCI bits is based on sequence selection, while the short PUCCH format of more than two UCI bits frequency multiplexes UCI and DMRS. The long PUCCH formats time-multiplex the UCI and DMRS. Frequency hopping is supported for long PUCCH formats and for short PUCCH formats of duration of 2 symbols. Long PUCCH formats can be repeated over multiple slots.

Sidelink measurement for reservation signal can be used for excluding resources that are indicated by the reservation signal in the sensing procedure.

For sidelink measurements for multi-slot aperiodic transmissions where the multiple decoded SCIs and/or their associated PSSCHs indicate a same reserved PSCCH/PSSCH resource, the multiple PSSCH/PSCCH-RSBP measurements can be used for excluding resources in the sensing procedure.

For sidelink measurements for multi-slot periodic transmissions where the multiple decoded SCIs and/or their associated PSSCHs indicate a same multi-slot reserved PSCCH/PSSCH resource, the multiple PSSCH/PSCCH-RSBP measurements can be used for excluding resources in the sensing procedure.

For sidelink measurements for MIMO transmissions, the multi-port DMRS PSSCH/PSCCH-RSBP measurements can be used for excluding resources in the sensing procedure.

For Sidelink CSI reporting in Mode 1 resource allocation, a CSI request field in the DCI format from the gNB to a transmitter UE can be used to trigger the sidelink CSI reporting by a receiver UE, or/and indicate a sidelink T-F resource for CSI reporting by a receiver UE.

For Sidelink CSI-RS transmission in Mode 1 resource allocation, a CSI-RS request field in the DCI format from the gNB to a transmitter UE can be used to trigger the sidelink CSI-RS transmission by a receiver UE, or/and indicate a sidelink T-F resource for CSI-RS transmission by a receiver UE.

For Sidelink CSI reporting from a UE to the gNB in Mode 1 resource allocation, the resource where sidelink CSI reporting is transmitted can be indicated in a DCI format that schedules a sidelink resource for a transmitter UE.

A PSFCH format can occupy a multiple of PRBs and can repeat in each RB or subchannel.

The sequence or cyclic shift of the sequence used in each RB for the PSFCH format may be the same or vary at least depending upon an RB position, or/and other factors such as destination ID of the associated PSCCH, or/and source ID of the associated PSSCH, or/and starting/ending subchannel ID for the associated PSCCH/PSSCH, or/and CRC of the associated PSCCH.

The DCI format that schedules a sidelink resource for a transmitter UE may contain sidelink traffic type e.g., unicast, groupcast, and broadcast.

A reservation signal resource used by a transmitter UE to reserve resources for the following (re)transmissions may be allocated by the gNB and indicated in the DCI format that schedules the sidelink resource for the transmitter UE.

A resource type field in the SCI format is used to indicate the sidelink resource is periodic/semi-persistent resource for periodic traffic or one-shot resource for aperiodic traffic.

For periodic traffic, resource reservation field is interpreted as the resource reservation interval.

For aperiodic traffic, resource reservation field can be interpreted as the channel occupancy time.

Procedure for Transmission of Multiple ACK/NACKs.

The UE sends the ACK or NACK or DTX corresponding to the PSCCH/PSSCH with the strongest PSCCH/PSSCH-RSBP in the associated HARQ ACK/NACK resource when more than one SCI is received and decoded in the same T-F resource by a receiver UE and indicates a same HARQ ACK/NACK resource.

Sidelink Measurements for Reservation Signals.

A reservation signal is used for reserving sidelink resources for the following PSCCH/PSSCH transmission(s) and/or retransmission(s). When a reservation signal transmitted by a UE is received by other UEs, it can be used by other UEs to whether or not exclude resources that are reserved by this UE.

In one embodiment, a reservation signal may be in a form of SCI/PSCCH without associated PSSCH that has lower decoding SINR than that of the following reserved PSCCH/PSSCH. In this case, if a reservation signal is decoded correctly, the following reserved PSCCH/PSSCH resources may still be used for the transmission of other UEs.

Since measurements for the reserved PSCCH/PSSCH cannot be done at the time when the reservation signal is received, RSBP measurements of the reservation signal may be used as a criterion to exclude resources reserved by the UE. If RSBP measurement of the reservation signal is higher than a threshold, the reserved PSCCH/PSSCH resource indicated by the reservation signal may be excluded by other UEs for resource selection. If RSBP measurement of the reservation signal is lower than a threshold, the reserved PSCCH/PSSCH resource indicated by the reservation signal may be considered by other UEs for resource selection.

In one embodiment, a reservation signal may be in a form of SCI/PSCCH+PSSCH. On example is PSCCH/PSSCH resources reserved for one or all retransmissions of a TB (or more than 1 TB for MIMO spatial multiplexing) can be indicated by the previous PSCCH/PSSCH transmission or retransmission that can serve as a reservation signal. Another example is PSCCH/PSSCH resources reserved for next transmission (not necessarily retransmission) can be indicated by the previous PSCCH/PSSCH transmission that can serve a reservation signal. In this case, PSSCH/PSCCH-RSBP of the reservation signal may be used as a criterion to exclude resource reserved by the UE.

If PSSCH/PSCCH-RSBP measurement of the reservation signal is higher than a threshold, the reserved PSCCH/PSSCH resource indicated by the reservation signal may be excluded by other UEs for resource selection. If PSSCH/PSCCH-RSBP measurement of the reservation signal is lower than a threshold, the reserved PSCCH/PSSCH resource indicated by the reservation signal may be considered by other UEs for resource selection.

Sidelink Measurements for Multi-Slot Aperiodic Transmissions.

For aperiodic transmissions, if a decoded SCI that is received by a UE and transmitted from another UE for aperiodic transmissions indicates a reserved transmission resource that is located in the following slots falling within the selection window of the UE. The UE may measure the PSCCH/PSSCH-RSBP of the decoded SCI and PSSCH. If PSSCH/PSCCH-RSBP measurement of the decoded SCI and PSSCH is higher than a threshold, the reserved PSCCH/PSSCH resource indicated by the decoded SCI may be excluded by the UE for resource selection. If PSSCH/PSCCH-RSBP measurement of the decoded SCI and PSSCH is lower than a threshold, the reserved PSCCH/PSSCH resource indicated by the decoded SCI may be considered by the UE for resource selection. PSSCH/PSCCH-RSBP measurement can be PSSCH/PSCCH-DMRS-RSBP.

Multiple decoded SCIs may indicate a same reserved PSCCH/PSSCH resource. In this case, each decoded SCI indicates the channel occupancy time for the following slots. The following sidelink measurements can be applied.

In one example, an average of the multiple PSSCH/PSCCH-RSBP measurements of the decoded SCIs and their associated PSSCHs that indicates a same reserved PSCCH/PSSCH resource can be used as a criterion for resource exclusion in the sensing procedure.

If the average of the multiple PSSCH/PSCCH-RSBP measurements of the decoded SCIs and their associated PSSCH is higher than a threshold, the reserved PSCCH/PSSCH resource indicated by the decoded SCIs may be excluded by the UE for resource selection. If the average of the multiple PSSCH/PSCCH-RSBP measurements of the decoded SCIs and their associated PSSCH is lower than a threshold, the reserved PSCCH/PSSCH resource indicated by the decoded SCIs may be considered by the UE for resource selection.

In one example, the highest value of the multiple PSSCH/PSCCH-RSBP measurements of the decoded SCIs and their associated PSSCHs that indicates a same reserved PSCCH/PSSCH resource can be used as a criterion for resource exclusion in the sensing procedure.

If the highest of the multiple PSSCH/PSCCH-RSBP measurements of the decoded SCIs and their associated PSSCH is higher than a threshold, the reserved PSCCH/PSSCH resource indicated by the decoded SCIs may be excluded by the UE for resource selection. If the highest of the multiple PSSCH/PSCCH-RSBP measurements of the decoded SCIs and their associated PSSCH is lower than a threshold, the reserved PSCCH/PSSCH resource indicated by the decoded SCIs may be considered by the UE for resource selection.

In one example, the lowest value of the multiple PSSCH/PSCCH-RSBP measurements of the decoded SCIs and their associated PSSCHs that indicates a same reserved PSCCH/PSSCH resource can be used as a criterion for resource exclusion in the sensing procedure.

If the lowest of the multiple PSSCH/PSCCH-RSBP measurements of the decoded SCIs and their associated PSSCH is higher than a threshold, the reserved PSCCH/PSSCH resource indicated by the decoded SCIs may be excluded by the UE for resource selection. If the lowest of the multiple PSSCH/PSCCH-RSBP measurements of the decoded SCIs and their associated PSSCH is lower than a threshold, the reserved PSCCH/PSSCH resource indicated by the decoded SCIs may be considered by the UE for resource selection.

In the aforementioned examples and embodiments, if MIMO transmission is adopted for each PSCCH/PSSCH transmission. The procedure (e.g., sidelink measurements for MIMO transmissions) is applied to each sidelink PSCCH/PSSCH measurement.

Sidelink Measurements for Multi-Slot Periodic Transmissions.

For periodic transmissions, if a decoded SCI that is received by a UE and transmitted from another UE for periodic transmissions indicates a reserved transmission resource that is located in the following slots falling within the selection window of the UE. The UE may measure the PSCCH/PSSCH-RSBP of the decoded SCI and PSSCH. If PSSCH/PSCCH-RSBP measurement of the decoded SCI and PSSCH is higher than a threshold, the reserved PSCCH/PSSCH resource indicated by the decoded SCI may be excluded by the UE for resource selection. If PSSCH/PSCCH-RSBP measurement of the decoded SCI and PSSCH is lower than a threshold, the reserved PSCCH/PSSCH resource indicated by the decoded SCI may be considered by the UE for resource selection. PSSCH/PSCCH-RSBP measurement can be PSSCH/PSCCH-DMRS-RSBP.

Multiple decoded SCIs may indicate a same multi-slot reserved PSCCH/PSSCH resource. In this case, each decoded SCI indicates a resource by a reservation interval. The following sidelink measurements can be applied.

In one example, an average of the multiple PSSCH/PSCCH-RSBP measurements of the decoded SCIs and their associated PSSCHs that indicates a same multi-slot reserved PSCCH/PSSCH resource can be used as a criterion for resource exclusion in the sensing procedure.

If the average of the multiple PSSCH/PSCCH-RSBP measurements of the decoded SCIs and their associated PSSCH is higher than a threshold, the reserved multi-slot PSCCH/PSSCH resource indicated by the decoded SCIs may be excluded by the UE for resource selection. If the average of the multiple PSSCH/PSCCH-RSBP measurements of the decoded SCIs and their associated PSSCH is lower than a threshold, the reserved multi-slot PSCCH/PSSCH resource indicated by the decoded SCIs may be considered by the UE for resource selection.

In one example, the highest value of the multiple PSSCH/PSCCH-RSBP measurements of the decoded SCIs and their associated PSSCHs that indicates a same multi-slot reserved PSCCH/PSSCH resource can be used as a criterion for resource exclusion in the sensing procedure.

If the highest of the multiple PSSCH/PSCCH-RSBP measurements of the decoded SCIs and their associated PSSCH is higher than a threshold, the reserved multi-slot PSCCH/PSSCH resource indicated by the decoded SCIs may be excluded by the UE for resource selection. If the highest of the multiple PSSCH/PSCCH-RSBP measurements of the decoded SCIs and their associated PSSCH is lower than a threshold, the reserved multi-slot PSCCH/PSSCH resource indicated by the decoded SCIs may be considered by the UE for resource selection.

In one example, the lowest value of the multiple PSSCH/PSCCH-RSBP measurements of the decoded SCIs and their associated PSSCHs that indicates a same multi-slot reserved PSCCH/PSSCH resource can be used as a criterion for resource exclusion in the sensing procedure.

If the lowest of the multiple PSSCH/PSCCH-RSBP measurements of the decoded SCIs and their associated PSSCH is higher than a threshold, the reserved multi-slot PSCCH/PSSCH resource indicated by the decoded SCIs may be excluded by the UE for resource selection. If the lowest of the multiple PSSCH/PSCCH-RSBP measurements of the decoded SCIs and their associated PSSCH is lower than a threshold, the reserved multi-slot PSCCH/PSSCH resource indicated by the decoded SCIs may be considered by the UE for resource selection.

In the aforementioned examples and embodiments, if MIMO transmission is adopted for each PSCCH/PSSCH transmission. The procedure (e.g., sidelink measurements for MIMO transmissions) is applied to each sidelink PSCCH/PSSCH measurement.

Sidelink Measurements for MIMO Transmissions.

The Mode-2 sensing procedure utilizes sidelink measurement of L1 SL-RSBP based on sidelink DMRS when the corresponding SCI is decoded. The sidelink measurement of L1 SL-RSBP can be used at least for resource exclusion. That is, if PSSCH/PSCCH-RSBP measurement of the decoded SCI and/or PSSCH is higher than a threshold, the reserved PSCCH/PSSCH resource indicated by the decoded SCI may be excluded by other UEs for resource selection. If PSSCH/PSCCH-RSBP measurement of the decoded SCI and/or PSSCH is lower than a threshold, the reserved PSCCH/PSSCH resource indicated by the decoded SCI may be considered by other UEs for resource selection. RSBP-PSSCH/PSCCH measurement can be PSSCH/PSCCH-DMRS-RSBP.

The following sidelink measurement is applied to the case where one or more than one TB is transmitted with MIMO transmission (spatial multiplexing or transmission diversity) in a same PSCCH/PSSCH resource. In this case, there may be multiple DMRS transmission (multiple DMRS ports) for each PSCCH/PSSCH resource.

In one example, an average of the multiple PSSCH-RSBP measurements of the associated PSSCHs of the decoded SCIs can be used as a criterion for resource exclusion in the sensing procedure shown as above.

In one example, the highest value of the multiple PSSCH-RSBP measurements of the associated PSSCHs of the decoded SCIs can be used as a criterion for resource exclusion in the sensing procedure shown as above.

In one example, the lowest value of the multiple PSSCH-RSBP measurements of the associated PSSCHs of the decoded SCIs can be used as a criterion for resource exclusion in the sensing procedure shown as above.

In one example, an average of the multiple PSCCH-RSBP measurements of the decoded SCIs can be used as a criterion for resource exclusion shown in the sensing procedure shown as above.

In one example, the highest value of the multiple PSCCH-RSBP measurements of the decoded SCIs can be used as a criterion for resource exclusion shown in the sensing procedure shown as above.

In one example, the lowest value of the multiple PSCCH-RSBP measurements of the decoded SCIs can be used as a criterion for resource exclusion shown in the sensing procedure shown as above.

In one example, any combination of the above options.

A Sidelink CSI Reporting from a Receiver UE to a Transmitter UE.

For Mode 1 resource allocation, sidelink CSI reporting from a receiver UE to a transmitter UE can be triggered by a DCI format that schedules a sidelink resource. A field in the DCI format can indicate a sidelink resource for transmission and also indicate whether a CSI reporting needs to be performed by a sidelink receiver UE.

In one embodiment, if sidelink resources for CSI reporting can be implicitly determined by the sidelink resources for PSCCH/PSSCH, the CSI request field in the DCI format doesn't need to indicate sidelink resource for CSI reporting. The CSI request field can be used to only trigger the sidelink CSI reporting by a receiver UE.

When a transmitter UE receives the DCI from a gNB where there is a CSI request, the transmitter UE may signal to the receiver UE whether or not to perform a CSI reporting from the receiver UE.

In one embodiment, if sidelink resources for CSI reporting cannot be implicitly determined by the sidelink resources for PSCCH/PSSCH, the CSI request field in the DCI format can be used to not only trigger the sidelink CSI reporting by a receiver UE, but also to indicate a sidelink T-F resource for CSI reporting by a receiver UE.

A set of sidelink T-F resources for CSI reporting can be configured by higher layer. The CSI request field in the DCI format can be an index that points to one of the sidelink T-F resources for CSI reporting.

When a transmitter UE receives the DCI from a gNB where there is a CSI request, the transmitter UE may signal to the receiver UE whether or not to perform CSI reporting from the receiver UE and also a sidelink T-F resource for the receiver UE to report the CSI.

Sidelink CSI-RS from a Receiver UE to a Transmitter UE.

For Mode 1 resource allocation, sidelink CSI-RS from a receiver UE to a transmitter UE can be triggered by a DCI format that schedules a sidelink resource. A field in the DCI format can indicate a sidelink CSI-RS resource for transmission and also indicate whether a CSI-RS needs to be performed by a sidelink receiver UE.

In one embodiment, if sidelink resources for CSI-RS can be implicitly determined by the sidelink resource for PSCCH/PSSCH, the CSI-RS request field in the DCI format doesn't need to indicate sidelink resource for CSI-RS. The CSI-RS request field can be used to only trigger the sidelink CSI-RS by a receiver UE.

When a transmitter UE receives the DCI from a gNB where there is a CSI-RS request, the transmitter UE may signal to the receiver UE whether or not to transmit a CSI-RS from the receiver UE.

In one embodiment, if sidelink resources for CSI-RS cannot be implicitly determined by the sidelink resources for PSCCH/PSSCH, the CSI-RS request field in the DCI format can be used to not only trigger the sidelink CSI-RS by a receiver UE, but also to indicate a sidelink T-F resource for CSI-RS by a receiver UE.

A set of sidelink T-F resources for CSI-RS can be configured by higher layer. The CSI-RS request field in the DCI format can be an index that points to one of the sidelink T-F resources for CSI-RS.

When a transmitter UE receives the DCI from a gNB where there is a CSI-RS request, the transmitter UE may signal to the receiver UE whether or not to transmit CSI-RS from the receiver UE and also a sidelink T-F CSI-RS resource for the receiver UE to transmit the CSI-RS.

A Sidelink CSI Reporting from a UE to a gNB.

For Mode 1 resource allocation, a sidelink CSI reporting needs to be reported to the gNB over Uu interface. With CSI reports available in the gNB, the gNB can schedule sidelink resources more efficiently. The resource where sidelink CSI reporting is transmitted can be indicated in a DCI format that schedules a sidelink resource for a transmitter UE used to transmit a data to a receiver UE. The resource where sidelink CSI reporting is reported from a UE to the gNB can be a PUCCH or a PUSCH resource. A set of Uu T-F resources for CSI reporting can be configured by higher layer. The resource in the DCI format can be an index that points to one of the Uu T-F resources for CSI reporting.

In one embodiment, the resource used for sidelink CSI reporting can be in a separate PUCCH or PUSCH resource as a PUCCH or PUSCH resource used for Uu CSI reporting.

In one embodiment, the resource used for sidelink CSI reporting can also be a same PUCCH or PUSCH resource as the resource used for Uu CSI reporting. In this case, sidelink CSI reporting is multiplexed with Uu CSI reporting in the same Uu CSI resource.

Multi-PRB PSFCH.

In one embodiment, a PSFCH format uses last symbol(s) available for sidelink in a slot. When there is a fixed (configured or pre-configured) relationship between a PSFCH and PSCCH/PSSCH, a PSFCH format may occupy multiple RBs or even multiple subchannels depending upon the resource occupied by PSCCH/PSSCH.

Figure 36:
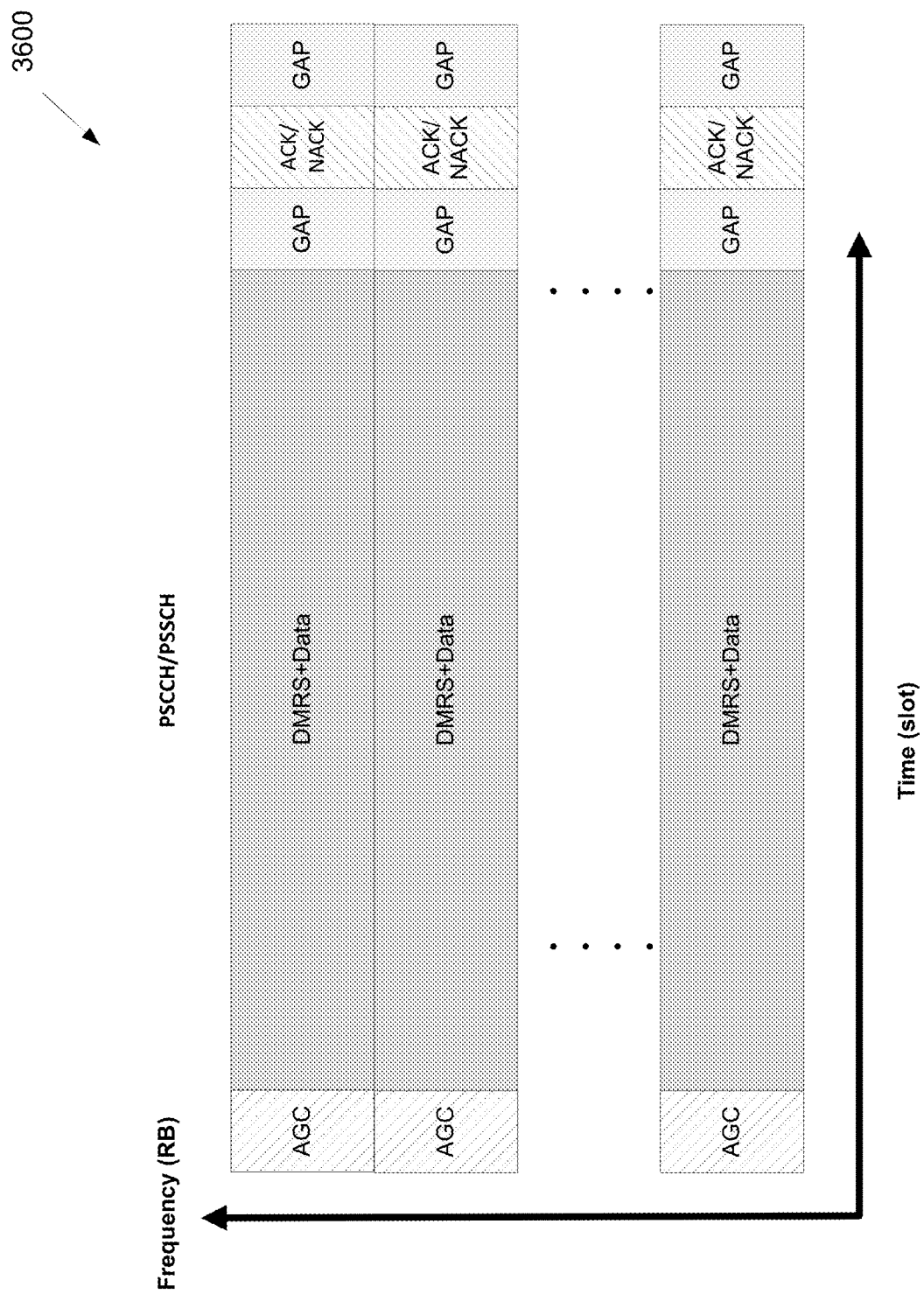
FIG. 36 illustrates an example PSFCH format according to embodiments of the present disclosure.

FIG. 36 illustrates an example PSFCH format 3600 according to embodiments of the present disclosure. The embodiment of the PSFCH format 3600 illustrated in FIG. 36 is for illustration only. FIG. 36 does not limit the scope of the present disclosure to any particular implementation.

FIG. 36 shows a PSFCH format where multiple RBs are occupied in the same slot and same frequency RBs as PSCCH/PSSCH.

In each RB, a short PUCCH-like format may be utilized. For multiple RBs, a PSFCH format can be repeated in each RB or subchannel in order to achieve better PSFCH detection performance.

When sequence-based (e.g., like short PUCCH format 0) is used for the PSFCH format, the sequence or cyclic shift of the sequence used in each RB for the PSFCH format may be the same or vary at least depending upon an RB position. The sequence or cyclic shift of the sequence used in each RB for the PSFCH format may also depend upon other factors such as destination ID of the associated PSCCH, or/and source ID of the associated PSCCH, or/and starting/ending subchannel ID for the associated PSCCH/PSSCH, or/and CRC of the associated PSCCH.

When UCI and DMRS frequency multiplexing (e.g., like short PUCCH format 2 with 1 PRB) is used for the PSFCH format, the DMRS sequence or cyclic shift of the DMRS sequence used in each RB may be the same or vary at least depending upon an RB position. The sequence or cyclic shift of the DMRS sequence used in each RB for the PSFCH format may also depend upon other factors such as destination ID of the associated PSCCH, or/and source ID of the associated PSCCH or/and starting/ending subchannel ID for the associated PSCCH/PSSCH, or/and CRC of the associated PSCCH.

When UCI and DMRS frequency multiplexing (e.g., like short PUCCH format 2 with multiple PRBs) is used for the PSFCH format, the sequence or cyclic shift of the DMRS sequence used for the PSFCH format may depend upon factors such as destination ID of the associated PSCCH or/and source ID of the associated PSCCH, or/and starting/ending subchannel ID for the associated PSCCH/PSSCH, or/and CRC of the associated PSCCH.

When UCI and DMRS frequency multiplexing (e.g., like short PUCCH format 2 with multiple PRBs) is used for the PSFCH format in each subchannel, the sequence or cyclic shift of the DMRS sequence used for the PSFCH format in each subchannel may depend upon factors such as destination ID of the associated PSCCH, or/and source ID of the associated PSCCH, or/and subchannel ID for the associated PSCCH/PSSCH, or/and CRC of the associated PSCCH.

Figure 37:
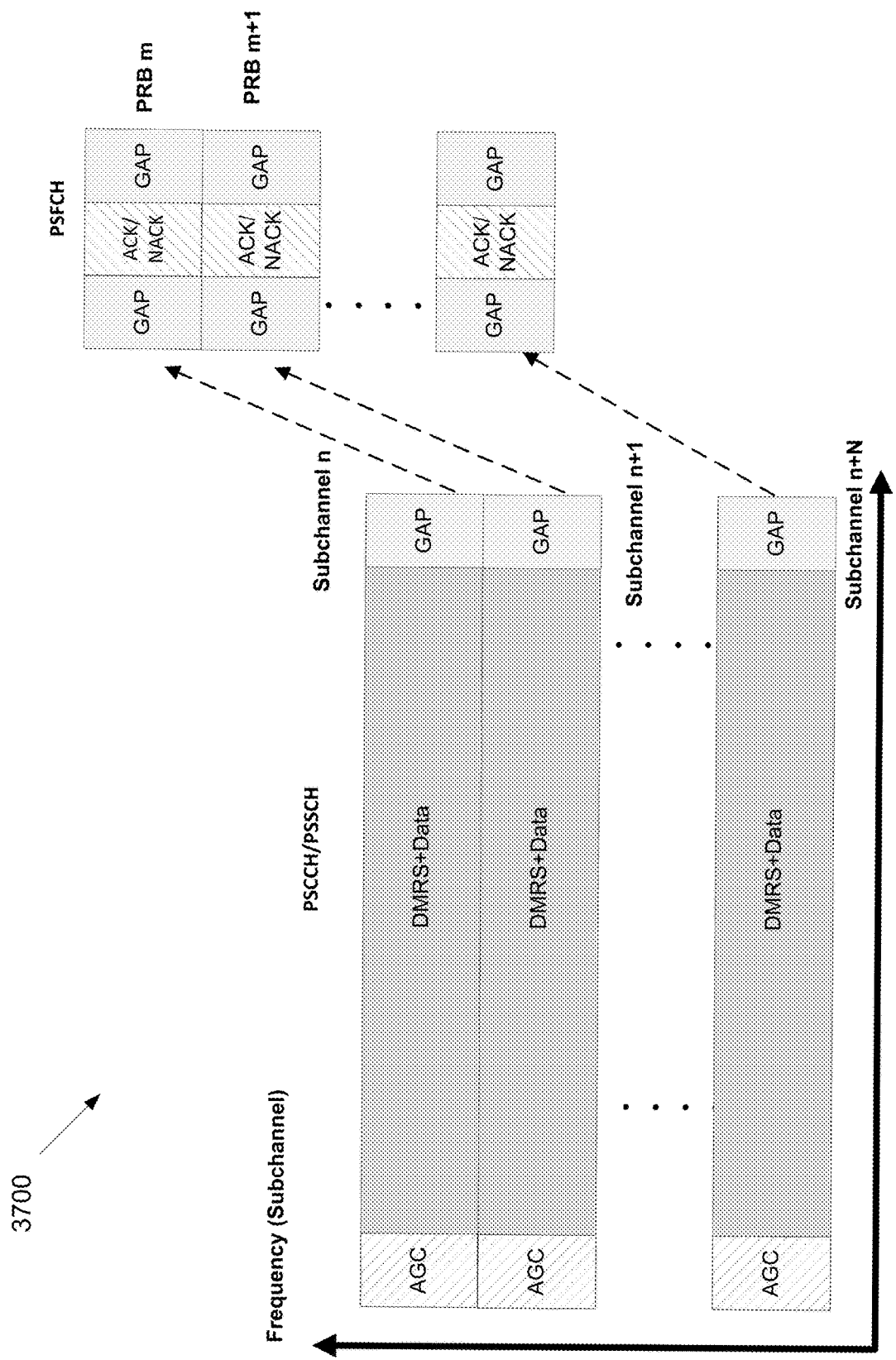
FIG. 37 illustrates another example PSFCH format according to embodiments of the present disclosure.

FIG. 37 illustrates another example PSFCH format 3700 according to embodiments of the present disclosure. The embodiment of the PSFCH format 3700 illustrated in FIG. 37 is for illustration only. FIG. 37 does not limit the scope of the present disclosure to any particular implementation.

Figure 38:
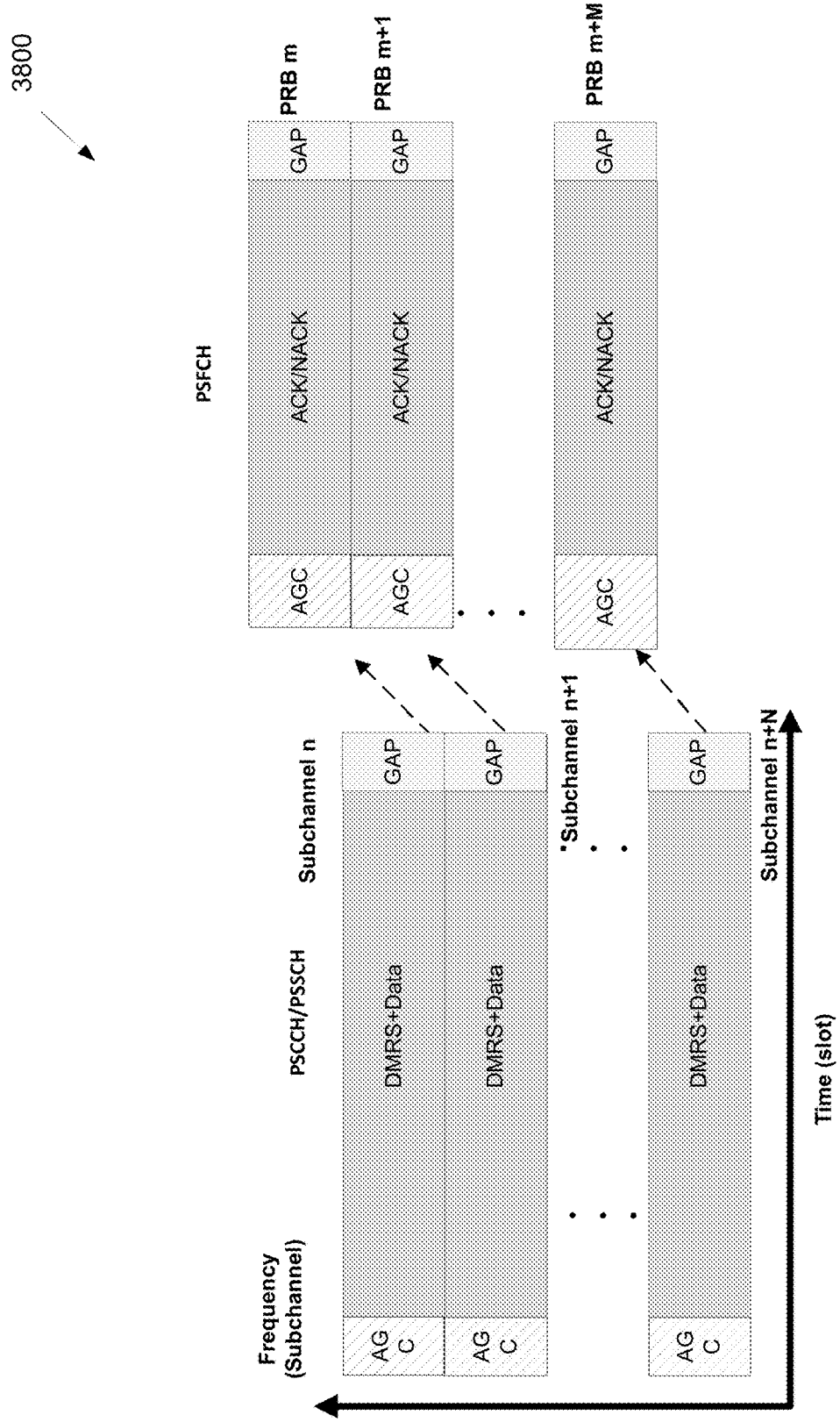
FIG. 38 illustrates yet another example PSFCH format according to embodiments of the present disclosure.

FIG. 38 illustrates yet another example PSFCH format 3800 according to embodiments of the present disclosure. The embodiment of the PSFCH format 3800 illustrated in FIG. 38 is for illustration only. FIG. 38 does not limit the scope of the present disclosure to any particular implementation.

FIG. 37 shows a PSFCH format where multiple RBs are occupied not necessarily in the same slot and/or not necessarily in the same frequency RBs as PSCCH/PSSCH. In this case, there is a one-to-one mapping between the frequency RB that a PSFCH format occupies and a subchannel ID of PSCCH/PSSCHs. In FIG. 37, the PSFCH format has a short format. In FIG. 38, the PSFCH format has a long format.

Each PSFCH may occupy one PRB for both short format and long format. Each PSFCH has a one-to-one mapping with the subchannel ID of PSCCH/PSSCH. When a PSCCH/PSSCH occupies more than one subchannel, it may have more than one associated PSFCH. In this case, multi-PRB PSFCH may be considered.

In each RB, a short or long PUCCH-like format may be utilized. For multiple RBs, a PSFCH format can be repeated in each RB in order to achieve better PSFCH detection performances.

When sequence-based (e.g., like short PUCCH format 0) is used for the PSFCH format, the sequence or cyclic shift of the sequence used in each RB for the PSFCH format may be the same or vary at least depending upon an RB position. The sequence or cyclic shift of the sequence used in each RB for the PSFCH format may also depend upon other factors such as destination ID of the associated PSCCH, or/and source ID of the associated PSCCH, or/and subchannel ID for the associated PSCCH/PSSCH, or/and CRC of the associated PSCCH.

When UCI and DMRS time domain or frequency domain multiplexing (e.g., like short PUCCH format 2 with 1 PRB, long PUCCH format 1, long PUCCH format 3 with 1 PRB and long PUCCH format 4 with 1 PRB) is used for the PSFCH format, the DMRS sequence or cyclic shift of the DMRS sequence used in each RB may be the same or vary at least depending upon an RB position. The sequence or cyclic shift of the DMRS sequence used in each RB for the PSFCH format may also depend upon other factors such as destination ID of the associated PSCCH, or/and source ID of the associated PSCCH, or/and subchannel ID for the associated PSCCH/PSSCH, or/and CRC of the associated PSCCH.

When UCI and DMRS time domain or frequency domain multiplexing (e.g., like short PUCCH format 2 with multiple PRBs, long PUCCH format 3 with multiple PRBs and long PUCCH format 4 with multiple PRBs) is used for the PSFCH format, the sequence or cyclic shift of the DMRS sequence used for the PSFCH format may depend upon factors such as an RB position, destination ID of the associated PSCCH, or/and source ID of the associated PSCCH, or/and starting/ending subchannel ID for the associated PSCCH/PSSCH, or/and CRC of the associated PSCCH.

DCI Format.

For Mode 1 resource allocation, the DCI format that schedules a sidelink resource for a transmitter UE may contain sidelink traffic type e.g., unicast, groupcast, and broadcast. With the sidelink traffic type indicated by the DCI format, the transmitter UE can perform the corresponding procedure for the specific sidelink traffic type, and signal the corresponding information in the SCI to support the sidelink transmission (e.g., ACK/NACK/CSI reporting triggering for unicast traffic or groupcast traffic).

For Mode 1 resource allocation, a reservation signal resource used by the transmitter UE to reserve resources for the following (re)transmissions may be allocated by the gNB and indicated in the DCI format that schedules the sidelink resource for the transmitter UE or a separate DCI format.

SCI Format.

A resource field in the SCI format is used to indicate the sidelink resource is periodic/semi-persistent resource for periodic traffic or one-shot resource for aperiodic traffic.

If the resource field indicates that the sidelink resource is used for periodic traffic, resource reservation field is carried in the SCI format to indicate the resource reservation interval for periodic traffic by the transmitter UE to the receiver UE.

If the resource field indicates that the sidelink resource is used for aperiodic traffic, resource reservation field can be interpreted as the channel occupancy time for aperiodic traffic.

Procedure for Transmission of Multiple ACK/NACKs.

When more than one SCI is received and decoded in the same T-F resource by a receiver UE, and for these SCIs, each SCI indicates a separate associated PSSCH. The following procedure is applied to how ACK/NACK is feedback by the receiver UE.

In one embodiment, the following is related to the HARQ feedback where a receiver UE transmits HARQ ACK/NACK.

When HARQ ACK/NACK resources for these SCIs are in the same T-F resource and same code domain resource, and each PSSCH is decoded with the same decoding result (ACK or NACK). The UE sends one ACK or NACK in the ACK/NACK resource.

When HARQ ACK/NACK resources for these SCIs are in the same T-F resource and same code domain resource, and each PSSCH is not decoded with the same decoding result (ACK or NACK). The UE sends in the associated ACK/NACK resource the ACK/NACK corresponding to the PSCCH/PSSCH with the strongest PSCCH/PSSCH-RSBP.

When HARQ ACK/NACK resources for these SCIs are in the same T-F resource and different code domain resources, The UE sends ACK or NACK respectively in the corresponding HARQ ACK/NACK resource.

When HARQ ACK/NACK resources for these SCIs are in different T-F resources, the UE sends ACK or NACK respectively in the corresponding HARQ ACK/NACK resource.

In one embodiment, the following is related to the HARQ feedback where the receiver UE transmits only HARQ NACK or DTX.

When HARQ ACK/NACK resources for these SCIs are in the same T-F resource and same code domain resource, and each PSSCH is decoded with the same decoding result (ACK or NACK). The UE sends NACK in the HARQ ACK/NACK resource if the decoding result is NACK, otherwise DTX.

When HARQ ACK/NACK resources for these SCIs are in the same T-F resource and same code domain resource, and not all PSSCHs are decoded with the same decoding result (ACK or NACK). The UE sends the NACK if the PSCCH/PSSCH with the strongest PSCCH/PSSCH-RSBP has the decoding result of NACK, otherwise DTX.

When HARQ ACK/NACK resources for these SCIs are in same T-F resource and different code domain resources, the UE sends NACK or DTX respectively in the corresponding HARQ ACK/NACK resource.

When HARQ ACK/NACK resources for these SCIs are in different T-F resources, the UE sends NACK or DTX respectively in the corresponding HARQ ACK/NACK resource.

Figure 39:
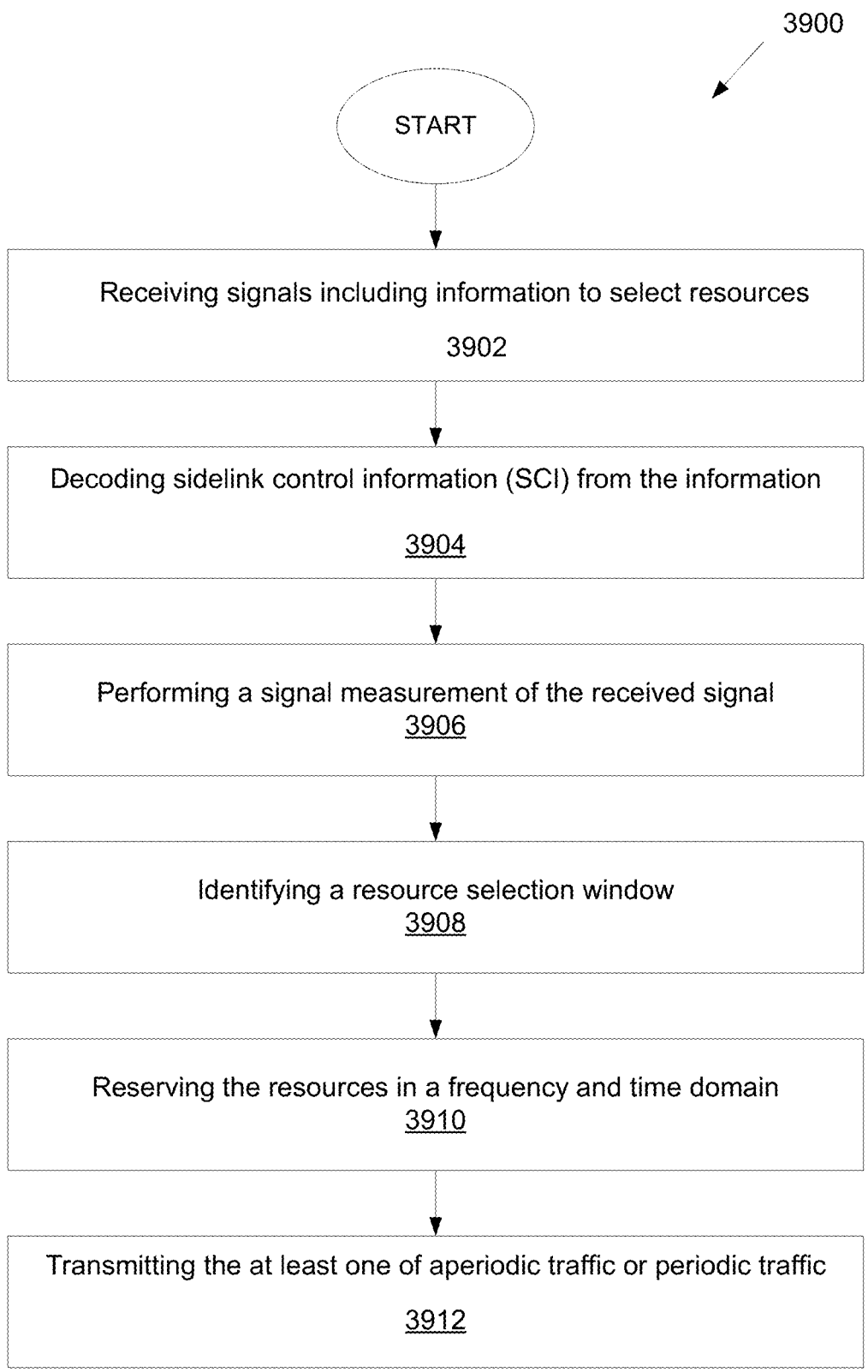
FIG. 39 illustrates a flowchart of a method for resource selection according to embodiments of the present disclosure.

FIG. 39 illustrates a flowchart of a method 3900 for resource selection according to embodiments of the present disclosure, as may be performed by a user equipment (e.g., 111-116 as illustrated in FIG. 1). The embodiment of the method 3900 illustrated in FIG. 39 is for illustration only. FIG. 39 does not limit the scope of the present disclosure to any particular implementation.

As illustrated in FIG. 39, the method 3900 begins at step 3902. In step 3902, the UE receives, from a second UE via a sidelink, signals including information to select resources for at least one of aperiodic traffic or periodic traffic.

In one embodiment, the resources in step 3902 for the periodic traffic are determined by a resource reservation interval, and wherein the resources for the aperiodic traffic are determined based on a channel occupancy time.

In one embodiment, the at least one of aperiodic traffic or periodic traffic transmitted by the first UE has a higher priority to use the resources than traffic of the second UE.

In one embodiment, the resources for the aperiodic traffic are reserved by a first resource allocation scheme. In one example, the first resource allocation scheme is an LBT-like resource allocation scheme. The LBT-like resource allocation scheme is a resource allocation scheme in which a UE reserves or excludes resources for an aperiodic service with bursty traffic (e.g., aperiodic traffic) in a dynamic manner.

In one embodiment, the resources for the at least one of periodic traffic or aperiodic traffic are reserved by a second resource allocation scheme. In one example, the second resource allocation scheme is a long term evolution (LTE)-like autonomous resource allocation scheme, based on an SCI, in which a UE reserves, selects, or excludes resources for semi-persistent or periodic service (e.g., periodic traffic).

In one embodiment, the UE performs the first resource allocation scheme (e.g., LBT-like resource allocation scheme) and the second resource allocation scheme (e.g., LTE-like autonomous resource allocation scheme) in a same resource pool for the resources for the at least one of aperiodic traffic or periodic traffic.

In one embodiment, the UE performs the first resource allocation scheme (e.g., LBT-like resource allocation) and the second resource allocation scheme (e.g., LTE-like autonomous resource allocation) in different resource pools.

In one embodiment, the first resource allocation scheme (e.g., LBT-like resource allocation scheme) and the second resource allocation scheme (e.g., LTE-like resource allocation scheme) are combined to provide a resource allocation scheme for V2X.

In one embodiment, the first resource allocation scheme (e.g., LBT-like resource allocation scheme) is used for both periodic traffic and aperiodic traffic.

In one embodiment, the second resource allocation scheme (e.g., LTE-like autonomous allocation scheme) is used for both periodic traffic and aperiodic traffic with an enhancement on resource reservation/exclusion based on an SCIs including resource allocation information for both the periodic traffic and the aperiodic traffic.

In step 3904, the UE decodes sidelink control information (SCI) from the information included in the signals.

In step 3906, the UE performs, over a sensing window, a signal measurement of the received signals.

In step 3908, the UE identifies a resource selection window based on a latency requirement. In one embodiment, the latency requirement in step 3908 is configured by a network entity using a higher layer signaling or predetermined by the first UE.

In step 3910, the UE reserves the resources in a frequency and time domain for the at least one of aperiodic traffic or periodic traffic based on the decoded SCI and a result of the signal measurement, the resources being identified within a resource selection window.

In step 3912, the UE transmits, to the second UE via the sidelink, the at least one of aperiodic traffic or periodic traffic using the reserved resources. In one embodiment, the UE transmits the SCI including a preemption indication, wherein the preemption indication indicates the resources to be selected, by the first UE, for the at least one of aperiodic traffic or periodic traffic.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method performed by a user equipment (UE) in a wireless communication system, the method comprising:
identifying one or more first resources associated with a resource pool configured for UE autonomous resource selection;
identifying a second resource among the one or more first resources based on first sidelink control information (SCI) associated with a reference signal received power (RSBP) measurement, wherein the first SCI is received from another UE;
identifying one or more third resources by excluding the second resource from the one or more first resources;
identifying that a fourth resource is pre-empted based on a second SCI received from another UE, wherein the second SCI includes priority information associated with the fourth resource and wherein the fourth resource is a resource among the one or more third resources;
removing the fourth resource from the one or more third resources; and
transmitting a physical sidelink shared channel (PSSCH) after removing the fourth resource from the one or more third resources.

2. The method of claim 1, further comprising:
transmitting third SCI associated with the one or more third resources,
wherein the third SCI includes at least one of priority information associated with the one or more third resources, resource reservation period information of the one or more third resources, and frequency resource assignment information of the one or more third resources.

3. The method of claim 1, wherein a priority associated with the fourth resource is higher than a priority associated with the one or more third resources.

4. The method of claim 1, wherein the second resource is excluded from the one or more first resources based on an identification that the RSBP measurement for a PSSCH associated with the first SCI is higher than a RSBP threshold or an identification that the RSBP measurement for a physical sidelink control channel (PSCCH) associated with the first SCI is higher than the RSBP threshold.

5. The method of claim 4,
wherein the RSBP measurement for the PSSCH associated with the first SCI includes a RSBP measurement over a demodulation reference signal (DMRS) for the PSSCH associated with the first SCI, and
wherein the RSBP measurement for the PSCCH associated with the first SCI includes a RSBP measurement over a DMRS for the PSCCH associated with the first SCI.

6. The method of claim 4, wherein the RSBP threshold is increased by a predetermined value based on an identification that a number of remaining ones of the one or more first resources is smaller than a predetermined number.

7. A user equipment (UE) in a wireless communication system, the UE comprising:
a processor configured to:
identify one or more first resources associated with a resource pool configured for UE autonomous resource selection,
identify a second resource among the one or more first resources based on first sidelink control information (SCI) associated with a reference signal received power (RSBP) measurement, wherein the first SCI is received from another UE,
identify one or more third resources by excluding the second resource from the one or more first resources,
identify that a fourth resource is pre-empted based on a second SCI received from another UE, wherein the second SCI includes priority information associated with the fourth resource and wherein the fourth resource is a resource among the one or more third resources, and
remove the fourth resource from the one or more third resources; and
a transceiver operably coupled to the processor, the transceiver configured to transmit a physical sidelink shared channel (PSSCH) after removal of the fourth resource from the one or more third resources.

8. The UE of claim 7, wherein:
the transceiver is further configured to transmit third SCI associated with the one or more third resources, and
the third SCI includes at least one of priority information associated with the one or more third resources, resource reservation period information of the one or more third resources, and frequency resource assignment information of the one or more third resources.

9. The UE of claim 7, wherein a priority associated with the fourth resource is higher than a priority associated with the one or more third resources.

10. The UE of claim 7, wherein the second resource is excluded from the one or more first resources based on an identification that the RSBP measurement for a PSSCH associated with the first SCI is higher than a RSBP threshold or an identification that the RSBP measurement for a physical sidelink control channel (PSCCH) associated with the first SCI is higher than the RSBP threshold.

11. The UE of claim 10,
wherein the RSBP measurement for the PSSCH associated with the first SCI includes a RSBP measurement over a demodulation reference signal (DMRS) for the PSSCH associated with the first SCI, and
wherein the RSBP measurement for the PSCCH associated with the first SCI includes a RSBP measurement over a DMRS for the PSCCH associated with the first SCI.

12. The UE of claim 10, wherein the RSBP threshold is increased by a predetermined value based on an identification that a number of remaining ones of the one or more first resources is smaller than a predetermined number.

* * * * *